US00RE41147E

(19) United States
(12) Reissued Patent
Pang et al.

(10) Patent Number: US RE41,147 E
(45) Date of Reissued Patent: Feb. 23, 2010

(54) METHOD AND APPARATUS FOR PLUGGABLE FIBER OPTIC MODULES

(75) Inventors: Ron Cheng Chuan Pang, Singapore (SG); Yong Peng Sim, Singapore (SG); Edwin Dair, Los Angeles, CA (US); Wenbin Jiang, Thousand Oaks, CA (US); Cheng Ping Wei, Gilbert, AZ (US); Ronson K. Tan, Singapore (SG); Kee Sin Tan, Singapore (SG)

(73) Assignee: JDS Uniphase Corporation, Milpitas, CA (US)

(21) Appl. No.: 11/873,641

(22) Filed: Oct. 17, 2007

Related U.S. Patent Documents

Reissue of:
(64) Patent No.: 7,116,912
Issued: Oct. 3, 2006
Appl. No.: 10/118,761
Filed: Apr. 8, 2002

U.S. Applications:
(63) Continuation-in-part of application No. 09/656,779, filed on Sep. 7, 2000, now Pat. No. 6,873,800, and a continuation-in-part of application No. 09/321,308, filed on May 27, 1999, now Pat. No. 6,901,221.
(60) Provisional application No. 60/283,046, filed on Apr. 10, 2001.

(51) Int. Cl.
*H04B 10/00* (2006.01)

(52) U.S. Cl. ..... 398/139; 398/138; 385/92
(58) Field of Classification Search ..... 398/138–139; 385/88–94
See application file for complete search history.

(56) References Cited

U.S. PATENT DOCUMENTS 3,792,284 A * 2/1974 Kaelin
3,809,908 A * 5/1974 Clanton
3,870,396 A * 3/1975 Racki et al.
3,976,877 A * 8/1976 Thillays
4,149,072 A * 4/1979 Smith et al.
4,161,650 A * 7/1979 Caouette et al.
4,217,030 A * 8/1980 Howarth
4,229,067 A * 10/1980 Love
4,273,413 A * 6/1981 Bendiksen et al.

(Continued)

FOREIGN PATENT DOCUMENTS

| | | | |
|---|---|---|---|
| GB | 2 297 007 | * | 7/1996 |
| JP | 07-225327 | * | 8/1995 |
| JP | 07-225328 | * | 8/1995 |
| WO | WO 95/12227 | * | 5/1995 |

OTHER PUBLICATIONS

Naoaki Yamanaka, Optoelectronic Packaging, a Wiley–Interscience Publication, Chapter Two, "Communication System Interconnection Structure," pp. 11–23, 38–43.*
Shinichi Sasaki, "A Compact Optical Active Connector: An Optical Interconnect Module with an Electrical Connector Interface," IEEE Transactions on Advanced Packaging, vol. 22, No. 4, Nov. 1999. pp. 541–550.*

*Primary Examiner*—Agustin Bello
(74) *Attorney, Agent, or Firm*—Mathew A. Pequignot; Pequignot + Myers LLC

(57) ABSTRACT

Pluggable fiber optic modules having a receive printed circuit board and a transmit printed circuit board perpendicular with an interface printed circuit board with an edge connection. The edge connection of the interface printed circuit board to plug into and out from an edge connector of a host printed circuit board. A transmitter optoelectronic device is coupled to the transmit printed circuit board. A receiver optoelectronic device is coupled to the receive printed circuit board. The pluggable fiber optic modules may further include a support base, a nose receptacle, and an alignment plate.

41 Claims, 46 Drawing Sheets

U.S. PATENT DOCUMENTS 4,347,655 A * 9/1982 Zory et al.
4,387,956 A * 6/1983 Cline
4,432,604 A * 2/1984 Schwab
4,446,515 A * 5/1984 Sauer et al.
4,449,244 A * 5/1984 Kopainsky
4,461,537 A * 7/1984 Raymer, II et al.
4,491,981 A * 1/1985 Weller et al.
4,493,113 A * 1/1985 Forrest et al.
4,533,209 A * 8/1985 Segerson et al.
4,534,616 A * 8/1985 Bowen et al.
4,535,233 A * 8/1985 Abraham
4,539,476 A * 9/1985 Donuma et al.
4,542,076 A * 9/1985 Bednarz et al.
4,549,782 A * 10/1985 Miller
4,549,783 A * 10/1985 Schmachtenberg, III
4,553,811 A * 11/1985 Becker et al.
4,580,295 A * 4/1986 Richman
4,595,839 A * 6/1986 Braun et al.
4,612,670 A * 9/1986 Henderson
4,625,333 A * 11/1986 Takezawa et al.
4,647,148 A * 3/1987 Katagiri
4,678,264 A * 7/1987 Bowen et al.
4,699,455 A * 10/1987 Erbe et al.
4,720,630 A * 1/1988 Takeuchi et al.
4,727,248 A * 2/1988 Meur et al.
4,756,593 A * 7/1988 Koakutsu et al.
4,807,955 A * 2/1989 Ashman et al.
4,840,451 A * 6/1989 Sampson et al.
4,844,581 A * 7/1989 Turner
4,856,091 A * 8/1989 Taska
4,861,134 A * 8/1989 Alameel et al.
4,881,789 A * 11/1989 Levinson
4,897,711 A * 1/1990 Blonder et al.
4,912,521 A * 3/1990 Almquist et al.
4,913,511 A * 4/1990 Tabalba et al.
4,945,229 A * 7/1990 Daly et al.
4,979,787 A * 12/1990 Lichtenberger et al.
4,986,625 A * 1/1991 Yamada et al.
4,989,934 A * 2/1991 Zavracky et al.
5,005,939 A * 4/1991 Arvanitakis et al.
5,011,246 A * 4/1991 Corradetti et al.
5,013,247 A * 5/1991 Watson
5,039,194 A * 8/1991 Block et al.
5,043,775 A * 8/1991 Lee
5,093,879 A * 3/1992 Bregman et al.
5,099,307 A * 3/1992 Go et al.
5,104,243 A * 4/1992 Harding
5,109,453 A * 4/1992 Edwards et al.
5,109,454 A * 4/1992 Okuno et al.
5,117,474 A * 5/1992 van den Bergh et al.
5,117,476 A * 5/1992 Yingst et al.
5,122,893 A * 6/1992 Tolbert
5,136,152 A * 8/1992 Lee
5,155,786 A * 10/1992 Ecker et al.
5,159,190 A * 10/1992 Hohberg et al.
5,163,109 A * 11/1992 Okugawa et al.
5,168,537 A * 12/1992 Rajasekharan et al.
5,202,943 A * 4/1993 Carden et al.
5,241,614 A * 8/1993 Ecker et al.
5,253,320 A * 10/1993 Takahashi et al.
5,259,054 A * 11/1993 Benzoni et al.
5,280,191 A * 1/1994 Chang
5,285,512 A * 2/1994 Duncan et al.
5,289,345 A * 2/1994 Corradetti et al.
5,295,214 A * 3/1994 Card et al.
5,325,455 A * 6/1994 Henson et al.
5,329,428 A * 7/1994 Block et al.
5,337,391 A * 8/1994 Lebby
5,337,396 A * 8/1994 Chen et al.
5,337,398 A * 8/1994 Benzoni et al.
5,345,524 A * 9/1994 Lebby et al.
5,361,244 A * 11/1994 Nakamura et al.
D353,796 S * 12/1994 Oliver et al.
D354,271 S * 1/1995 Speiser et al.
5,412,497 A * 5/1995 Kaetsu et al.
5,414,787 A * 5/1995 Kurata
5,416,668 A * 5/1995 Benzoni
5,416,870 A * 5/1995 Chun et al.
5,416,871 A * 5/1995 Takahashi et al.
5,416,872 A * 5/1995 Sizer, II et al.
5,428,704 A * 6/1995 Lebby et al.
5,432,630 A * 7/1995 Lebby et al.
5,434,747 A * 7/1995 Shibata
5,442,726 A * 8/1995 Howard et al.
5,446,814 A * 8/1995 Kuo et al.
5,452,387 A * 9/1995 Chun et al.
5,455,703 A * 10/1995 Duncan et al.
5,473,715 A * 12/1995 Schofield et al.
5,475,783 A * 12/1995 Kurashima
5,482,658 A * 1/1996 Lebby et al.
5,499,311 A * 3/1996 DeCusatis
5,499,312 A * 3/1996 Hahn et al.
5,515,468 A * 5/1996 DeAndrea et al.
5,528,408 A * 6/1996 McGinley et al.
5,535,296 A * 7/1996 Uchida
5,546,281 A * 8/1996 Poplawski et al.
5,548,677 A * 8/1996 Kakii et al.
5,550,941 A * 8/1996 Lebby et al.
5,561,727 A * 10/1996 Akita et al.
5,596,663 A * 1/1997 Ishibashi et al.
5,596,665 A * 1/1997 Kurashima et al. ..... 385/92
5,636,298 A * 6/1997 Jiang et al.
5,687,267 A * 11/1997 Uchida
5,708,743 A * 1/1998 DeAndrea et al.
5,717,533 A * 2/1998 Poplawski et al.
5,734,558 A * 3/1998 Poplawski et al.
5,736,782 A * 4/1998 Schairer
5,738,538 A * 4/1998 Bruch et al.
5,751,471 A * 5/1998 Chen et al.
5,757,998 A * 5/1998 Thatcher et al.
5,767,999 A * 6/1998 Kayner
5,774,614 A * 6/1998 Gilliland et al.
5,778,127 A * 7/1998 Gilliland et al.
5,812,582 A * 9/1998 Gilliland et al.
5,812,717 A * 9/1998 Gilliland et al.
5,815,623 A * 9/1998 Gilliland et al.
5,864,468 A * 1/1999 Poplawski et al.
5,879,173 A * 3/1999 Poplawski et al.
5,901,263 A * 5/1999 Gaio et al.
5,966,487 A * 10/1999 Gilliland et al.
5,980,324 A * 11/1999 Berg et al.
6,024,500 A * 2/2000 Wolf ..... 385/92
6,047,172 A * 4/2000 Babineau et al.
6,061,493 A * 5/2000 Gilliland et al.
6,062,893 A * 5/2000 Miskin et al.
6,071,017 A * 6/2000 Gilliland et al.
6,074,228 A * 6/2000 Berg et al.
6,085,006 A * 7/2000 Gaio et al.
RE36,820 E * 8/2000 McGinley et al.
6,142,802 A * 11/2000 Berg
6,149,465 A * 11/2000 Berg et al.
6,178,096 B1 * 1/2001 Flickinger et al.
6,179,627 B1 * 1/2001 Daly
6,200,041 B1 * 3/2001 Gaio et al.
6,201,704 B1 * 3/2001 Poplawski et al.
6,203,333 B1 * 3/2001 Medina et al.
6,213,651 B1 * 4/2001 Jiang et al.
6,220,873 B1 * 4/2001 Samela et al.
6,220,878 B1 * 4/2001 Poplawski et al.
6,241,534 B1 * 6/2001 Neer et al.
6,267,606 B1 * 7/2001 Poplawski et al.

6,335,869 B1 * 1/2002 Branch et al.
6,350,063 B1 * 2/2002 Gilliland et al.
6,369,924 B1 * 4/2002 Scharf et al. ..... 398/117
6,430,053 B1 * 8/2002 Peterson et al.
6,439,918 B1 * 8/2002 Togami et al.
6,457,875 B1 * 10/2002 Kropp et al. ..... 385/89
6,485,322 B1 * 11/2002 Branch et al.
6,494,623 B1 * 12/2002 Ahrens et al.
6,517,382 B2 * 2/2003 Flickinger et al.
6,519,160 B1 * 2/2003 Branch et al.
6,524,134 B2 * 2/2003 Flickinger et al.
6,530,785 B1 * 3/2003 Hwang
6,532,155 B2 * 3/2003 Green et al.
6,533,470 B2 * 3/2003 Ahrens
6,533,603 B1 * 3/2003 Togami
6,556,445 B2 * 4/2003 Medina
6,570,768 B2 * 5/2003 Medina
2002/0093796 A1 * 7/2002 Medina
2002/0150343 A1 * 10/2002 Chiu et al.
2002/0167793 A1 * 11/2002 Branch et al.

* cited by examiner

METHOD AND APPARATUS FOR PLUGGABLE FIBER OPTIC MODULES

Matter enclosed in heavy brackets [ ] appears in the original patent but forms no part of this reissue specification; matter printed in italics indicates the additions made by reissue.

CROSS REFERENCE TO RELATED APPLICATIONS

This U.S. Non-Provisional Patent Application claims the benefit of U.S. Provisional Patent Application No. 60/283,046 entitled "METHOD AND APPARATUS FOR PLUGGABLE FIBER OPTIC MODULES", filed Apr. 10, 2001 by Ron Cheng Pang et al.

This U.S. Non-Provisional Patent Application also claims the benefit of and is a continuation-in-part application of U.S. application Ser. No. 09/321,308, entitled "METHOD AND APPARATUS FOR VERTICAL PCB FIBER OPTIC MODULES", filed May 27, 1999 by inventors Wenbin Jiang et al, and claims the benefit of and is a continuation-in-part application of U.S. application Ser. No. 09/656,779, entitled "HOT PLUGGABLE OPTICAL TRANSCEIVER IN A SMALL FORM PLUGGABLE PACKAGE", filed Sep. 7, 2000 now U.S. Pat. No. 6,873,800, by inventors Wei et al, which is incorporated herein by reference, all of which are to be assigned to E2O Communications, Inc.

FIELD OF THE INVENTION

This invention relates to fiber optic modules.

BACKGROUND OF THE INVENTION

Fiber optic modules interface optical fibers to electronic circuitry transducing communication by light or photons with communication by electrical signals. A fiber optic module may be a fiber optic receiver, transmitter or transceiver including both receive and transmit functions. The fiber optic receiver, transmitter and transceiver each have optical elements (OE) and electrical elements (EE). The fiber optic transmitter OE includes an emitter (such as a semiconductor LED or Laser) mounted in a package and an optical coupling element for coupling light or photons from the OE into the optical fiber. The type of semiconductor laser (light amplification by stimulated emission of radiation) may be a vertical cavity surface emitting laser (VCSEL). The fiber optic receiver OE includes a photodetector (such as a photodiode) mounted in a package and an optical coupling element for coupling light or photons from the optical fiber into the photodetector. The EE for each includes integrated circuits and passive elements mounted on a substrate such as a printed circuit board (PCB) or ceramic. The OE and EE are connected electrically at the emitter and photodetector.

Because of the high transmission frequencies utilized in fiber optic communication, crosstalk between receive and transmit signals is of concern. Additionally, electromagnetic interference (EMI) is of concern due to the high frequency of operation of the fiber optic modules. In order to reduce EMI, shielding of the electrical components is required which is usually accomplished by attaching a metal shield to the substrate of the fiber optic module and connecting it to ground. In order to avoid electronic crosstalk and EMI, the fiber optic transceiver usually employs separate components and separate shielding of fiber optic receiver and fiber optic transmitter components. In order to avoid optical crosstalk where light or photons can interfere between communication channels, the fiber optic transceiver usually employs separate optical elements for coupling light or photons into and out of the optical fiber for fiber optic receiver and fiber optic transmitter. Using separate optical elements requires additional components and increases the costs of fiber optic transceivers. It is desirable to reduce the component count of fiber optic transceivers such that they are less expensive to manufacture.

The form factor or size of the fiber optic module is of concern. Previously, the fiber optic transceiver, receiver, and transmitter utilized horizontal boards or substrates which mounted parallel with a system printed circuit board utilized significant footprint or board space. The horizontal boards provided nearly zero optical crosstalk and minimal electronic crosstalk when properly shielded. However, the horizontal boards, parallel to the system printed circuit board, required large spacing between optical fiber connectors to make the connection to the optical fibers. While this may have been satisfactory for early systems using minimal fiber optic communication, the trend is towards greater usage of fiber optic communication requiring improved connectivity and smaller optical fiber connectors to more densely pack them on a system printed circuit board. Thus, it is desirable to minimize the size of system printed circuit boards (PCBs) and accordingly it is desirable to reduce the footprint of the fiber optic module which will attach to such system PCBs. Additionally, the desire for tighter interconnect leads of fiber optic cables, restricts the size of the OE's. For example, in the common implementation using TO header and can, the header dimension of the interconnect lead is normally 5.6 mm. In small form factor optical modules, such as the MT family, the two optical fibers are separated by a distance of only 0.75 mm. This severely restricts the method of coupling light or photons from the OE into and out of fiber optic cables.

BRIEF DESCRIPTIONS OF THE DRAWINGS

Like reference numbers and designations in the drawings indicate like elements providing similar functionality.

DETAILED DESCRIPTION OF THE PREFERRED EMBODIMENT

In the following detailed description of the invention, numerous specific details are set forth in order to provide a thorough understanding of the invention. Note however that embodiments of the invention may be practiced without these specific details. In other instances well known methods, procedures, components, and circuits have not been described in detail so as not to unnecessarily obscure aspects of the embodiments of the invention.

The embodiments of the invention include a method, apparatus and system for vertical board construction of fiber optic transmitters, receivers and transceivers. Briefly, fiber optic transmitter and receiver electrical elements are implemented on at least two separate printed circuit boards (PCBs) in a fiber optic module. The separate boards are arranged within the fiber optic module to reduce the footprint of the fiber optic module. In one embodiment, bending light or photons through ninety degrees, the light transmitter (a packaged type of emitter) and a light receiver (a packaged type of photodetector) are each mounted substantially perpendicular to the transmit and receive boards respectively such that their active areas are nearly facing each other but offset. A single optical block can be used to implement lenses and reflecting surfaces to minimize manufacturing costs. In one embodiment, the light receiver and light transmitter are mounted offset from each other in the optical block in order to avoid optical cross talk. In a second embodiment, the light transmitter (emitter) and the light receiver (photodetector) are each mounted substantially parallel with the transmit and receive boards respectively, the optical axis of transmitter and receiver and the connection to the optical fibers. The separate receive and transmit boards can be provided with ground planes in order to minimize electrical cross talk. Preferably the ground planes on the back sides of the printed circuit boards face each other. A module outer shielded housing or cover, manufactured out of metal or metal plated plastic, provides further shielding for EMI. The separate boards may be extended to support multiple channels or multiple parallel fibers such as in a ribbon optical fiber cable. Manufacturing steps of the boards for the fiber optic module are disclosed to provide reduced manufacturing costs.

Figure 1:
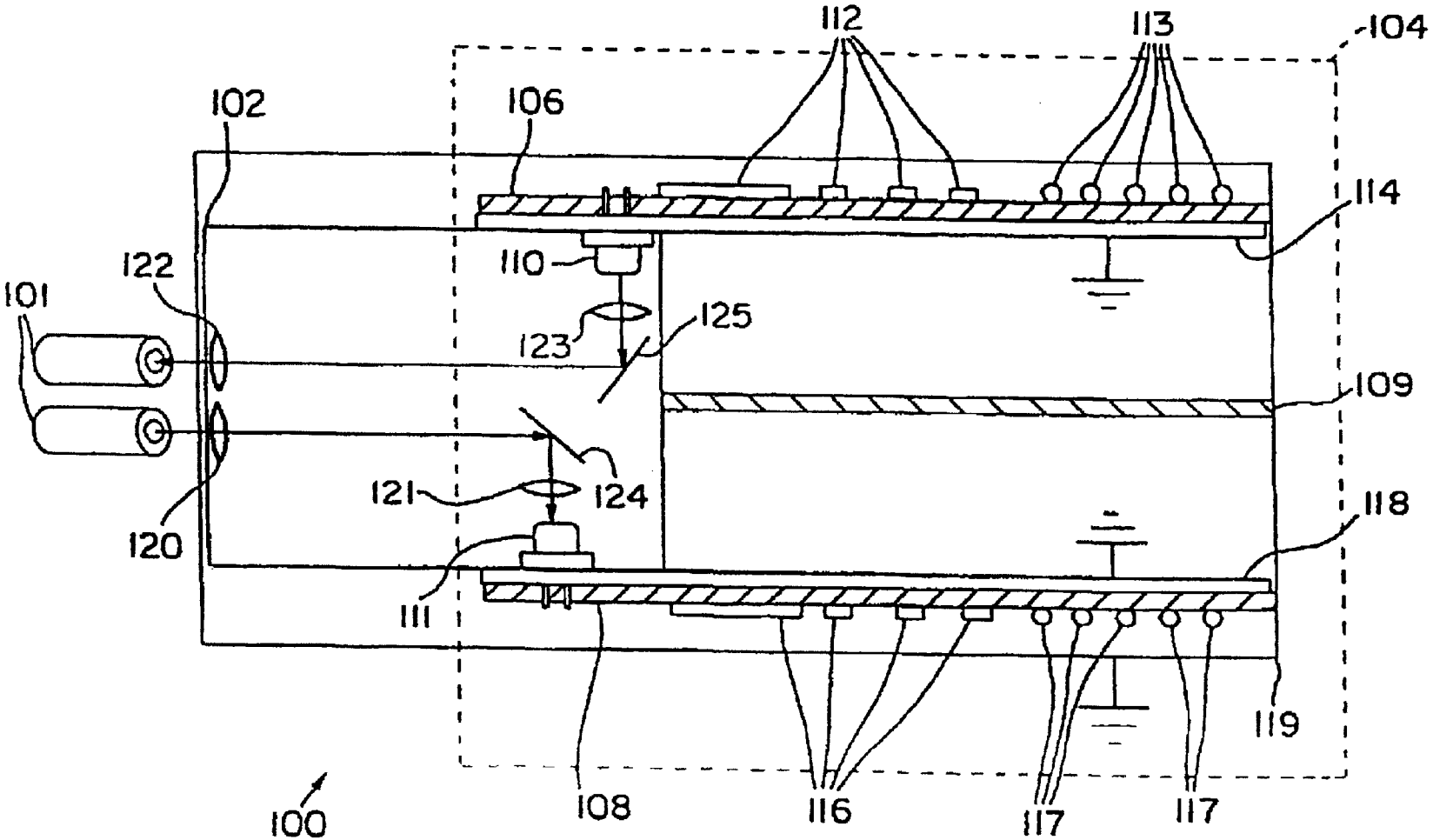
FIG. 1 is a simplified top cutaway view of a first embodiment of the invention.

Referring now to FIG. 1, a simplified cutaway view of the first embodiment of the invention is illustrated. FIG. 1 illustrates a fiber optic module 100 coupling to a pair of fiber optic cables 101. Fiber optic module 100 includes an optical block 102 and an electrical element 104. The optical block 102 may also be referred to as a nose, an optical port, an alignment block, an optical connector, an optical receptacle or receptacle. The optical block 102 can interface to an optical connector such as an LC, MT-RJ or VF-45 optical connector. The electrical element 104 includes a transmit printed circuit board (PCB) 106, a receive PCB 108, an optional internal shield 109, a light transmitter 110, a light receiver 111, and a shielded housing or cover 119. The light transmitter 110 and light receiver 111 are optoelectronic devices for communicating with optical fibers using light of various wavelengths or photons. An optoelectronic device is a device which can convert or transduce light or photons into an electrical signal or an electrical signal into light or photons. The transmitter 110 is a packaged emitter, that converts an electrical signal into emitting light or photons, such as a semiconductor laser or LED, preferably packaged in a TO can. The receiver 111 is a packaged photodetector, that detects or receives light or photons and converts it into an electrical signal, such as a photo diode, preferably package in a TO can. However other packages, housings or covers, or optoelectronic devices for receiving and transmitting light or photon may be used for the receiver 111 or transmitter 110.

Each of the optoelectronic devices, receiver 111 and transmitter 110, have terminals. In one embodiment, terminals of one or more optoelectronic devices couple to thru-holes of the PCB 106 or PCB 108 or both. In another embodiment, terminals of one or more optoelectronic devices couple to an edge connector of the PCB 106 or PCB 108 or both. In one embodiment, the transmit PCB 106 includes electrical components 112 (transmitter integrated circuit (laser driver), resistors, capacitors and other passive or active electrical components), pins 113, and a ground plane 114. The electrical components 112 control the transmitter 110 and buffer the data signal received from a system for transmission over an optical fiber. In one embodiment, the receive PCB 108 includes electrical components 116 (receiver integrated circuit (transimpedance amplifier and post amplifier), resistors, capacitors and other passive or active electrical components), pins 117, and a ground plane 118. The electrical components 116 control the receiver 111 and buffer the data signal received from an optical fiber. The ground planes 114 and 118 and the shielded housing or cover 119 are coupled to ground. In another embodiment, a pin header consisting of a dielectric medium that is molded over a plurality of pins, is used to couple to through holes in the PCB 108 or PCB 106. The electrical components 116 and pins 117 are sandwiched between the ground plane 118 and the shielding 119 to shunt electromagnetic fields to ground and avoid crosstalk in the receive PCB 108. Electrical components 112 and pins 113 are sandwiched between the ground plane 114 and the shielded housing or cover 119 to shunt electromagnetic fields generated by these components to ground and avoid crosstalk in the transmit PCB 106. Optional internal shielding 109 further provides additional crosstalk protection between printed circuit boards. If ground planes 114 and 118 are not used, then internal shielding 109 is required to reduce the electromagnetic fields that may be generated.

The optical block 102 includes lenses 120–123 and reflectors 124–125. Lenses 120–123 may be any collimating lenses including aspheric lenses, ball lenses, and GRIN lenses. Lenses 121–123 may be symmetric (circular symmetry) or asymmetric to provide optical steering. Lens 123 is for collimating the light or photons diverging from the transmitter 110 and lens 122 is for focussing the collimated light or photons into an optical fiber. Lens 120 is for collimating the light or photons diverging out from the end of an optical fiber and lens 121 is for focusing the collimated light or photons into the receiver 111. Reflectors 124–125 may be facets formed in the optical block having angles to provide total internal reflection between the optical block material and the atmosphere. Preferably they are forty five degree angle facets. Alternatively, they may be facets coated with a reflective surface or mirror surface to reflect light or photons off the reflective coated surface or facets having an optical grating surface to reflect photons. The optical block 102 is preferably constructed of a thermoplastic or polycarbonate which is clear to the desired wavelengths of light or photons. The reflectors 124–125, lenses 120–123 and other elements of the optical block 102 described below are preferably formed through injection molding of the desired material.

Figure 2:
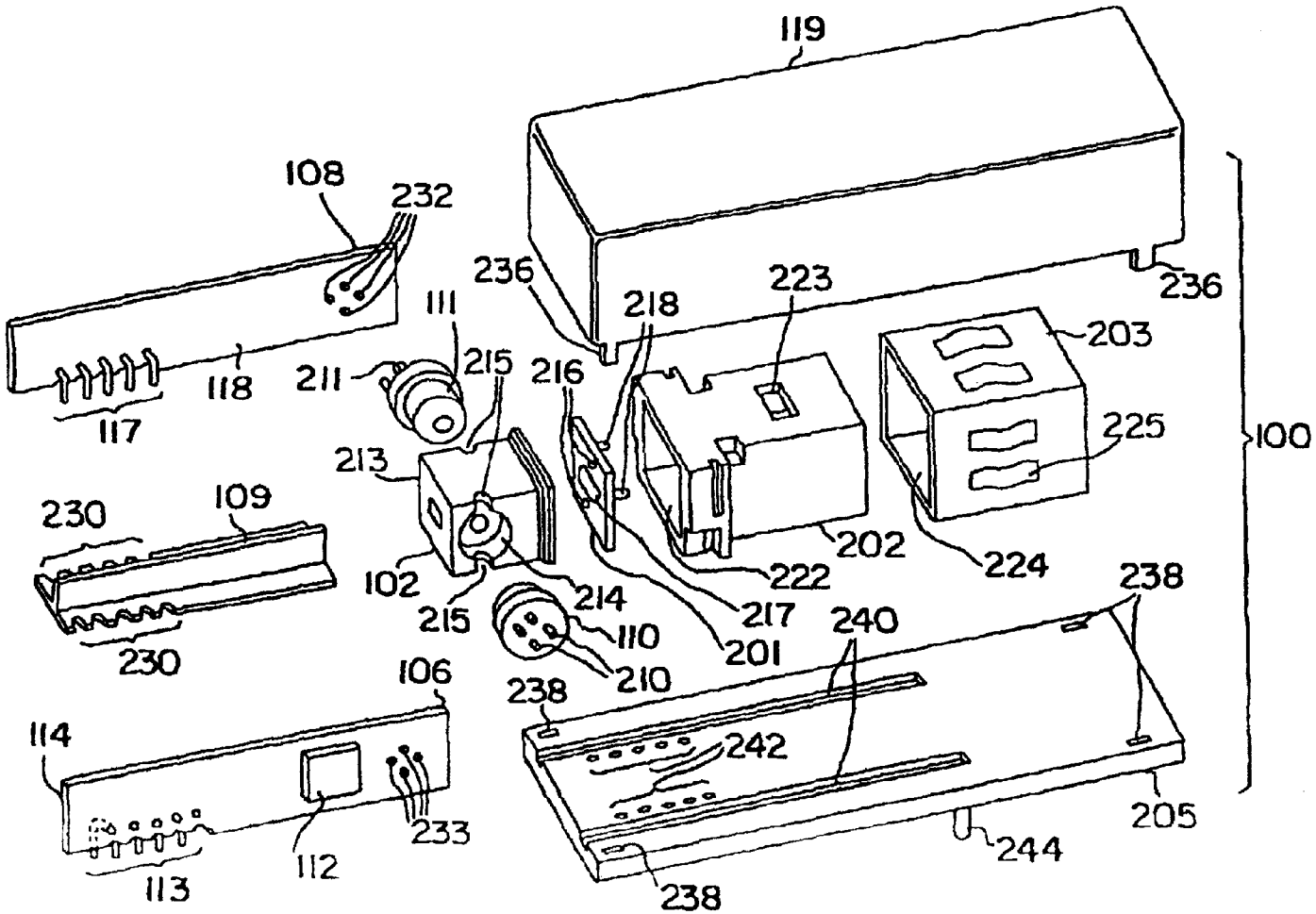
FIG. 2 is an exploded view of the first embodiment of the invention.

Referring to FIG. 2; an exploded diagram of the fiber optic module 100 is illustrated and its assembly is described. Transmitter 110 is inserted into an opening 214 in the optical block 102. Receiver 111 is inserted into an opening 213 in optical block 102. An epoxy is injected into top and bottom tacking holes 215 in order to hold the transmitter 110 and receiver 111 in openings 214 and 213 respectively. An MT alignment plate 201 has optical block alignment holes 216, an optical opening 217 and fiber optic connector alignment pins 218 for alignment purposes. The optical block holes 216 couple to optical block alignment pins in the optical block 102, not illustrated in FIG. 2. The fiber optic connector alignment pins 218 are for aligning optical fibers that couple to the fiber optic module 100.

For coupling to a fiber optic connector, the fiber optic module 100 has a nose 202 and a nose shield 203. The nose 202 includes an optical fiber opening 222 and a latch opening 223. The latch opening 223 receives the optical fiber connector and holds the optical fiber substantially fixed in place and aligned with the optical opening 217 of the alignment plate 201. The nose shield 203 includes an opening 224 for insertion over the nose 202 and shield tabs 225 for coupling to the ground plane of the package. The nose shielding 203 further reduces EMI.

After assembling the nose pieces to the optical block 102, the transmitter 110 and receiver 111 may be aligned to provide optimal light or photon output and reception. Alignment of the transmitter 110 and receiver 111 in optical block 102 is performed by active alignment where the receiver 111 and transmitter 110 are powered up to detect and emit photons. The receiver 111 and transmitter 110 are properly aligned in the optical block 102 to provide maximum photon detection from or coupling into fiber 101. The tacking holes 215 extend into the openings 213 and 214 such that epoxy may poured in to hold the optoelectronic devices to the optical block. After alignment is complete, the epoxy is UV cured and allowed to set such that receiver 111 and transmitter 110 are substantially coupled to the optical block 102.

After the epoxy has set, the receive PCB 108 and the transmit PCB 106 may be attached to the receiver 111 and transmitter 110 respectively. Receiver thruholes 232 in the receive PCB 108 are aligned and slid over terminals 211 of the receiver 111. The terminals 211 are then soldered to make an electrical connection on the component side (opposite the side of the ground plane 118) of the receive PCB 108. Transmitter thruholes 233 in the transmit PCB 106 are aligned and then slid over the terminals 210 of the transmitter 110. The terminals 210 are then soldered to make an electrical connection on the component side (opposite the side of the ground plane 114) of transmit PCB 106. Ground planes 114 and 118 have sufficient material removed around the transmitter thruholes 233 and the receiver thruholes 232 respectively to avoid shorting the terminals of the transmitter 110 and receiver 111 to ground.

After coupling the PCBs 108 and 106 to the receiver 111 and transmitter 110 respectively, the assembly is inserted into the shielded housing or cover 119. The optional internal shield 109 is next assembled into the shielded housing or cover 119 between the PCBs 106 and 108. The optional internal shield 109 has pin slots 230 to surround the pins 113 and 117 and avoid shorting thereto.

The shielded housing or cover 119 includes clips or tabs 236 at each corner for mating to a base 205. The base 205 includes PCB slots 240, clip openings or slots 238 into which the clips or tabs 236 may be inserted, and base pin holes 242 into which the PCB pins 113 and 117 may be inserted. The base 205 includes a guide post 244 for mounting the fiber optic module into a system printed circuit board. The bottom of the base mounts parallel to the printed circuit board of the system such that when horizontal, the receive PCB 108 and the transmit PCB 106 are vertical and substantially perpendicular in reference to the printed circuit board of the system and the base 205. Next in assembly, the base 205 has its base pin holes 242 slid over the PCB pins 113 and 117, the printed circuit boards 106 and 108 are guided to mate with the PCB slots 240, and the clips or tabs 236 of the shielded housing or cover 119 are guided into the clip openings or slots 238. The receive PCB pins 113 and the transmit PCB pins 117 are vertical and substantially perpendicular in reference to the printed circuit board of the system and the base 205. After coupling the base 205 to the shielded housing or cover 119, the clips or tabs 236 are bent, twisted, or otherwise changed in order to hold the base 205 in place. As an alternative to clips or tabs 236 and clip openings or slots 238, the shielded housing or cover 119 may use plastic clips, or a ridge, integrated into each side that couples to base 205 appropriately. The shielded housing or cover 119, which is coupled to ground, encases the PCBs 106 and 108 to reduce the electromagnetic fields generated by the electrical components coupled thereto by shunting the electric fields to ground to reduce electromagnetic interference (EMI).

Figure 3A:
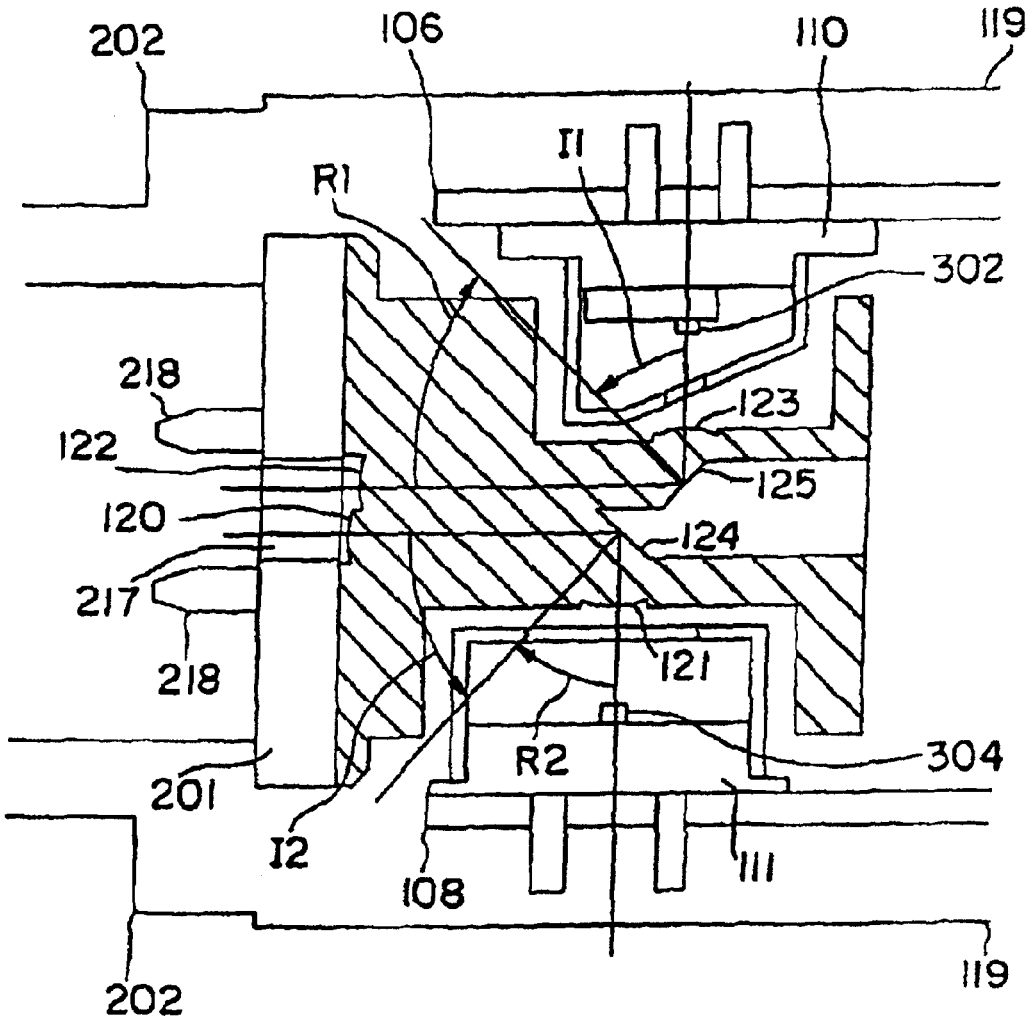
FIG. 3A is a cross-sectional view from the top of the optic block for the first embodiment of the invention.

Referring now to FIG. 3A, a cross-sectional view of the optical block 102 for the first embodiment is illustrated. The transmitter 110, the receiver 111, and the MT alignment plate 201 are coupled to the optical block 102. The light transmitter 110 includes an emitter 302 for generation of light or photons in response to electrical signals from the transmit PCB 106. The light receiver 111 includes a detector 304 to receive light or photons and generate electrical signals in response to light or photons coupled thereto. Light or photons emitted by the emitter 302 are coupled into lens 123 and collimated onto the reflector 125 at an incident angle I1 (angle with the perpendicular to reflector 125 surface) preferably of substantially forty five degrees. Reflector 125 reflects the incident light or photons on a refraction angle R1 (angle with the perpendicular to reflector 125 surface) equivalent to incident angle I1 preferably of substantially forty five degrees. The reflected light or photons preferably travel perpendicular to the incident light or photons towards the lens 122. Lens 122 focuses the light or photons from the emitter 302 into an aligned optical fiber through the optical port 217 in the MT alignment plate 201. Thus, light or photons coupled or launched into an optical fiber, defining a first optical axis, are preferably substantially perpendicular to the light or photons emitted and incident upon lens 123 from the emitter 302 of the transmitter 110.

Light or photons, incident from a fiber optic cable coupled to the fiber optic module 100, is received through the optical port 217 of the MT alignment plate 201. Light or photons from the fiber optic cable are aligned to be incident upon the lens 120. Lens 120 collimates the incident light or photons from a fiber optic cable onto the reflector 124 at an incident angle I2 of preferably substantially forty five degrees. Reflector 124 reflects incident light or photons at a refractive angle R2 equivalent to incident angle I2 of preferably substantially forty five degrees towards lens 121. Lens 121 focuses the light or photons received from a fiber optical cable onto the detector 304. Light or photons incident from a fiber optic cable, defining a second optical axis, are preferably substantially perpendicular to the light or photons incident upon the detector 304.

Figure 3I:
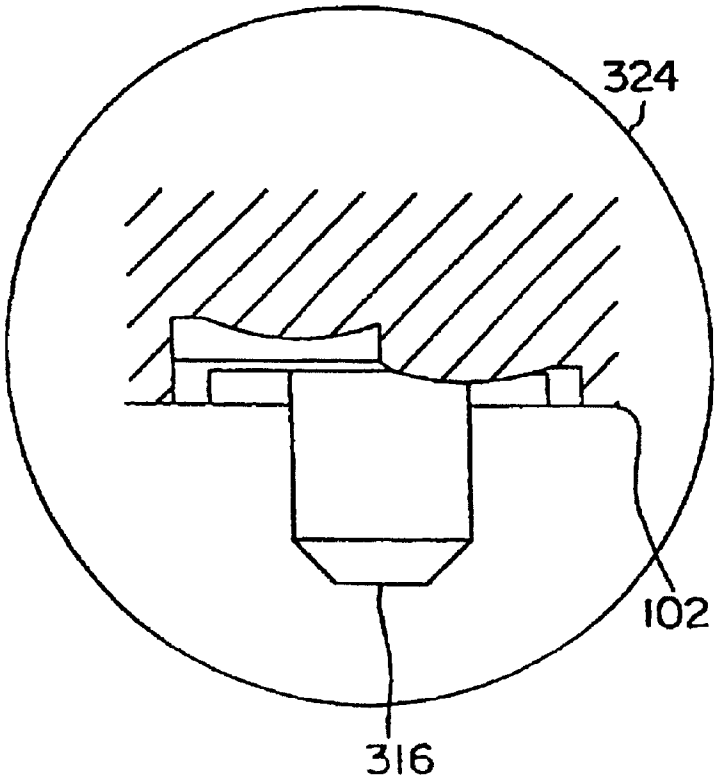
FIG. 3I is a magnified cross-sectional view of the alignment post of the optic block.
Figure 3B:
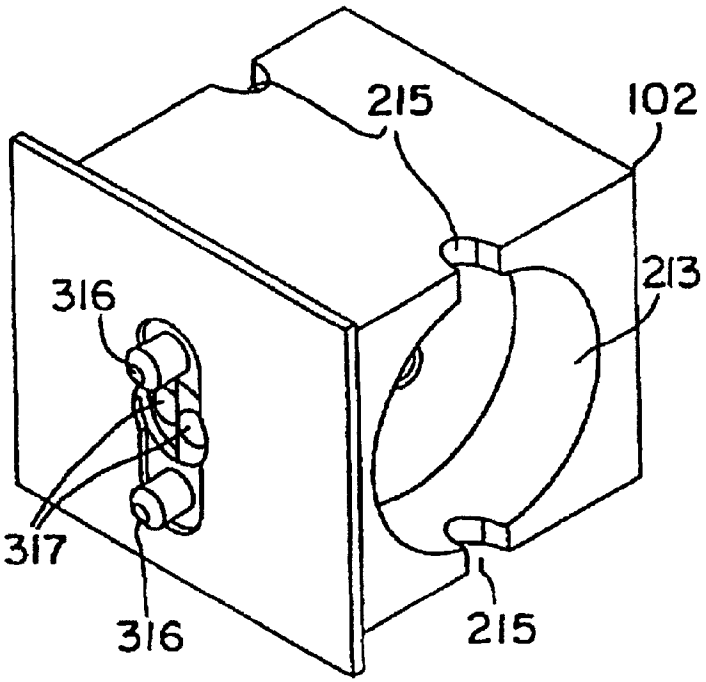
FIG. 3B is a front side perspective view from the left of the optic block for the first embodiment of the invention.

FIG. 3B illustrates a frontal perspective view from the left side of the optical block 102. The front side of the optical block 102 includes optical block alignment pins 316 and an optical output opening 317. The optical block alignment pins 316 couple to the alignment holes 216 of the alignment plate 201 such that the optical output opening 317 is aligned with the optical port 217 in the alignment plate 201. FIG. 3C illustrates the front side of the optical block 102. The optical output opening 317 is indicated.

Figure 3F:
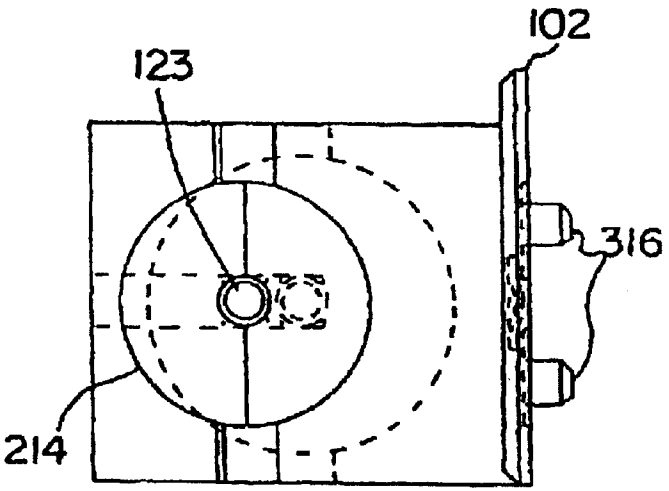
FIG. 3F is a right side view of the optic block for the first embodiment of the invention.
Figure 3C:
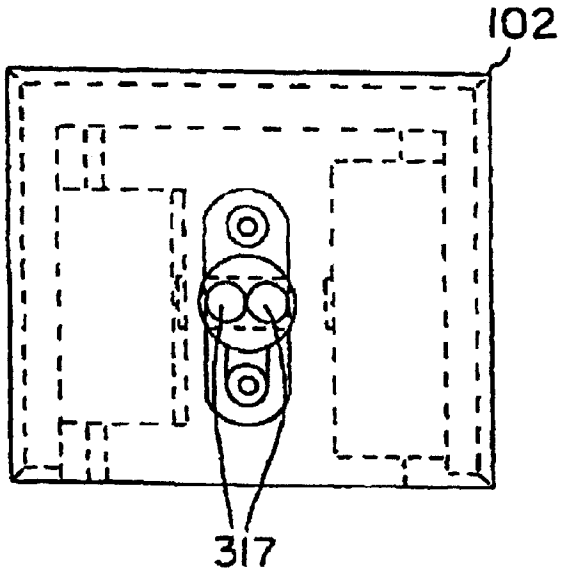
FIG. 3C is a frontal view of the optic block for the first embodiment of the invention.
Figure 3H:
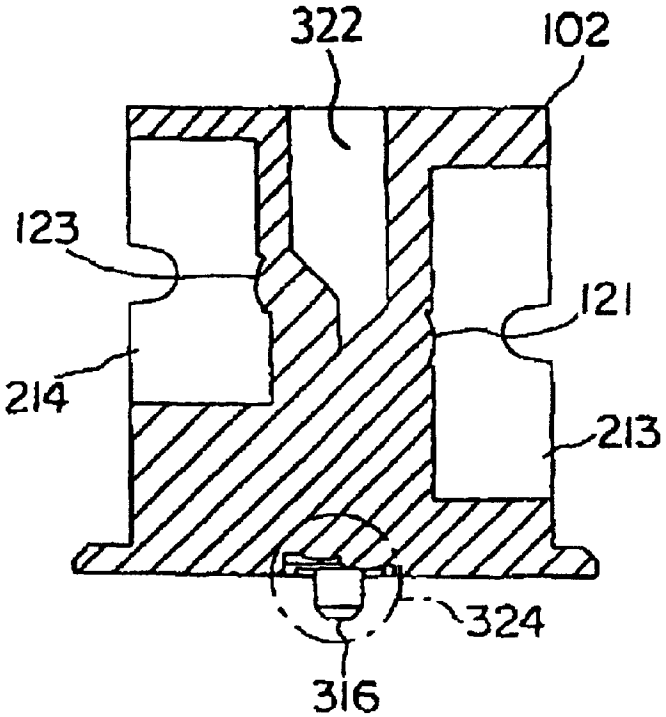
FIG. 3H is a cross-sectional view of the optic block for the first embodiment of the invention.
Figure 3D:
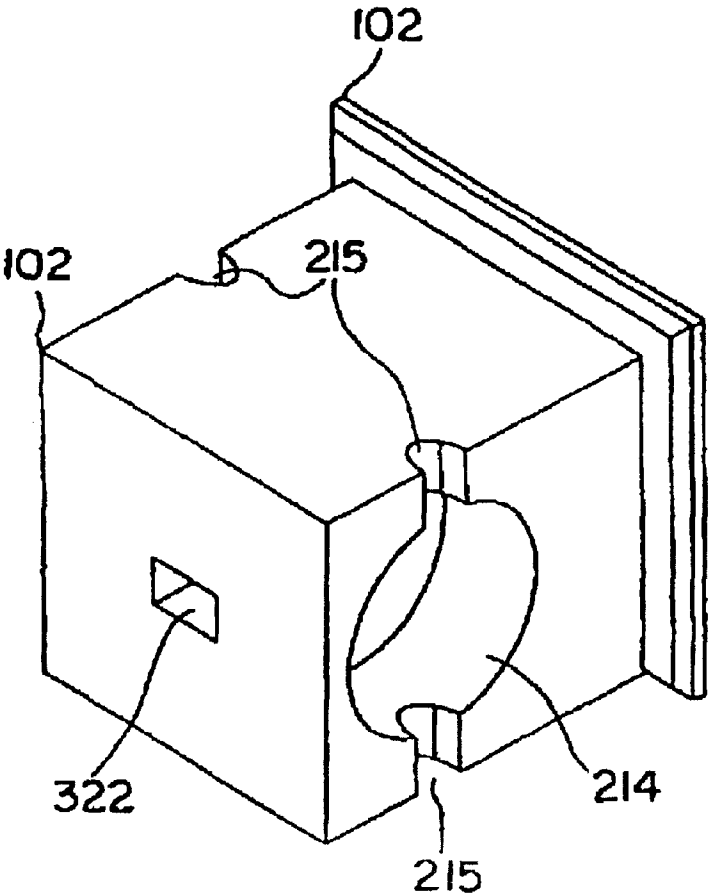
FIG. 3D is a back side perspective view from the right of the optic block for the first embodiment of the invention.
Figure 3E:
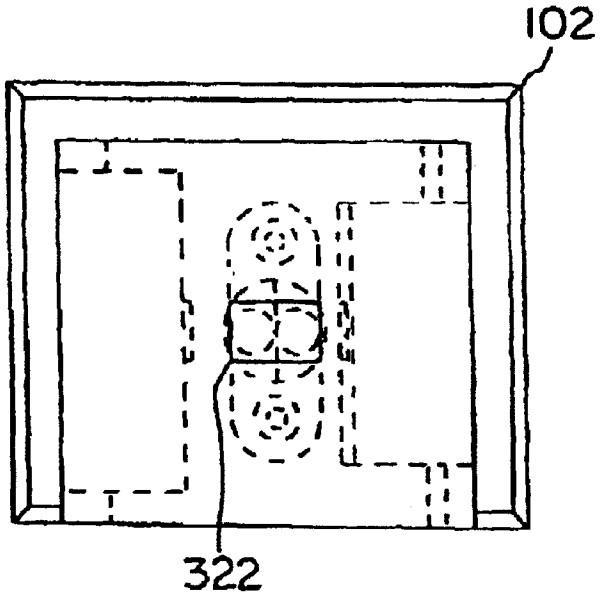
FIG. 3E is a back view of the optic block for the first embodiment of the invention.

FIG. 3D is a back side perspective view from the right of the optical block 102. The back side of the optical block 102 includes a cavity 322 that is used to form the shape of the reflective surfaces 124–125 during manufacturing of the optical block 102. FIG. 3E is a back view of the optic block illustrating the opening into the cavity 322.

Figure 3G:
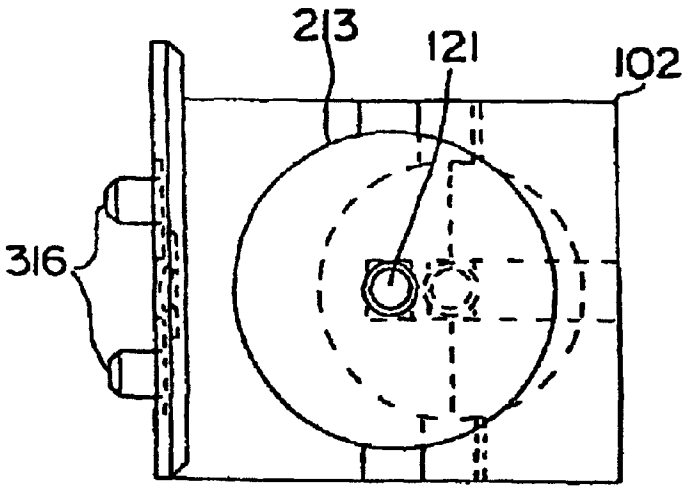
FIG. 3G is a left side view of the optic block for the first embodiment of the invention.

FIG. 3F illustrates the right side of the optical block 102 which has the opening 214 to mate with the type of housing of the transmitter 110. The lens 123 can be viewed near the center of the opening 214. FIG. 3G illustrates the left side of the optical block 102. which has the opening 213 to mate with the type of housing of the receiver 111. The lens 121 can be viewed near the center of the opening 213. Comparing FIGS. 3F and 3G, the offset between openings 213 and 214 to avoid optical crosstalk is visible. In the preferred embodiment, receiver 111 is closer to the optical opening 317 in order to minimize the loss of incoming received optical power. However, the position of receiver 111 and transmitter 110 can be interchanged. FIG. 3H is a cross-sectional view of the optical block 102 illustrating the relative position of the optical block alignment posts 316. The area 324 surrounding the alignment post 316 is magnified in FIG. 3I. FIG. 3I provides a magnified cross-sectional view of the alignment post 316.

Figure 4:
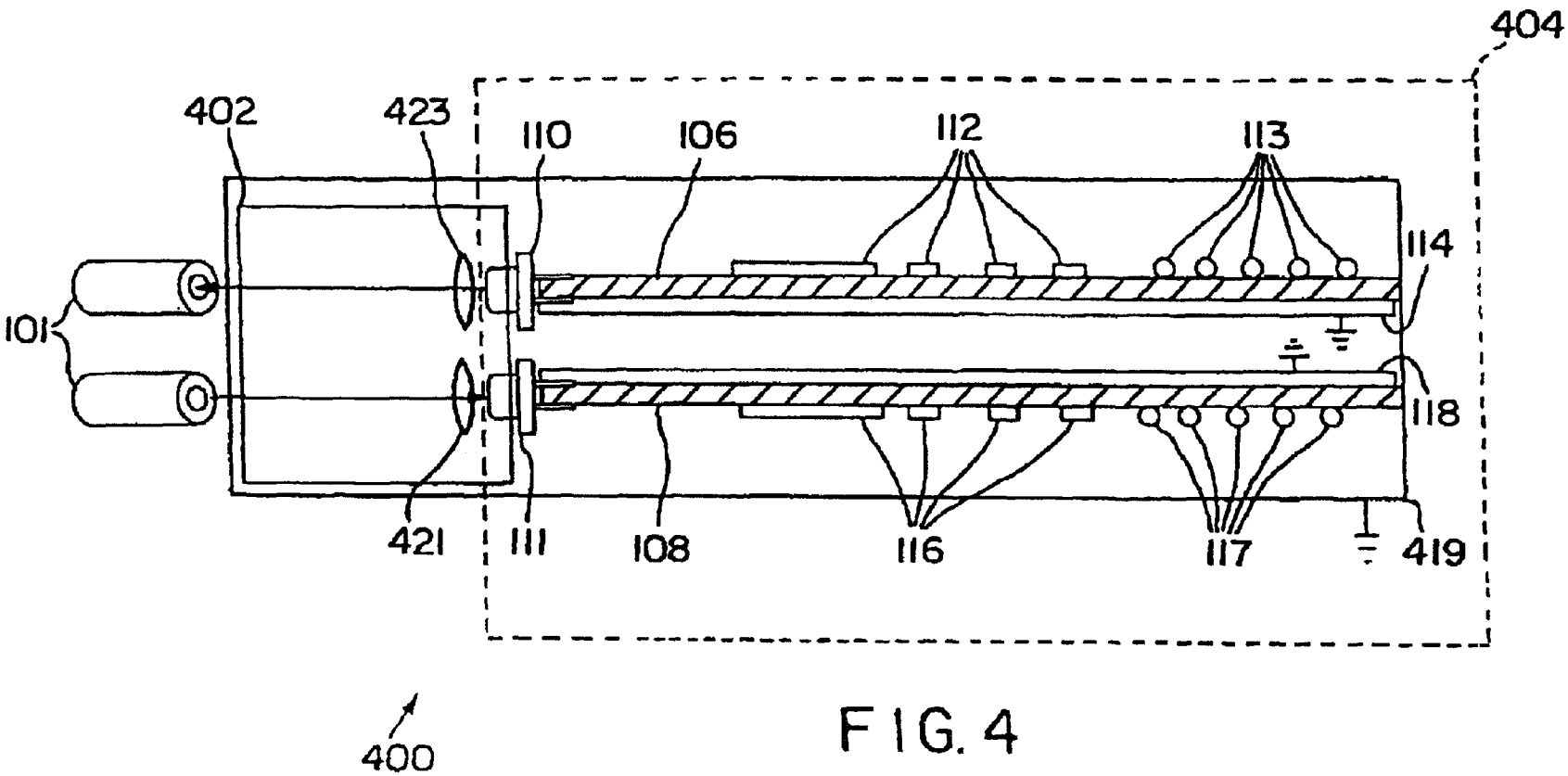
FIG. 4 is a simplified top cutaway view of another embodiment of the invention.

FIG. 4 illustrates another embodiment of the invention. To couple to the optical fibers 101, a fiber optic module 400 includes an optical block 402 and electrical elements 404. The optical block 402 may also be referred to as a nose, an optical port, an alignment block, an optical connector, an optical receptacle or receptacle. The optical block 402 can interface to an optical connector such as an LC, MT-RJ or VF-45 optical connector. Electrical elements 404 include transmitter PCB 106, receiver PCB 108, light receiver 111, light transmitter 110, and a shielded housing or cover 419. Shielded housing or cover 419 may be narrower than shielded housing or cover 119 due to receiver 111 and transmitter 110 being parallel with the PCBs 108 and 106. The optical or alignment block 402 may include lens 423 and lens 421 for coupling light or photons into and out of the fiber optic cable 101. Alternatively the lens 423 and 421 may be coupled to the receiver 111 and transmitter 110. Lens 423 and 421 may be spherical lenses or each may be a pair of aspheric lenses on the same optical axis. Light or photons emitted by the transmitter 110 are collected and focused by lens 423 into a transmit fiber optic cable. Light or photons on a receive fiber optic cable are collected and focused by lens 421 into the receiver 111. In this manner, fiber optic module 400 preferably keeps light or photons substantially in parallel and does not have to reflect the light or photons to couple it with receiver 111 or transmitter 110.

Figure 5A:
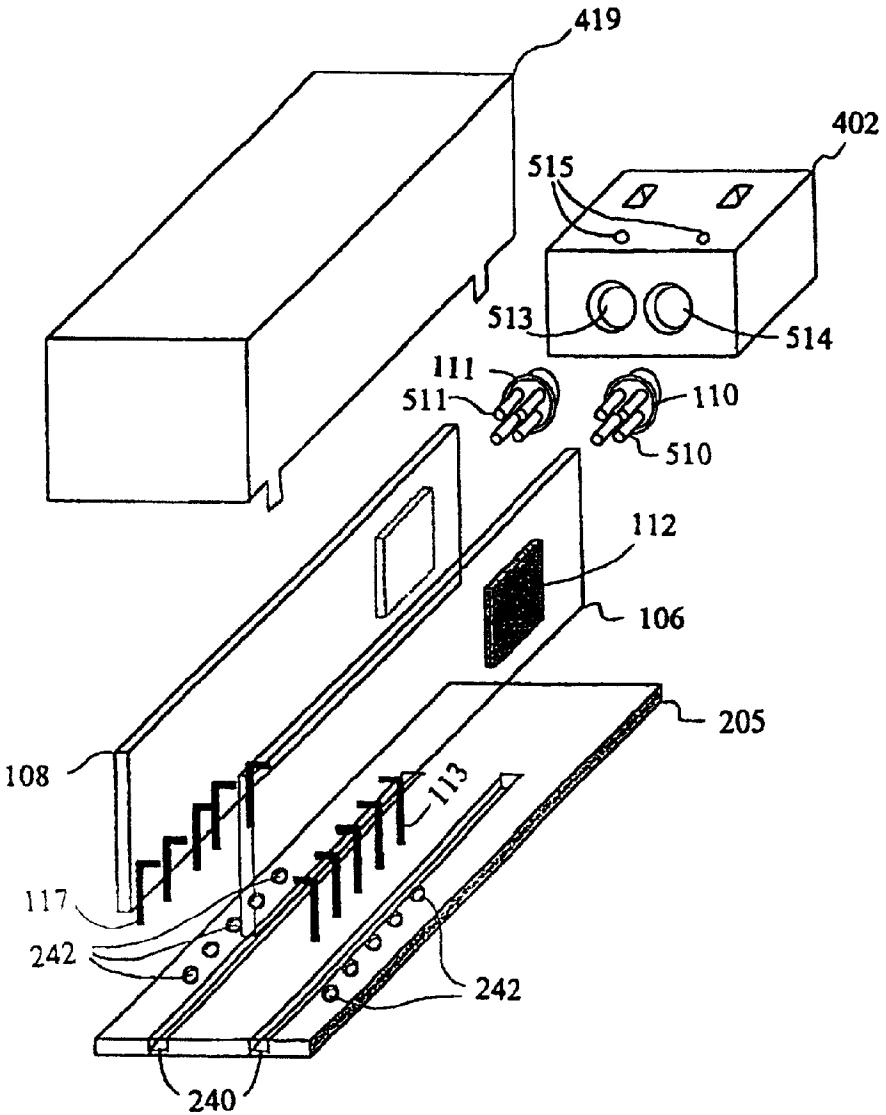
FIG. 5A is an exploded view of the embodiment of the invention of FIG. 4.

FIG. 5A illustrates an exploded diagram of the fiber optic module 400. Fiber optic module 400 is assembled similar to fiber optic module 100 as previously described with reference to FIG. 2. However, optical or alignment block 402 differs from optical block 102. Receiver 111 and transmitter 110 are inserted into openings 513 and 514 respectively in the optical or alignment block 402. The receiver and transmitter may be held in place by a press fit or glued in place. To glue in place, an epoxy or glue is injected in top and bottom tacking holes 515 of the optical or alignment block 402 while the receiver 111 and transmitter 110 are tested and aligned to substantially couple light or photons into and out of fiber optic cables. After the epoxy is set and the receiver and transmitter are substantially fixed in the optical block 102, the transmit PCB 106 and the receive PCB 108 are coupled respectively to the transmitter 110 and the receiver 111. The terminals 511 and 510 of the receiver 111 and the transmitter 110 respectively are soldered directly onto the PCB. The high frequency pins associated with the receiver 111 and transmitter 110 are preferably soldered on the component side of the printed circuit boards in order to provide proper shielding. The alignment plate 201, the nose 202 and the nose shielding 203 are unnecessary in this embodiment of the invention. Fiber ferrules are utilized instead for alignment between the optical or alignment block 402 and the optical fibers 101.

Figure 5B:
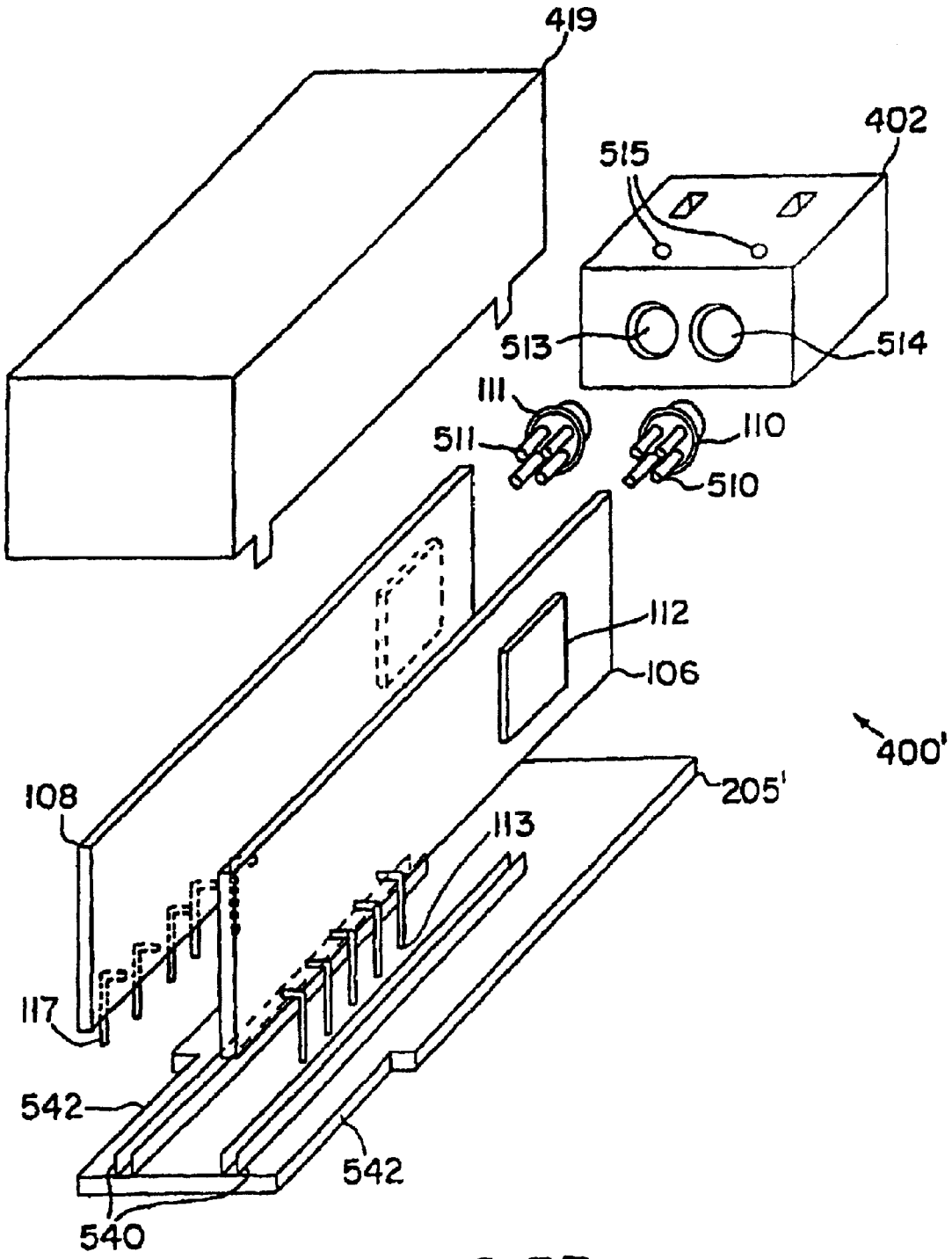
FIG. 5B is an exploded view of an alternate embodiment of the invention of FIG. 4.

Referring now to FIG. 5B, an exploded view of a fiber optic module 400' is illustrated. Fiber optic module 400' is assembled similar to fiber optic module 400 as previously described with reference to FIG. 5A but a different base 205' is utilized. The base 205' differs from base 205 in that it has a pair of guide rails 540 to hold the PCBs 106 and 108 in place and a pair of cutouts or open slots 542 for the pins 113 and 117 to extend through. In this manner, the PCBs 106 and 108 may slide into place onto the base 205'.

Figure 5C:
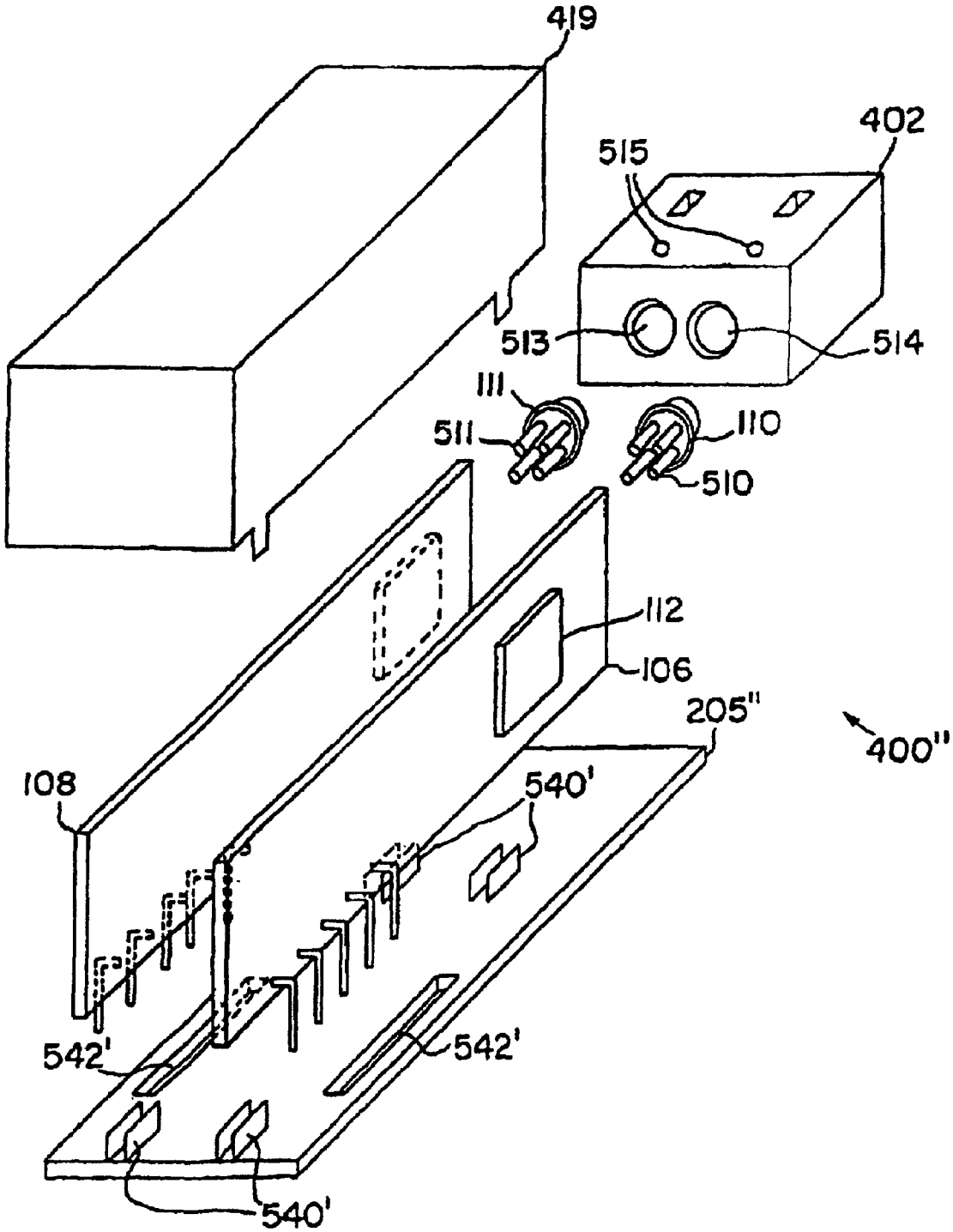
FIG. 5C is an exploded view of another alternate embodiment of the invention of FIG. 4.

Referring now to FIG. 5C, an exploded view of a fiber optic module 400" is illustrated. Fiber optic module 400" is assembled similar to fiber optic module 400 as previously described with reference to FIG. 5A but a different base 205" is utilized. The base 205" differs from base 205 in that it has pairs of mounting brackets 540' to hold the PCBs 106 and 108 in place and a pair of openings 542' for the pins 113 and 117 to extend through.

Figure 5D:
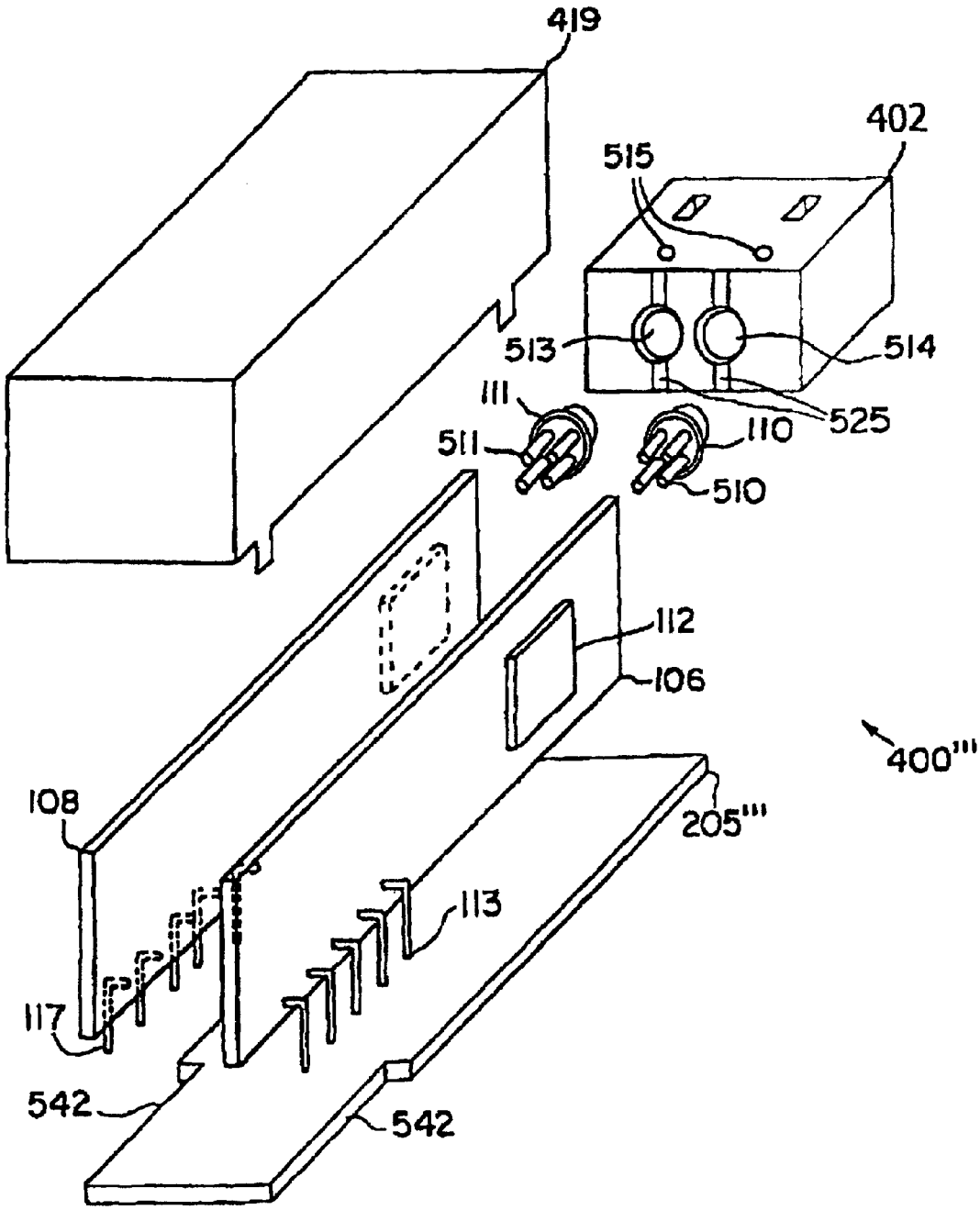
FIG. 5D is an exploded view of another alternate embodiment of the invention of FIG. 4.

The PCB slots 240, guide rails 540 or brackets 540' can be replaced by slots, brackets or guide rails of the optical block 402 to align the PCBs thereto. Additionally, it is to be understood that alternate bases may be formed by combining the elements of the bases 205, 205', and 205" in different ways. For example, refer to FIG. 5D. FIG. 5D illustrates an exploded view of a fiber optic module 400'''. Fiber optic module 400''' is assembled similar to fiber optic module 400 as previously described with reference to FIG. 5A but a different base 205''' is utilized and a slightly different optical block 502 is utilized. The base 205''' differs from base 205 in that there are no slots 240 and that there are a pair of cutouts or open slots 542 for the pins 113 and 117 to extend through. The optical block 502 differs from the optical block 402 in that a pair of slots 525 are provided to align the PCBs 106 and 108 with the optical block.

Figure 6A:
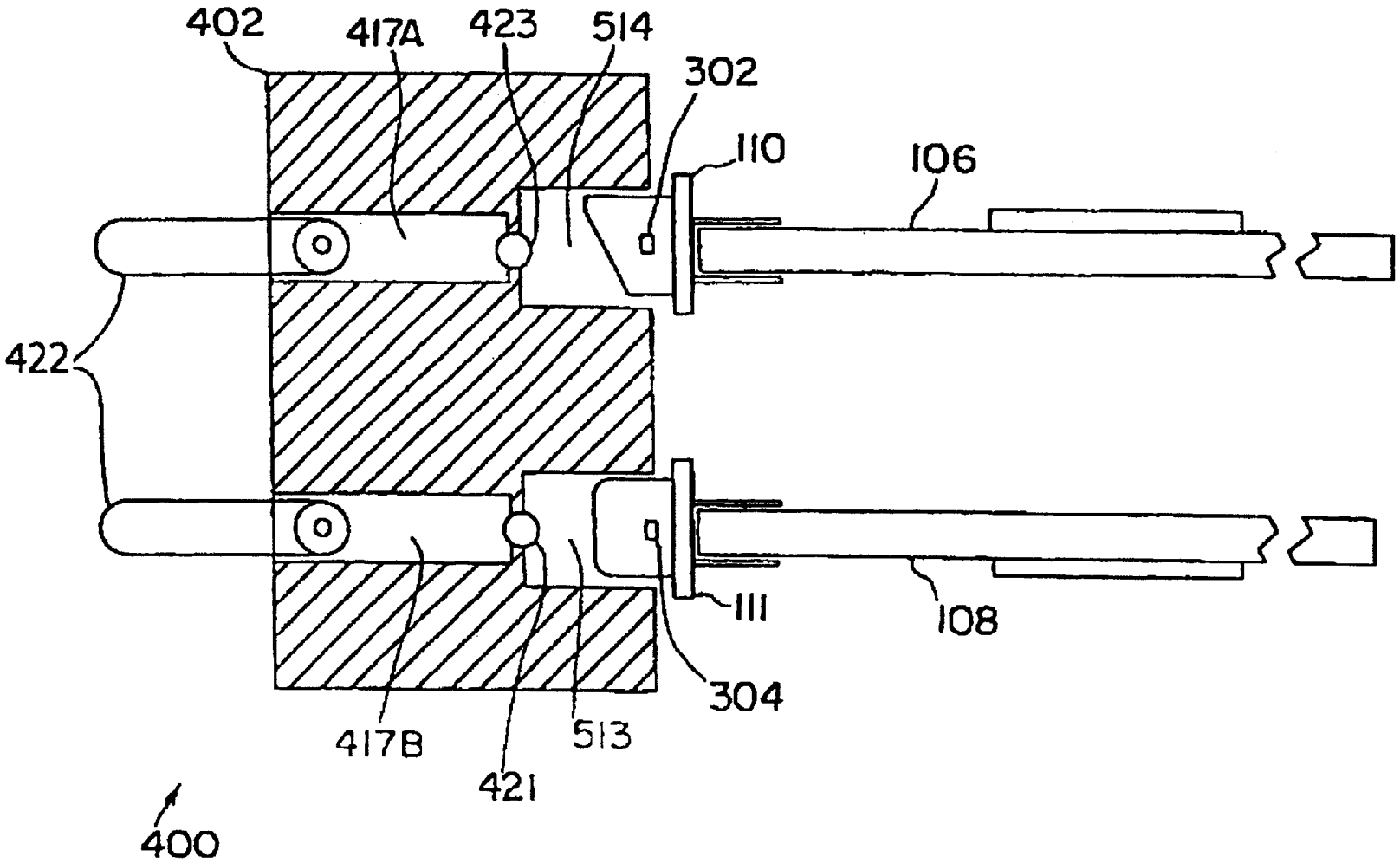
FIG. 6A is a cross-sectional view from the top of the optic block for embodiments of the invention.

Referring now to FIG. 6A, a cross-sectional view of the optical or alignment block 402 for the second embodiment is illustrated. The transmitter 110 and the receiver 111 are coupled to the optical or alignment block 402. The transmitter 110 includes an emitter 302 for generation of light or photons. The receiver 111 includes a detector 304 to receive light or photons. Light or photons emitted by the emitter 302 are coupled into lens 423, collected and focused into the optical fiber through the optical port 417A. Light or photons, incident from a fiber optic cable coupled to the fiber optic module 400, is received through the optical port 417B. Photons from the fiber optic cable are incident upon the lens 421. Lens 421 collects and focuses the incident light or photons from the fiber optic cable onto the detector 304 of the receiver 111. In order to keep the optical fibers 101 in alignment with the optical or alignment block 402, a pair of fiber ferrules 421 are provided. The fiber ferrules 421 are inserted into the optical ports 417A and 417B.

Figure 6D:
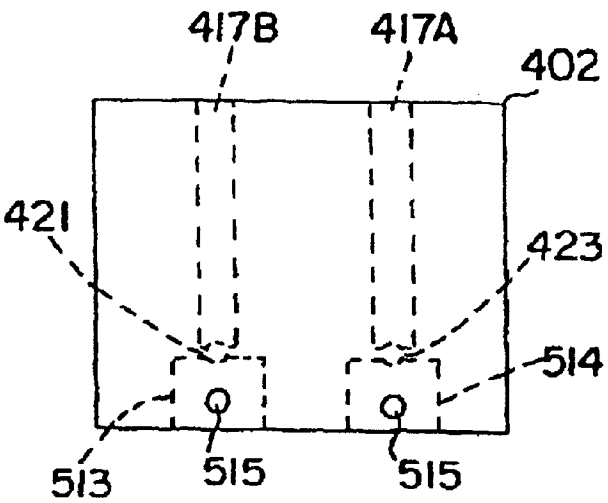
FIG. 6D is a top side view of the optic block for the embodiments of the invention.
Figure 6B:
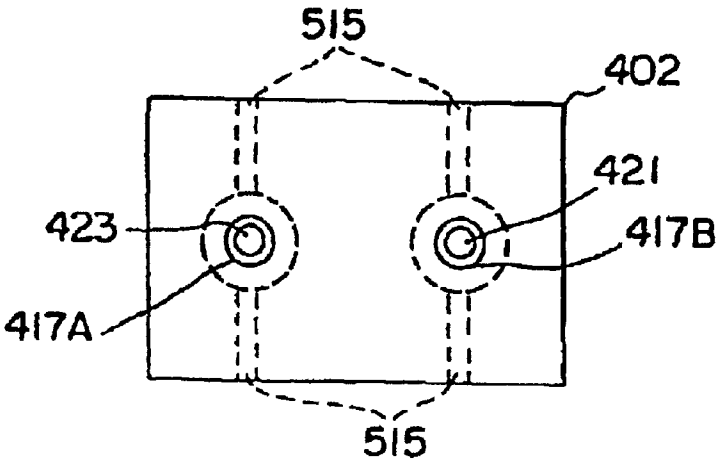
FIG. 6B is a front side view of the optic block for the embodiments of the invention.
Figure 6C:
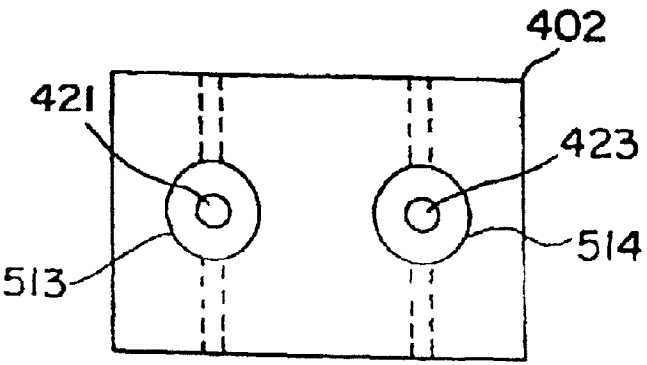
FIG. 6C is a back side view of the optic block for the embodiments of the invention.

FIG. 6B illustrates the front side of the optical or alignment block 402. The front side of the optical or alignment block 402 includes optical output ports 417A and 417B. In FIG. 6B, the lens 421 is visible through the optical output port 417B and lens 423 is visible through the optical output port 417A. FIG. 6C is an illustration of the back side of the optical or alignment block 402. In FIG. 6C, the lens 421 is visible through opening 513 and lens 423 is visible through opening 514. FIG. 6D illustrates the top side of the optical or alignment block 402 which has the tacking holes 515 coupling to the openings 513 and 514. Epoxy may be inserted into the top and bottom tacking holes 515 to hold the transmitter 110 and receiver 111 in position in the optical or alignment block 402.

Figure 7A:
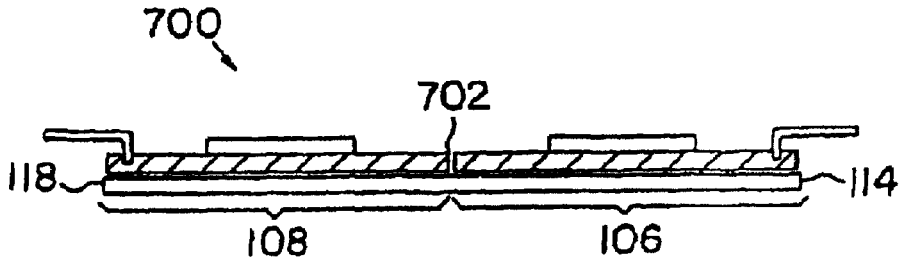
FIG. 7A is a top view of a manufacturing step of the invention.
Figure 7B:
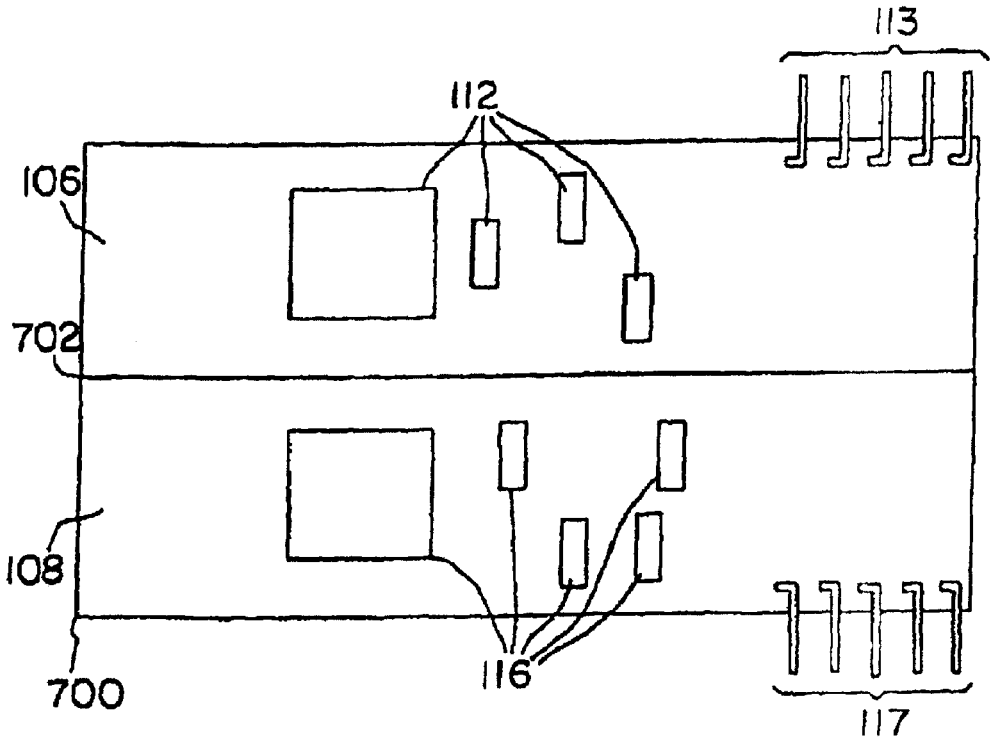
FIG. 7B is a side view of a manufacturing step of the invention.

Referring now to FIGS. 7A–7B, final steps of the assembly of printed circuit boards 106 and 108 are illustrated. Transmit PCB 106 and receive PCB 108 are assembled as one unit on one printed circuit board 700 with a center score 702 defining a boundary line between transmit and receive components. After all components have been attached and assembled onto the unitary PCB 700, the PCB 700 is flexed along the score 702 such that the transmit PCB 106 and the receive PCB 108 may be separated. Transmit PCB 106 and the receive PCB 108 may thereafter be assembled as part of the fiber optic module 100 and the fiber optic module 400. The transmit PCB 106 and the receive PCB 108 may each be approximately 6.5 mm in height excluding pins 113 and 117.

Figure 8A:
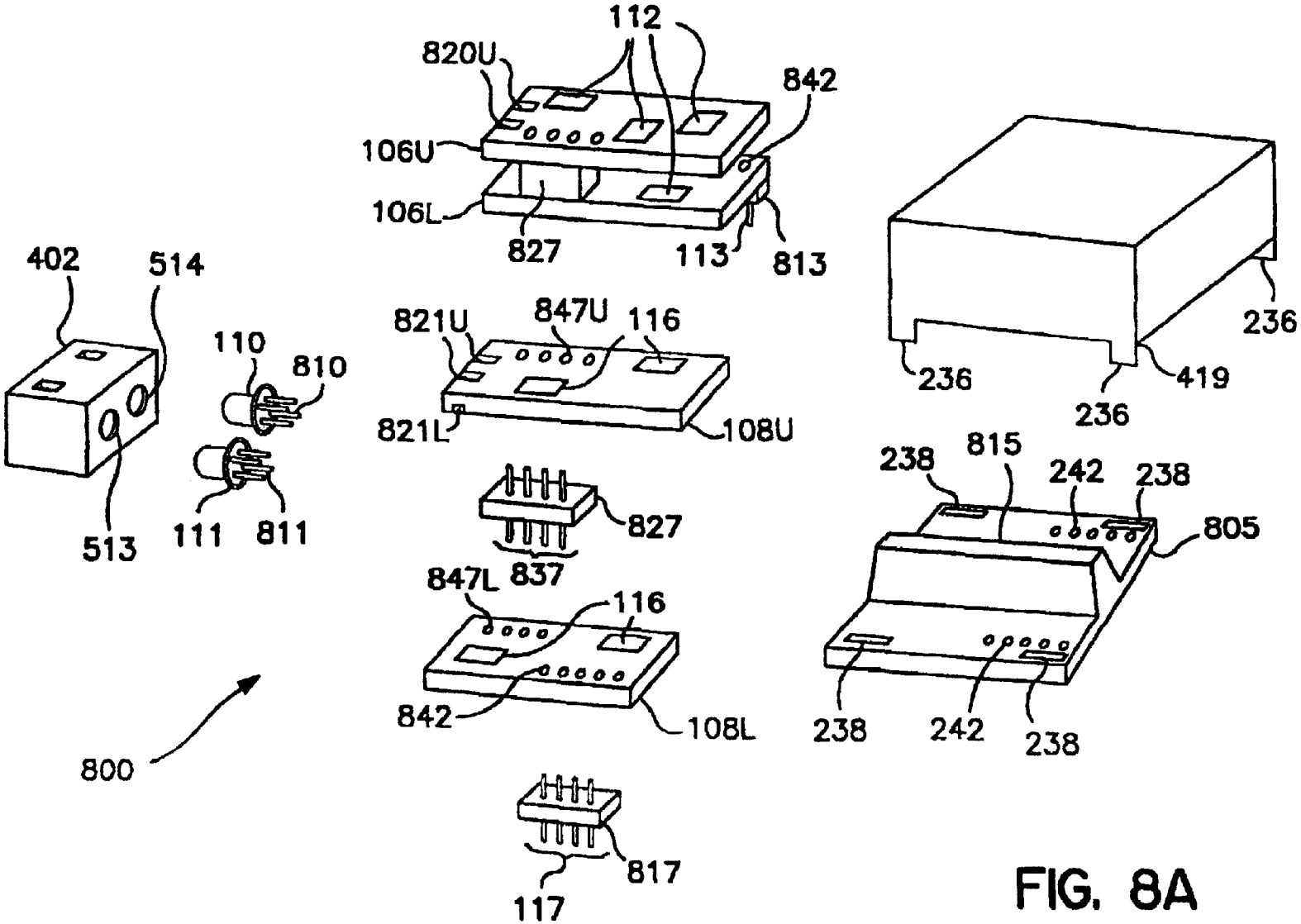
FIG. 8A is an exploded view of another embodiment of the invention.

Referring now to FIG. 8A, another embodiment of the invention is illustrated. FIG. 8A illustrates an exploded view of a fiber optic module 800. The fiber optic module 800 includes an upper transmit PCB 106U, a lower transmit PCB 106L, an upper receive PCB 108U, a lower receive PCB 108L, the transmitter 110, the receiver 111, the optical block 402, the shielded housing or cover 419, a first and second PCB interconnect pin headers 827, a first terminal pin header 823 for the transmitter, a second terminal pin header 817 for the receiver, and a baseplate 805.

The transmitter 110 is a transmit optical subassembly (Tx OSA) that includes a VCSEL or other semiconductor device that transduces electrical signals into photons or a light output. The receiver 111 is a receive optical subassembly (Rx OSA) including a PIN diode or other device that converts photons or light input into electrical signals. The Tx OSA and Rx OSA are attached to physically separated transmit and receive electrical subassemblies (ESA's). In one embodiment, the transmit ESA includes an upper and lower transmit PCBs 106U and 106L with components 116 mounted thereto. In one embodiment, the receive ESA includes an upper and lower receive PCBs 108U and 108L with components 112 mounted thereto.

The lower transmit PCB 106L and the upper transmit PCB 106U provide similar functionality to that of the transmit PCB 106 and include components 112. The lower receive PCB 108L and the upper receive PCB 108U provide similar functionality to that of the receive PCB 108 and include components 116. The upper and lower transmit PCBs 106U and 106L are parallel to each other in a horizontal plane and parallel with the optical axis of the transmitter 110. The upper and lower receive PCBs 108U and 108L are parallel to each other in a horizontal plane and parallel with the optical axis of the receiver 111. This configuration of parallel horizontal boards for each of the transmit and receive capability can be referred to as dual-stack horizontal modular PCBs.

The first and second pin interconnect headers 827 include the conductive signal pins 837 molded into a non-conductive medium. The first and second pin interconnect headers 827 are used to interconnect lower and upper PCB's. The first pin header 827 provides signal interconnection between the upper and lower transmit PCBs 106U and 106L. The first pin header 827 provides signal interconnection between the upper and lower transmit PCBs 106U and 106L. The second pin header 827 provides signal interconnection between the upper and lower receive PCBs 108U and 108L. The second pin header 827 has pins 837 that couple into upper through-holes 847U in the upper receive PCB 108U and lower through holes 847L in the lower receive PCB 108L. The first pin header 827 similarly has pins 837 that couple into upper and lower throughholes in the upper and lower transmit PCBs 106U and 106L respectively.

The first and second terminal pin headers 817 and 813 include conductive signal pins molded into a non-conductive medium. The first and second terminal pin headers 817 and 813 are used to route electrical signals to and from the fiber optic module 800 to a host system. The first terminal pin header 813 has pins 113 that couple to through holes 842 in the lower transmit PCB 106L. Similarly, the second terminal pin header 817 has pins 117 that couple to through holes 842 in the lower receive PCB 108L.

The transmitter 110 couples to the upper transmit PCB 106U in one embodiment. The terminals 810 of the transmitter 110 couple to the upper transmit PCB 106U in one embodiment. Using a straddle mount, one or more terminals couple to upper edge traces 820U on a top side of the upper transmit PCB 106U and one or more terminals couple to lower edge traces 820L on a back side of the upper transmit PCB 106U. In a straddle mount, the optoelectronic device (i.e. the transmitter 110 or the receiver 111) has its optical axis nearly in-line and parallel with a plane of the printed circuit board. In an alternate embodiment, the terminals 810 may couple to the lower transmit PCB 106U. In another alternate embodiment, the terminals 810 may couple between the upper and lower receive PCBs so that one or more couple to the upper PCB and one or more couple to the lower PCB. In yet another alternate embodiment using a through hole mount, the terminals 810 may couple into holes of the upper or lower transmit PCBs or both upper and lower transmit PCBs. In a through hole mount, the optoelectronic device (i.e. the transmitter 110 or the receiver 111) has its optical axis nearly parallel with a plane of the printed circuit board.

The receiver 111 couples to the upper receive PCB 108U in one embodiment. The terminals 811 of the receiver 111 couple to the upper receive PCB 108U in one embodiment. Using a straddle mount, one or more terminals couple to upper edge traces 821U on a top side of the upper receive PCB 108U and one or more terminals couple to lower edge traces 821L on a back side of the upper receive PCB 108U. In an alternate embodiment, the terminals 811 may couple to the lower receive PCB 108U. In another terminal embodiment, the terminals 811 may couple between the upper and lower receive PCBs so that one or more couple to the upper PCB and one or more couple to the lower PCB. In yet another alternate embodiment, the terminals 811 may couple into holes of the upper or lower receive PCBs or both upper and lower receive PCBs.

Included with the fiber optic module 800 is a baseplate 805. The baseplate 805 may include an inner septum 815 that divides the transceiver and receiver into two separate cavities, for EMI and electrical isolation of the transmitter from the receiver or between channels. The baseplate 805 acts like a chassis or frame to provide support for the shielded housing or cover 419 and the receiver and transmit subassemblies. The baseplate 805 may include an inner septum 815, one or more openings 242 to receive the pins 113 and 117, and one or more clip openings or slots 238 to receive the clips or tabs 236. The baseplate 805 in one embodiment is plastic in other embodiments that baseplate may be metal or a metalized plastic to provide shielding. The inner septum 815 provides separation between the transmitter and the receiver or between channels.

Figure 8B:
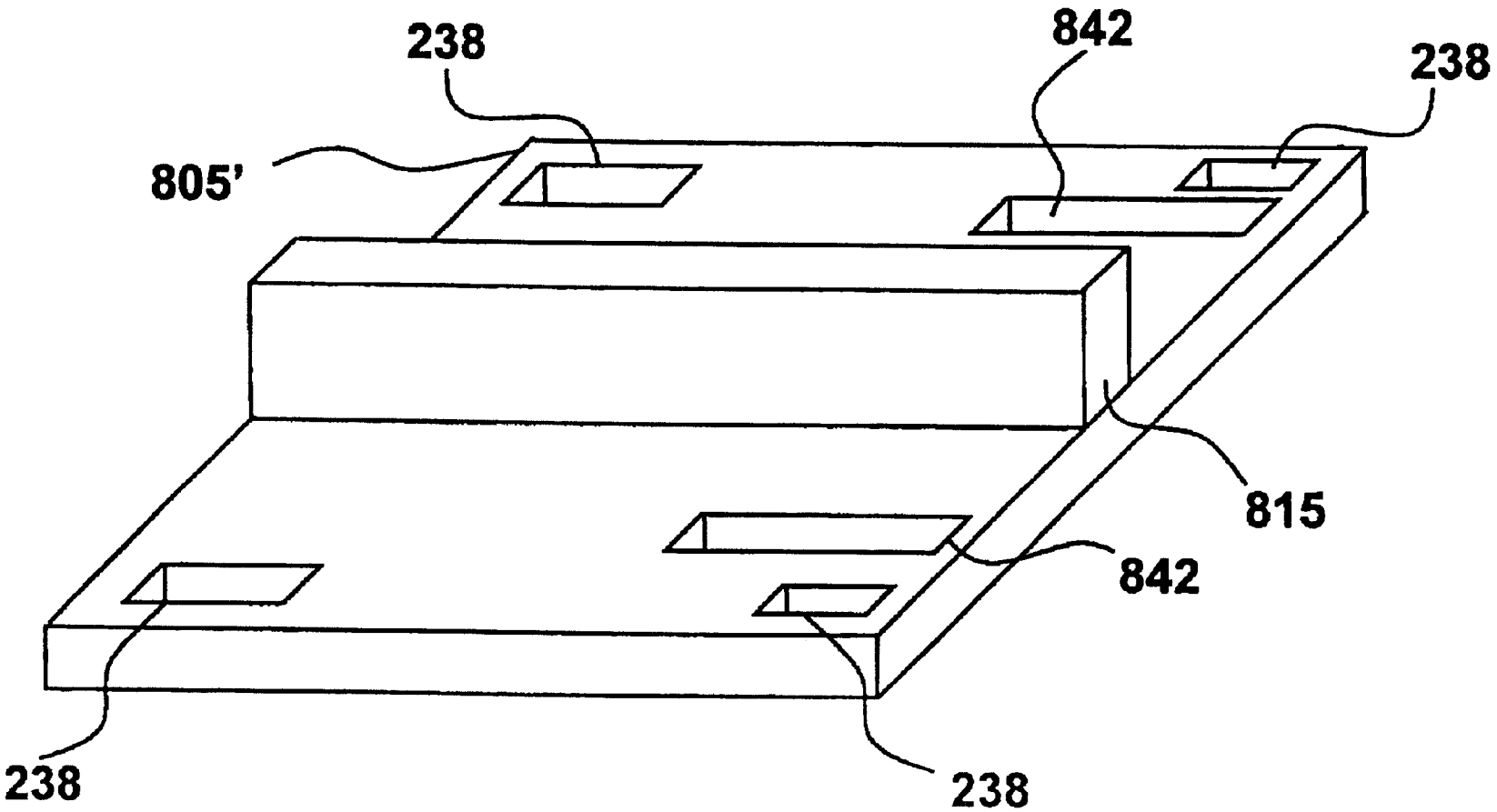
FIG. 8B is perspective view of an alternate baseplate for embodiments of the invention.

Referring now to FIG. 8B, an alternate baseplate 805' is illustrated. Baseplate 805' differs from baseplate 805 in that it includes slots 842 for pins 113 and 117. Baseplate 805' may similarly include clip openings or slots 238 and the inner septum 815.

Figure 8C:
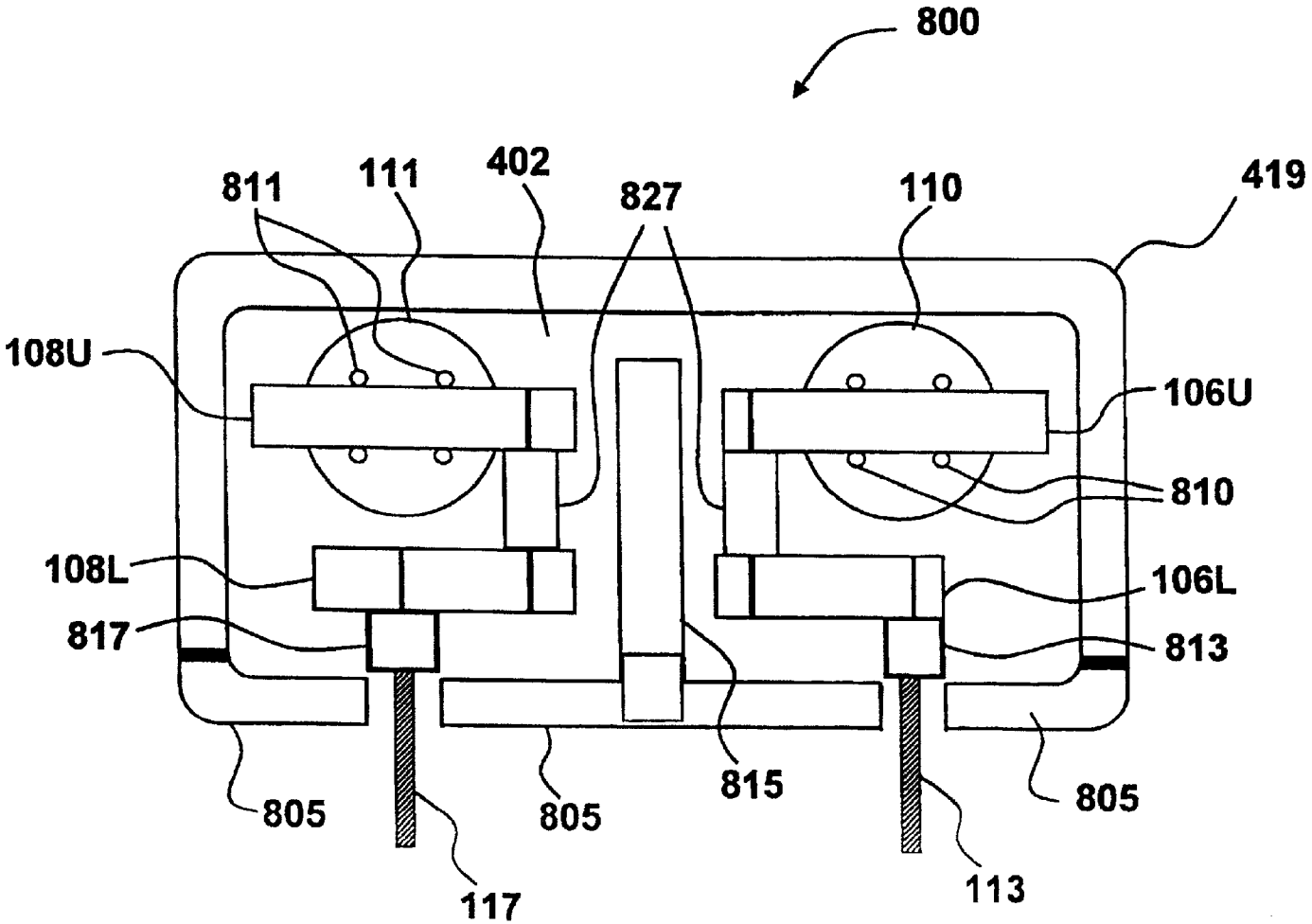
FIG. 8C is a rear cross sectional view of the assembled invention illustrated in FIG. 8A.

Referring now to FIG. 8C, a rear cross sectional view of the assembled fiber optic module 800 is illustrated. The baseplate 805 with the inner septum 815 can divide the fiber optic module 800 into two separate cavities. The separate cavities can improve EMI and electrical isolation of the transmitter from the receiver. The receiver 111 couples to the upper receive PCB 108U with its terminals 811 using a straddle mount in one embodiment. The transmitter 111 couples to the upper transmit PCB 106U with its terminals 810 using a straddle mount in one embodiment.

In FIG. 8C, the upper and lower transmit PCBs 106U and 106L are parallel to each other in a horizontal plane and parallel with the optical axis of the transmitter 110. The upper and lower receive PCBs 108U and 108L are parallel to each other in a horizontal plane and parallel with the optical axis of the receiver 111. This configuration of parallel horizontal boards for each channel can be referred to as dual-stack horizontal modular PCBs. The dual stacked horizontal PCB's allow an increase in component surface mounting area for a given volume. Both sides of the upper and lower transmit and receive PCB's can be utilized to mount electronic components. This increased surface area can provide increased functionality in a fiber optic module by allowing additional components such as integrated circuits and passive components such as filters, capacitors, and inductors to be utilized.

Figure 9A:
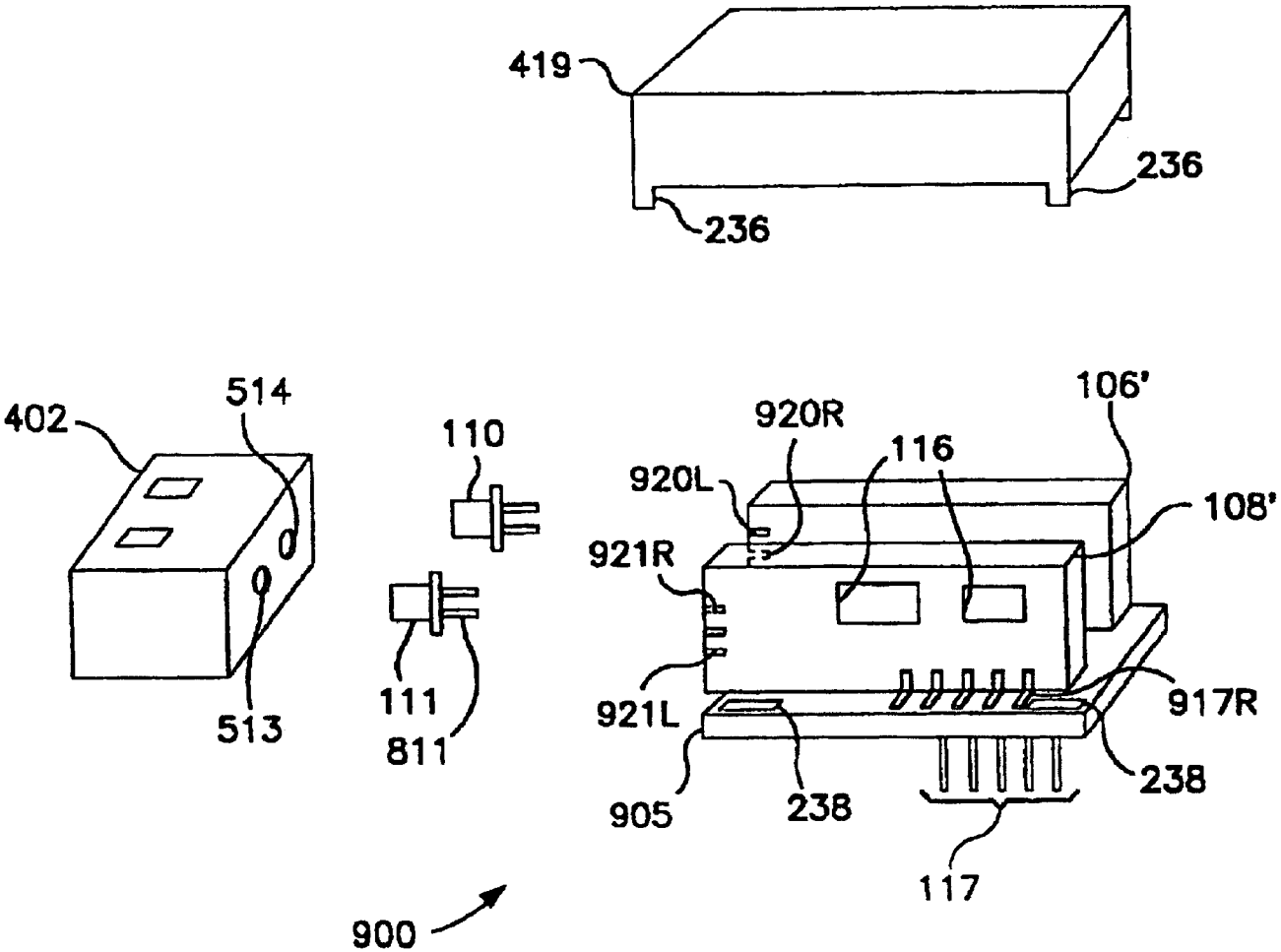
FIG. 9A is an exploded view of another embodiment of the invention.

Referring now to FIG. 9A, another embodiment of the invention is illustrated. FIG. 9A illustrates an exploded view of a fiber optic module 900. The fiber optic module 900 utilizes a motherboard which is common to daughtercards PCBs which are substantially perpendicular to the motherboard. Assuming the motherboard is horizontal, the daughtercard PCBs are substantially vertical to the motherboard and can be also be referred to as vertical PCBs. The substantially vertical PCB's couple to the common motherboard.

The fiber optic module 900 includes a vertical transmit PCB 106' and a vertical receive PCB 108' in parallel coupled to a horizontal motherboard PCB 905. The motherboard PCB 905 can separate ground and power planes between receiver and transmitter channels in order to maximize isolation and minimize cross talk. The vertical transmit PCB and the vertical receive PCB may have traces soldered to traces of the motherboard for electrical connectivity or otherwise include pins that plugged into holes or sockets of the motherboard to ease replacement or to expand the number of transmit or receive channels with additional transmit PCBs or receive PCBs. Alternatively, the electrical connection between the vertical transmit PCB and the vertical receive PCB and motherboard PCB may be made with electrical connectors in lieu of solder joints. The mother board PCB includes Input/Output Pins (I/O Pins) or an I/O socket connector to couple to holes or a socket of a host system PCB to interface with a host system.

In order to further minimize the form factor of the fiber optic module 900, the vertical transmit PCB and the vertical receive PCB provides mounting surfaces for components on both the left and right side surfaces (or front and back surfaces). Additionally, a top surface of the motherboard PCB 905 may also be used to mount components or circuits for increased electrical functionality such as a clock/data recovery (CDR) function and minimize the form factor of the fiber optic module.

To minimize EMI and crosstalk between the vertical transmit PCB and the vertical receive PCB, an inner shield similar to the shield 109 may be used. Alternatively, one or both of the vertical transmit PCB and the vertical receive PCB may have a ground plane on of its left or right side surfaces (sometimes referred to as a backside ground plane).

The vertical PCBs 106' and 108' are similar to PCBs 106 and 108 but for the coupling to the horizontal motherboard PCB 905. The vertical PCBs 106' and 108' have signal traces soldered to signal traces of the horizontal motherboard PCB 905 which can also mechanically support the vertical PCBs 106' and 108'. Solder joints 917R couple the receive PCB 108' to the horizontal motherboard PCB 905. Solder joints 917T couple the transmit PCB 106' to the horizontal motherboard PCB 905 (see FIG. 9B). The fiber optic module 900 can be referred to as having vertical PCB's with a horizontal motherboard PCB.

The horizontal motherboard PCB 905 includes input/output (I/O) pins 113 and 117 to couple to a host system and wire traces to route power, ground and signals between the pins 113 and 117 and the vertical PCBs 106' and 108'.

The fiber optic module 900 further includes the transmitter 110, the receiver 111, the optical block 402, and the shielded housing or cover 419. The shielded housing or cover 419 has clips or tabs 236 that couple into clip openings or slots 238 in the motherboard PCB 905. The clips or tabs 236 can be held in place in the slots by a friction fit or glued in place or they may extend through the motherboard PCB 905 and be turned and or bent to couple the shielded housing or cover 419 and the motherboard PCB 905 together. Alternatively, the clips or tabs 236 of the shielded housing or cover 419 can wrap around the motherboard PCB 905 to couple them together.

The transmitter 110 couples into the opening 514 of the optical block 402. The receiver 111 couples into the opening 513 of the optical block. They are held in place by either a friction fit or a glue such as an epoxy.

The transmitter 110 couples to the transmit PCB 106'. The terminals 810 of the transmitter 110 couple to the transmit PCB 106'. In one embodiment using a straddle mount, one or more terminals 810 couple to left edge traces 920L on a left side and one or more terminals 810 couple to right edge traces 920R on a right side of the transmit PCB 106'. In alternate embodiment, the terminals 810 may couple to one side of the transmit PCB 106'. In yet another alternate embodiment, the terminals 810 may couple into holes of the transmit PCB 106'.

The receiver 111 couples to the receive PCB 108'. The terminals 811 of the receiver 111 couple to the receive PCB 108'. Using a straddle mount, one or more terminals 811 couple to left edge traces 921L on a left side and one or more terminals 811 couple to right edge traces 921R on a right side of the receive PCB 108'. In an alternate embodiment, the terminals 811 may couple to one side of the receive PCB 108'. In yet another alternate embodiment, the terminals 811 may couple into holes of the receive PCB 108'.

Figure 9B:
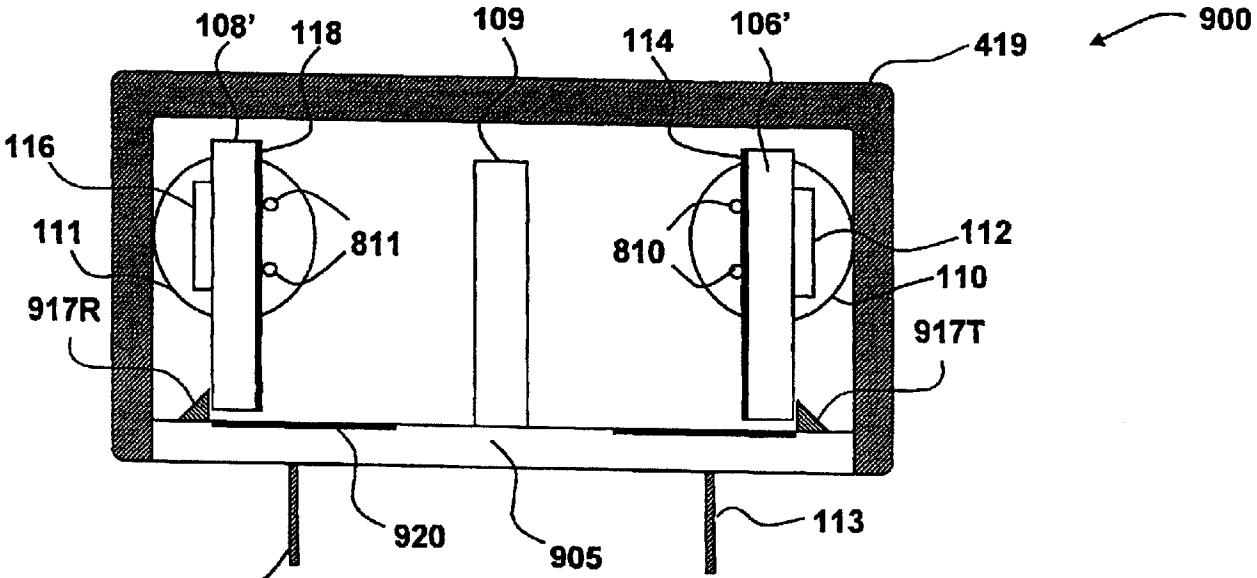
FIG. 9B is a rear cross sectional view of the assembled invention illustrated in FIG. 9A.
Figure 9C:
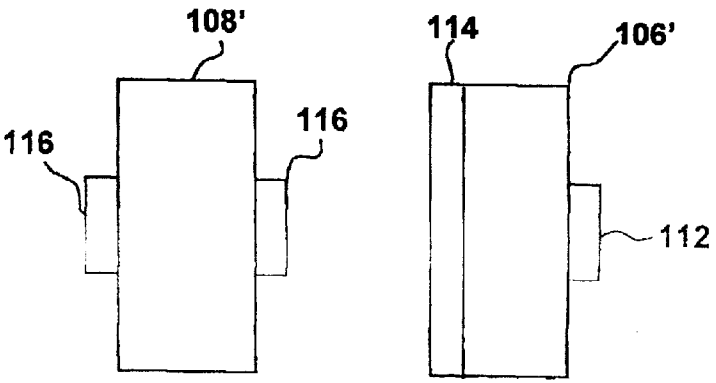
FIG. 9C illustrates an alternate embodiment of a single ground plane for a printed circuit board.
Figure 9D:
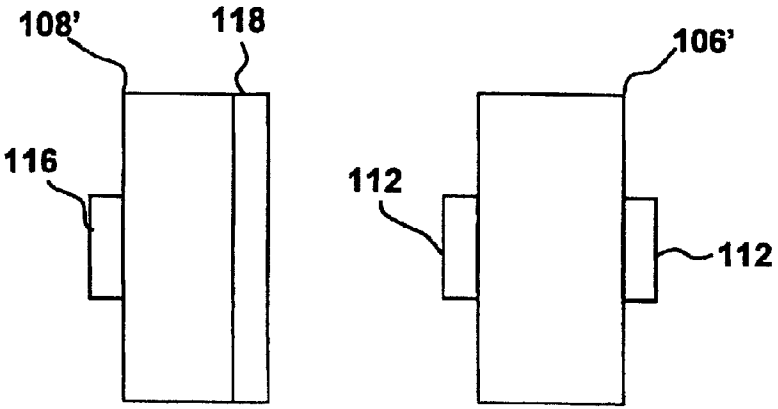
FIG. 9D illustrates an alternate embodiment of a single ground plane for a printed circuit board.
Figure 9E:
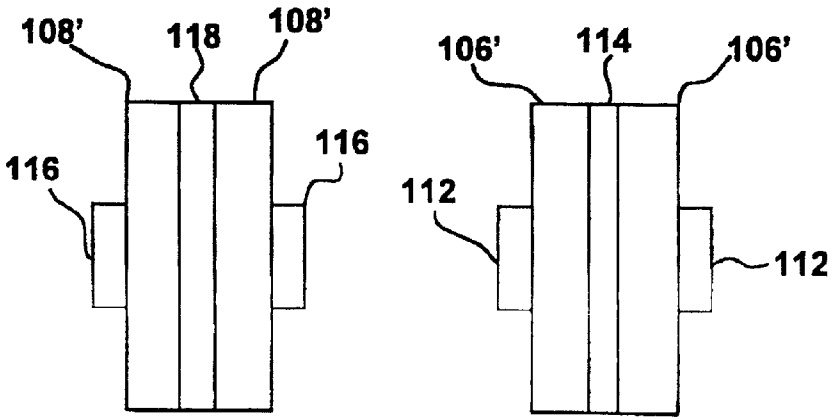
FIG. 9E illustrates an alternate embodiment of a ground plane sandwiched between layers in a multilayer printed circuit board.

Referring now to FIG. 9B, a rear cross-sectional view of the assembled fiber optic module 900 is illustrated. Traces 920 on the motherboard PCB route signals to components on the motherboard PCB, the I/O pins 113 and 117, and the solder joints 917R and 917T. A ground plane 118 can be coupled to a side the vertical receive PCB 108' or a ground plane 114 can be coupled to a side of the vertical transmit PCB 106' or both. Referring to FIG. 9C, the vertical transmit PCB 106' includes the ground plane 114 and the vertical receive PCB 108' is without a ground plane to allow room for added components 116 on each side; Referring to FIG. 9D, the vertical receive PCB 108' includes the ground plane 118 and the vertical transmit PCB 106' is without a ground plane to allow room for added components 112 on each side. An optional inner shield 109 can also be used for further isolation between channels to reduce cross-talk and EMI as illustrated in FIG. 9B. In any case, the ground plane 114 and 118 will have cutouts for traces to coupled to the terminals 810 and 811 and may have additional cutouts for components 112 or 116 as the case may be. Referring now to FIG. 9E, the ground plane 118 or the ground plane 114 may be alternatively sandwiched between layers of either the vertical receive PCB 108' or the vertical transmit PCB 106' or both as a part of a multilayer PCB as illustrated by FIG. 9C. This can allow for further components 116 and 112 to be added to both sides of the vertical receive PCB 108' and the vertical transmit PCB 106'.

Figure 10A:
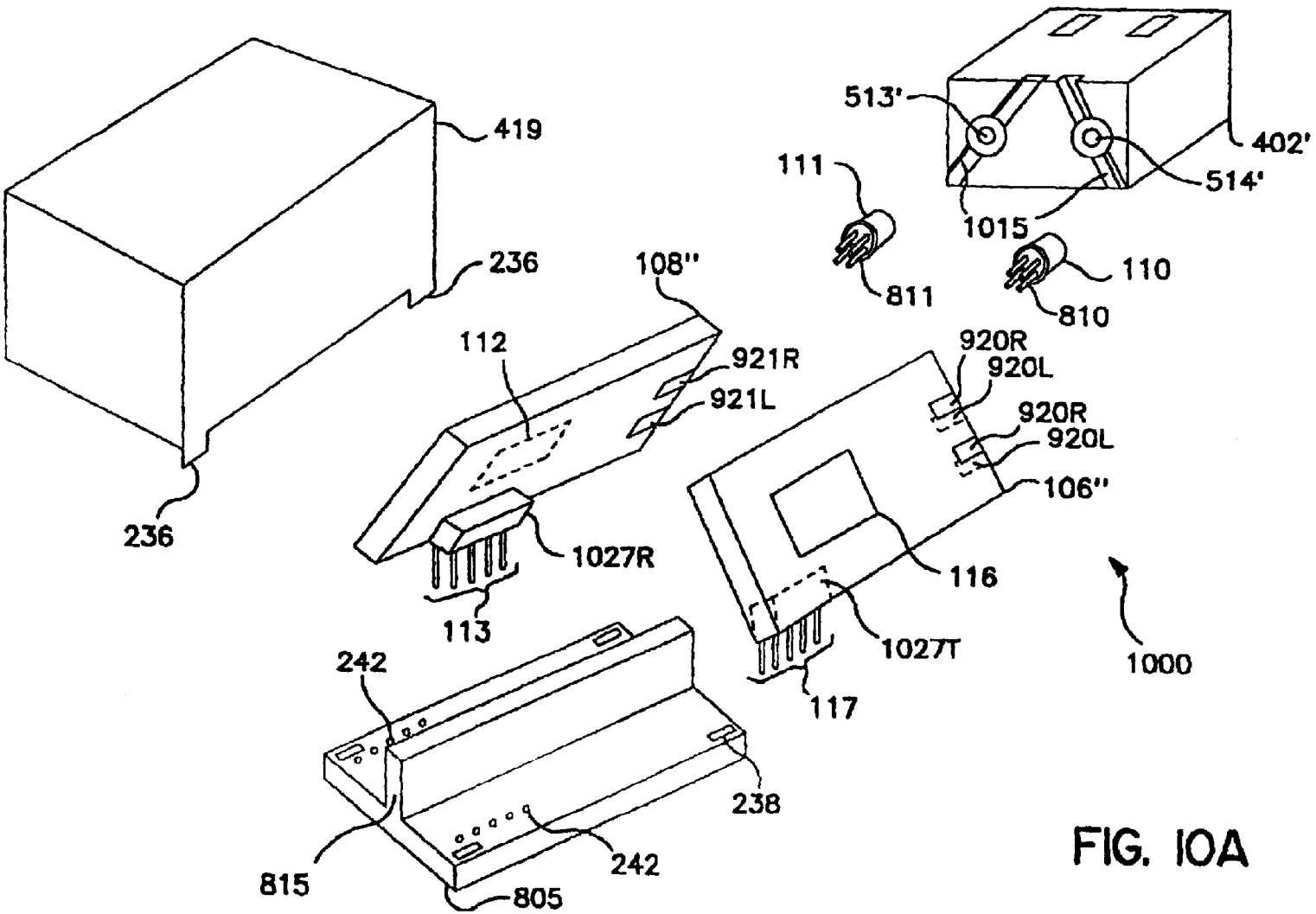
FIG. 10A is an exploded view of another embodiment of the invention.

Referring now to FIG. 10A, another embodiment of the invention is illustrated. FIG. 10A illustrates an exploded view of a fiber optic module 1000. The fiber optic module 1000 has angled PCBs with respect to a horizontal or vertical axis of the fiber optic module 1000. The length of the PCBs remain parallel to the optical axis of the receiver 111 and transmitter 110. By angling the PCBs with the horizontal or vertical axis, the PCBs may be made smaller to fit a smaller form factor or alternatively the surface area can be increased. That is the available PCB surface area for mounting components can be increased for a given volume by angling the PCBs. The increased surface area can give the final assembled fiber optic module increased functionality by allowing components such as integrated circuits and passive components such as filters, capacitors, and inductors to be added. More room can also be provided in the fiber optic module 1000 for mounting larger components by angling the PCBs.

The fiber optic module 1000 includes an angled transmit PCB 106", an angled receive PCB 108", the transmitter 110, the receiver 111, an optical block 402', the shielded housing or cover 419, a first terminal pin header 1027T for the transmitter, a second terminal pin header 1027R for the receiver, and the baseplate 805 or 805'.

The angled transmit PCB 106" and the angled receive PCB 108" are arranged within the fiber optic module at an angle with respect to the horizontal axis thereof as defined by a line normal to both receiver and transmitter optical axes. The angled transmit PCB 106" and the angled receive PCB 108" are held in place having a width that is on an angle with respect to a horizontal or vertical axis of the fiber optic module 1000. The length of the angled transmit PCB 106" and the angled receive PCB 108" are parallel to the optical axis of the receiver 111 and transmitter 110. The angled transmit PCB 106" includes components 116 and left and right edge traces 921L and 921R. The first terminal pin header 1027T has pins 117 that couple to holes of the angled transmit PCB 106" on one end. The angled receive PCB 108" includes components 112 and left and right edge traces 920L and 920R. The second terminal pin header 1027R has pins 113 that couple to holes of the angled receive PCB 108" on one end.

The transmitter 110 is a transmit optical subassembly (Tx OSA) that includes a VCSEL or other semiconductor device that transduces electrical signals into photons or a light output. The receiver 111 is a receive optical subassembly (Rx OSA) including a PIN diode or other device that converts photons or light input into electrical signals. The Tx OSA and Rx OSA are attached to physically separated transmit and receive electrical subassemblies (ESA's). In one embodiment, the transmit ESA includes the angled transmit PCB 106" with components 116 and the first terminal pin header 1027T mounted thereto. In one embodiment, the receive ESA includes the angled receive PCB 108" with components 112 and the second terminal pin header 1027R mounted thereto.

The optical block 402' is similar to the optical block 402 but has some modifications to accommodate the angled transmit PCB 106" and the angled receive PCB 108". The optical block 402' includes openings 513' and 514' to receive the receiver 111 and transmitter 110 respectively and angled slots 1015 to receive the angled transmit PCB 106" and the angled receive PCB 108". The angled slots 1015 can provide a friction fit with the angled transmit PCB 106" and the angled receive PCB 108" or glue or epoxy can be used to couple them together. The angled slots 1015 can also serve to tack the receiver 111 and transmitter 110 in place within the optical block 402'.

The transmitter 110 couples into the opening 514' of the optical block 402'. The receiver 111 couples into the opening 513' of the optical block 402'. They can be held in place by either a friction fit or a glue such as an epoxy.

The transmitter 110 also couples to the transmit PCB 106". The terminals 810 of the transmitter 110 couple to the transmit PCB 106" in one embodiment. Using a straddle mount, one or more terminals 810 couple to left edge traces 920L on a left side and one or more terminals 810 couple to right edge traces 920R on a right side of the transmit PCB 106". In an alternate embodiment, the terminals 810 may couple to one side of the transmit PCB 106". In yet another alternate embodiment, the terminals 810 may couple into holes of the transmit PCB 106".

The receiver 111 also couples to the receive PCB 108". The terminals 811 of the receiver 111 couple to the receive PCB 108". Using a straddle mount, one or more terminals 811 couple to left edge traces 921L on a left side and one or more terminals 811 couple to right edge traces 921R on a right side of the receive PCB 108". In an alternate embodiment, the terminals 811 may couple to one side of the receive PCB 108". In yet another alternate embodiment, the terminals 811 may couple into holes of the receive PCB 108".

Figure 10B:
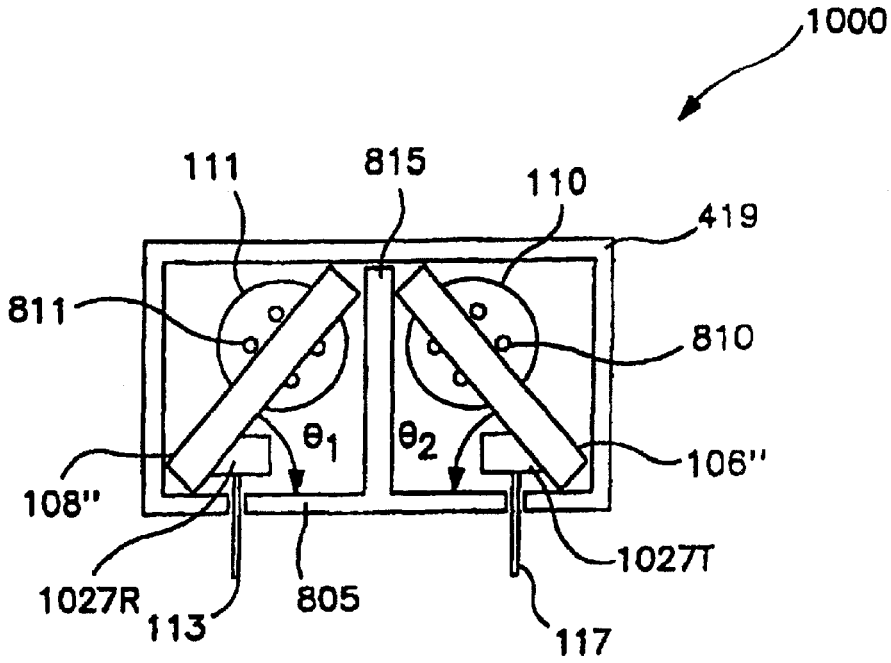
FIG. 10B is a rear cross sectional view of the assembled invention illustrated in FIG. 10A.

Referring now to FIG. 10B, a rear cross-sectional view of the assembled fiber optic module 1000 is illustrated. The first terminal pin header 1027T is coupled to the angled transmit PCB 1027T so that pins 117 are vertical with the reference axis. The second terminal pin header 1027R is coupled to the angled receive PCB 108" so that pins 113 are vertical with the reference axis. A ground plane 118 can be coupled to a side the angled receive PCB 108" or a ground plane 114 can be coupled to a side of the angled transmit PCB 106" or both similar to previously described with reference to the vertical boards and FIGS. 9B–9E. The shield housing or cover 419 couples to the base or baseplate 805 or 805' around the printed circuit boards. Depending upon the width of the printed circuit boards 106' and 108' and the width of the fiber optic module 1000, the angles $\theta_1$ and $\theta_2$ which the printed boards make with the base or baseplate 805 or 805' can vary between zero and ninety degrees.

Figure 11B:
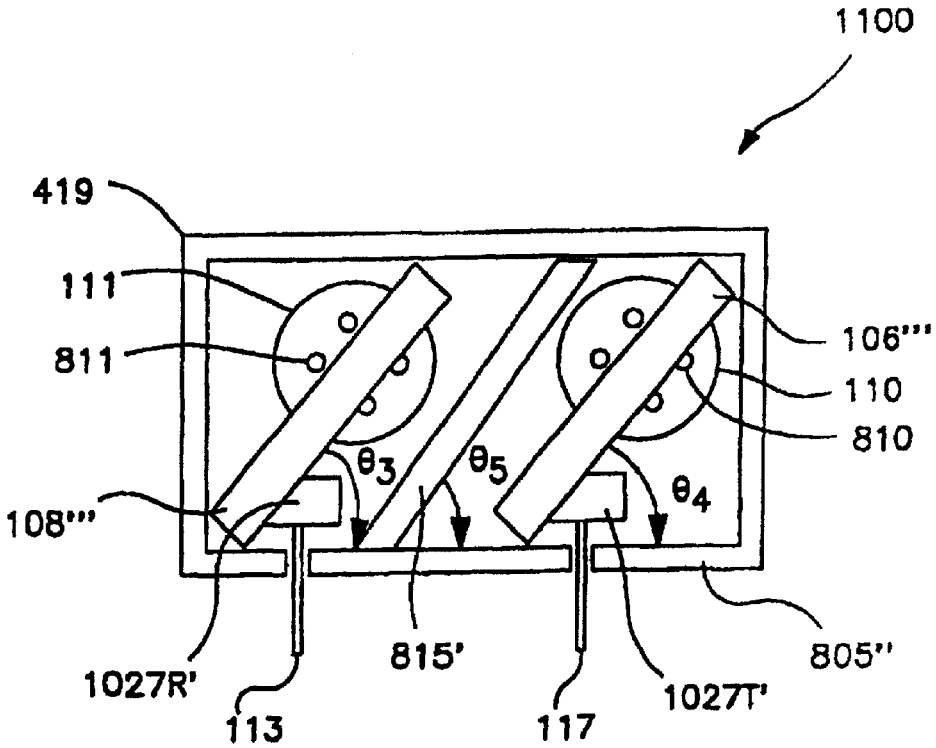
FIG. 11B is a rear cross sectional view of the assembled invention illustrated in FIG. 11A.
Figure 11A:
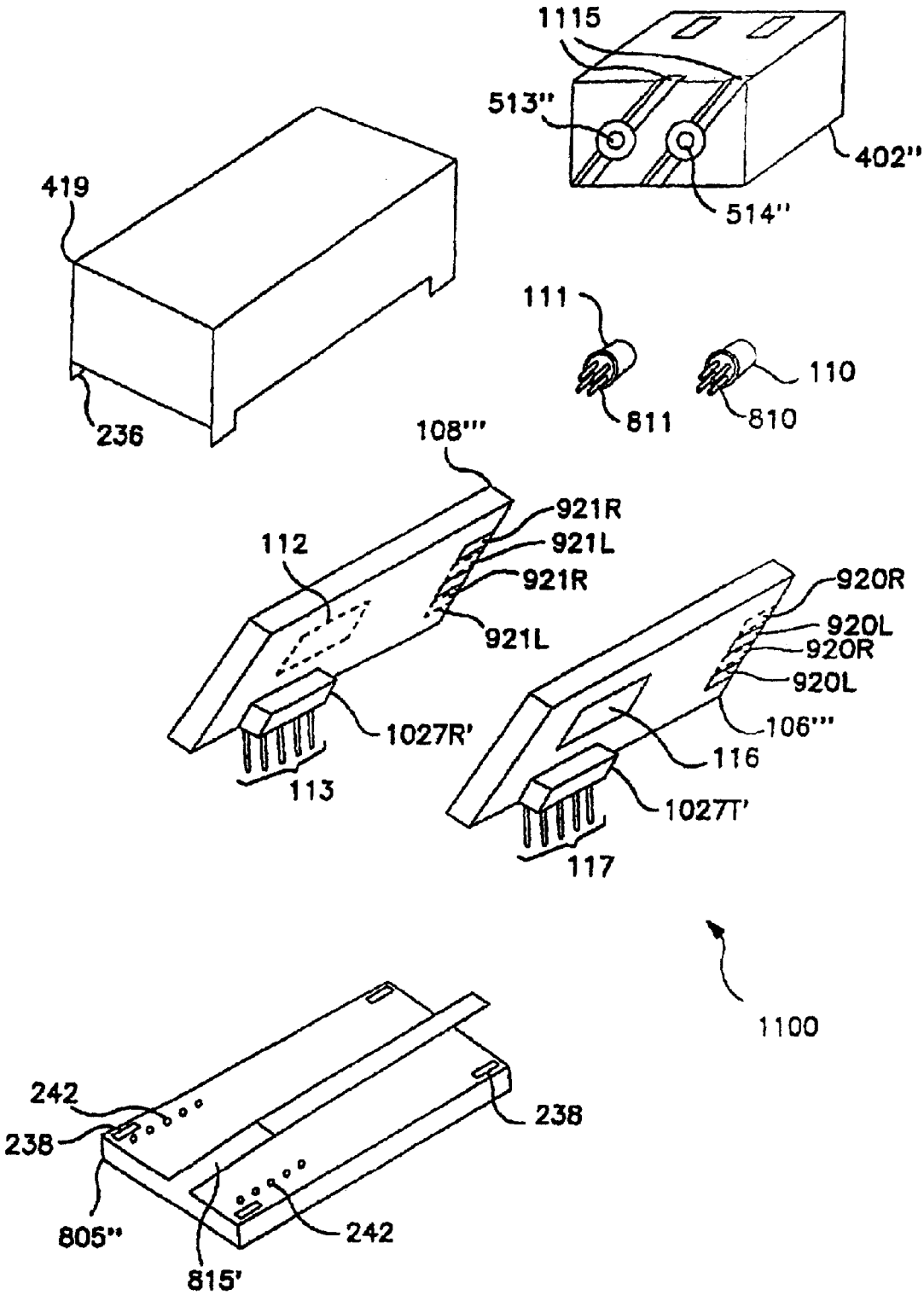
FIG. 11A is an exploded view of another embodiment of the invention.

Referring now to FIG. 11A, another embodiment of the invention is illustrated. FIG. 11A illustrates an exploded view of a fiber optic module 1100. The fiber optic module 1100 has parallel angled or slanted PCBs with respect to a horizontal or vertical axis of the fiber optic module 1100. The length of the PCBs remain parallel to the optical axis of the receiver 111 and transmitter 110. By parallel angling the PCBs with the horizontal or vertical axis, the PCBs may be made smaller to fit a smaller form factor or alternatively the surface area can be increased. That is the available PCB surface area for mounting components can be increased for a given volume by angling the PCBs. The increased surface area can give the final assembled fiber optic module increased functionality by allowing components such as integrated circuits and passive components such as filters, capacitors, and inductors to be added. More room can also be provided in the fiber optic module 1100 for mounting larger components by angling the PCBs in parallel together.

The fiber optic module 1100 includes an angled transmit PCB 106''', an angled receive PCB 108''', the transmitter 110, the receiver 111, an optical block 402", the shielded housing or cover 419, a first terminal pin header 1027T for the transmitter, a second terminal pin header 1027R for the receiver, and a baseplate 805".

The angled transmit PCB 106''' and the angled receive PCB 108''' are arranged in parallel and at an angle with respect to a horizontal datum plane that passes through and is normal to receiver and transmitter optical axes. The angled transmit PCB 106''' and the angled receive PCB 108''' are slanted in parallel to the right but can be easily arranged so as to slant in parallel to the left. The angled transmit PCB 106''' and the angled receive PCB 108''' are held in place having a width that is on an angle with respect to a horizontal or vertical axis of the fiber optic module 1100. The length of the angled transmit PCB 106''' and the angled receive PCB 108''' are parallel to the optical axis of the receiver 111 and transmitter 110. The angled transmit PCB 106''' includes components 116 and left and right edge traces 921L and 921R. The first terminal pin header 1027T has pins 117 that couple to holes of the angled transmit PCB 106''' on one end. The angled receive PCB 108''' includes components 112 and left and right edge traces 920L and 920R. The second terminal pin header 1027R' has pins 113 that couple to holes of the angled receive PCB 108''' on one end.

The transmitter 110 is a transmit optical subassembly (Tx OSA) that includes a VCSEL or other semiconductor device that transduces electrical signals into photons or a light output. The receiver 111 is a receive optical subassembly (Rx OSA) including a PIN diode or other device that converts photons or light input into electrical signals. The Tx OSA and Rx OSA are attached to physically separated transmit and receive electrical subassemblies (ESA's). In one embodiment, the transmit ESA includes the angled transmit PCB 106''' with components 116 and the first terminal pin header 1027T mounted thereto. In one embodiment, the receive ESA includes the angled receive PCB 108''' with components 112 and the second terminal pin header 1027R' mounted thereto.

The baseplate 805" is similar to the baseplate 805 and 805' but has angled inner septum 815' to be angled in parallel with the angled transmit PCB 106''' and the angled receive PCB 108'''. The baseplates 805, 805', 805" in one embodiment may be a dielectric to isolate components and insulate them from one another. In another embodiment, baseplates 805, 805', 805" may be an insulator. In another embodiment, baseplates 805, 805', 805" may have their septum 815 or 815' metalized so as to provide EMI and crosstalk shielding. Alternatively, a metal shield my be placed on top of the septum 815 or 815' such as shield 109.

The optical block 402" is similar to the optical block 402 but has some modifications to accommodate the angled transmit PCB 106''' and the angled receive PCB 108'''. The optical block 402" includes openings 513" and 514" to receive the receiver 111 and transmitter 110 respectively and angled slots 1115 to receive the angled transmit PCB 106''' and the angled receive PCB 108'''. The angled slots 1115 can provide a friction fit with the angled transmit PCB 106''' and the angled receive PCB 108''' or glue or epoxy can be used to couple them together. The angled slots 1115 can also serve to tack the receiver 111 and transmitter 110 in place within the optical block 402".

The transmitter 110 couples into the opening 514" of the optical block 402". The receiver 111 couples into the opening 513" of the optical block 402". They can be held in place by either a friction fit or a glue such as an epoxy.

The transmitter 110 also couples to the transmit PCB 106'''. The terminals 810 of the transmitter 110 couple to the transmit PCB 106''' in one embodiment. Using a straddle mount, one or more terminals 810 couple to left edge traces 920L on a left side and one or more terminals 810 couple to right edge traces 920R on a right side of the transmit PCB 106'''. In an alternate embodiment, the terminals 810 may couple to one side of the transmit PCB 106'''. In yet another alternate embodiment, the terminals 810 may couple into holes of the transmit PCB 106'''.

The receiver 111 also couples to the receive PCB 108'''. The terminals 811 of the receiver 111 couple to the receive PCB 108'''. Using a straddle mount, one or more terminals 811 couple to left edge traces 921L on a left side and one or more terminals 811 couple to right edge traces 921R on a right side of the receive PCB 108'''. In an alternate embodiment, the terminals 811 may couple to one side of the receive PCB 108'''. In yet another alternate embodiment, the terminals 811 may couple into holes of the receive PCB 108'''.

Referring now to FIG. 11B, a rear cross-sectional view of the assembled fiber optic module 1100 is illustrated. The angled receive PCB 108''' and the angled transmit PCB 106''' of the fiber optic module 1100 are angled in parallel together with respect to a horizontal or vertical axis thereof. The first terminal pin header 1027T' is coupled to the angled transmit PCB 1027T' so that pins 117 are vertical with the reference axis. The second terminal pin header 1027R' is coupled to the angled receive PCB 108''' so that pins 113 are vertical with the reference axis. A ground plane 118 can be coupled to a side the angled receive PCB 108''' or a ground plane 114 can be coupled to a side of the angled transmit PCB 106''' or both similar to previously described with reference to the vertical boards and FIGS. 9B–9E. The shield housing or cover 419 couples to the baseplate 805" around the printed circuit boards. Depending upon the width of the printed circuit boards 106''' and 108''' and the width of the fiber optic module 1100, the angles $\theta_3$ and $\theta_4$ which the printed boards make with the base or baseplate 805" and the angle $\theta_5$ which the septum 815' makes with the base or baseplate 805" can vary between zero and ninety degrees.

Figure 12A:
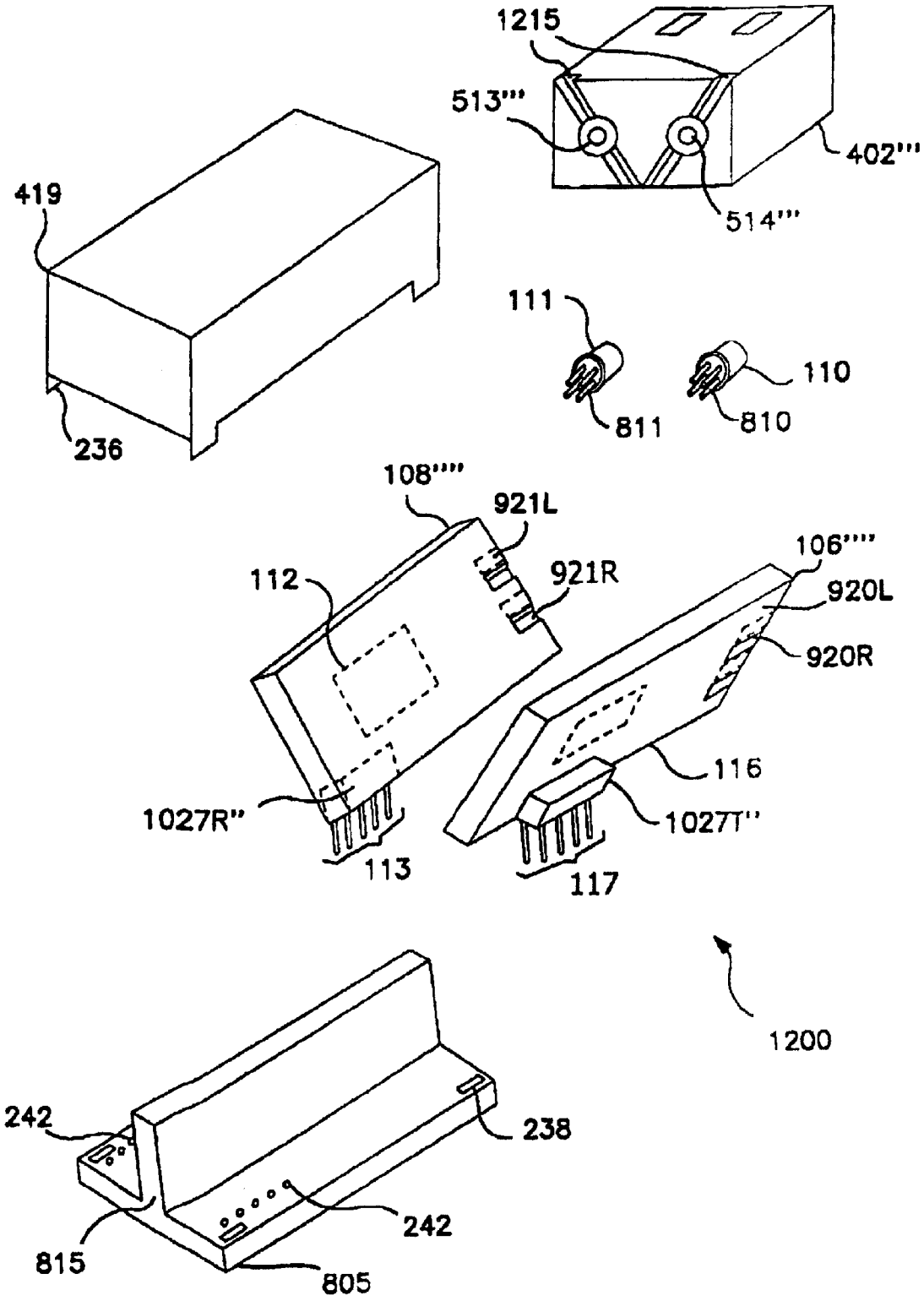
FIG. 12A is an exploded view of another embodiment of the invention.

Referring now to FIG. 12A, another embodiment of the invention is illustrated. FIG. 12A illustrates an exploded view of a fiber optic module 1200. The fiber optic module 1200 has angled or slanted PCBs with respect to a horizontal or vertical axis of the fiber optic module 1200. The PCBs are angled or slanted away at top edges to form a V configuration of PCB orientation. The length of the PCBs remain parallel to the optical axis of the receiver 111 and transmitter 110. By angling the PCBs with the horizontal or vertical axis, the PCBs may be made smaller to fit a smaller form factor or alternatively the surface area can be increased. That is the available PCB surface area for mounting components can be increased for a given volume by angling the PCBs. The increased surface area can give the final assembled fiber optic module increased functionality by allowing components such as integrated circuits and passive components such as filters, capacitors, and inductors to be added. More room can also be provided in the fiber optic module 1200 for mounting larger components by angling the PCBs.

The fiber optic module 1200 includes an angled transmit PCB 106'''', an angled receive PCB 108'''', the transmitter 110, the receiver 111, an optical block 402''', the shielded housing or cover 419, a first terminal pin header 1027T" for the transmitter, a second terminal pin header 1027R" for the receiver, and the baseplate 805 or 805'.

The angled transmit PCB 106'''' and the angled receive PCB 108'''' are arranged at an angle with respect to the horizontal axis of the fiber optic module as defined by a line normal to both receiver and transmitter optical axes. The angled transmit PCB 106'''' and the angled receive PCB 108'''' slant away from each other to form the V configuration. The angled transmit PCB 106'''' and the angled receive PCB 108'''' are held in place having a width that is on an angle with respect to a horizontal or vertical axis of the fiber optic module 1200. The length of the angled transmit PCB 106"" and the angled receive PCB 108"" are parallel to the optical axis of the receiver 111 and transmitter 110. The angled transmit PCB 106"" includes components 116 and left and right edge traces 921L and 921R. The first terminal pin header 1027T" has pins 117 that couple to holes of the angled transmit PCB 106"" on one end. The angled receive PCB 108"" includes components 112 and left and right edge traces 920L and 920R. The second terminal pin header 1027R" has pins 113 that couple to holes of the angled receive PCB 108"" on one end.

The transmitter 110 is a transmit optical subassembly (Tx OSA) that includes a VCSEL or other semiconductor device that transduces electrical signals into photons or a light output. The receiver 111 is a receive optical subassembly (Rx OSA) including a PIN diode or other device that converts photons or light input into electrical signals. The Tx OSA and Rx OSA are attached to physically separated transmit and receive electrical subassemblies (ESA's). In one embodiment, the transmit ESA includes the angled transmit PCB 106"" with components 116 and the first terminal pin header 1027T" mounted thereto. In one embodiment, the receive ESA includes the angled receive PCB 108"" with components 112 and the second terminal pin header 1027R" mounted thereto.

The optical block 402"' is similar to the optical block 402 but has some modifications to accommodate the angled transmit PCB 106"" and the angled receive PCB 108"". The optical block 402"' includes openings 513"' and 514"' to receive the receiver 111 and transmitter 110 respectively and angled slots 1215 to receive the angled transmit PCB 106"" and the angled receive PCB 108"". The angled slots 1215 can provide a friction fit with the angled transmit PCB 106"" and the angled receive PCB 108"" or glue or epoxy can be used to couple them together. The angled slots 1215 can also serve to tack the receiver 111 and transmitter 110 in place within the optical block 402"'.

The transmitter 110 couples into the opening 514"' of the optical block 402"'. The receiver 111 couples into the opening 513"' of the optical block 402"'. They can be held in place by either a friction fit or a glue such as an epoxy.

The transmitter 110 also couples to the transmit PCB 106"". The terminals 810 of the transmitter 110 couple to the transmit PCB 106"" in one embodiment. Using a straddle mount, one or more terminals 810 couple to left edge traces 920L on a left side and one or more terminals 810 couple to right edge traces 920R on a right side of the transmit PCB 106"". In an alternate embodiment, the terminals 810 may couple to one side of the transmit PCB 106"". In yet another alternate embodiment, the terminals 810 may couple into holes of the transmit PCB 106"".

The receiver 111 also couples to the receive PCB 108"". The terminals 811 of the receiver 111 couple to the receive PCB 108"". Using a straddle mount, one or more terminals 811 couple to left edge traces 921L on a left side and one or more terminals 811 couple to right edge traces 921R on a right side of the receive PCB 108"". In an alternate embodiment, the terminals 811 may couple to one side of the receive PCB 108"". In yet another alternate embodiment, the terminals 811 may couple into holes of the receive PCB 108"".

Figure 12B:
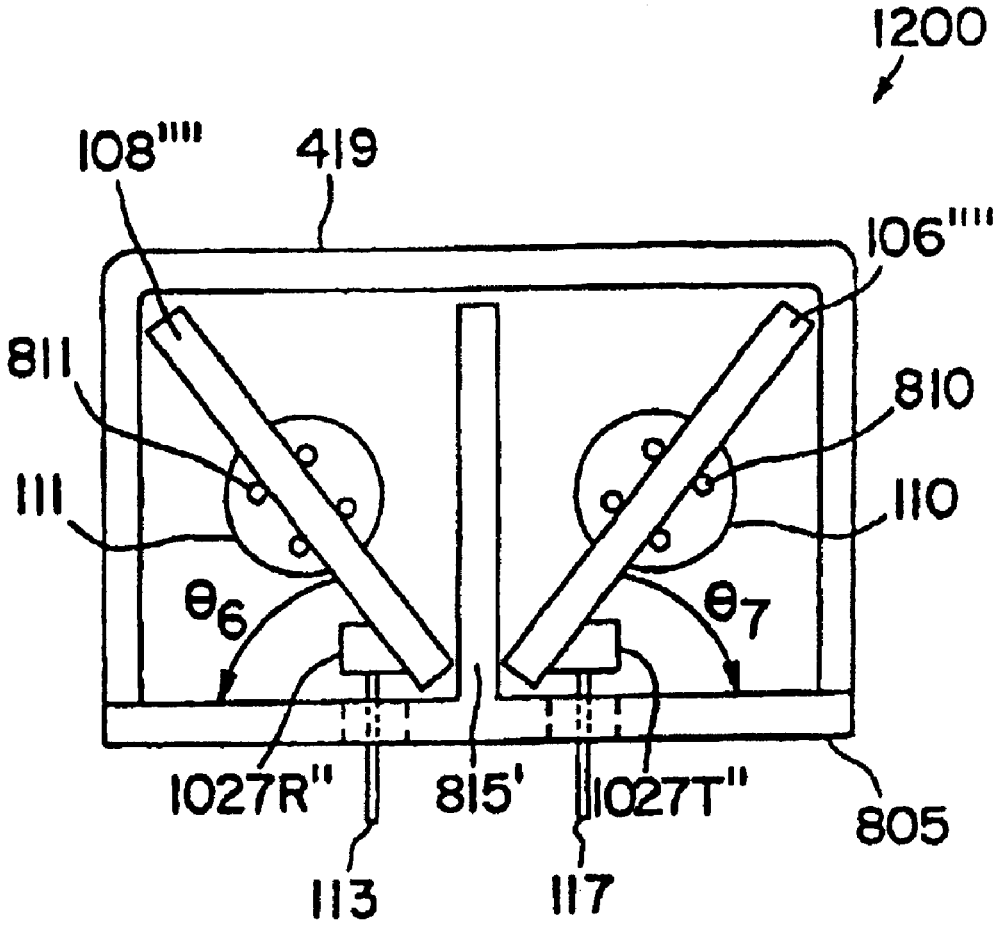
FIG. 12B is a rear cross sectional view of the assembled invention illustrated in FIG. 12A.

Referring now to FIG. 12B, a rear cross-sectional view of the assembled fiber optic module 1200 is illustrated. The angled receive PCB 108"" and the angled transmit PCB 106"" of the fiber optic module 1200 are angled away from each other with respect to a horizontal or vertical axis thereof. The first terminal pin header 1027T" is coupled to the angled transmit PCB 1027T" so that pins 117 are vertical with the reference axis. The second terminal pin header 1027R" is coupled to the angled receive PCB 108"" so that pins 113 are vertical with the reference axis. A ground plane 118 can be coupled to a side the angled receive PCB 108"" or a ground plane 114 can be coupled to a side of the angled transmit PCB 106"" or both similar to previously described with reference to the vertical boards and FIGS. 9B–9E. The shield housing or cover 419 couples to the baseplate 805 or 805' around the printed circuit boards. Depending upon the width of the printed circuit boards 106"" and 108"" and the width of the fiber optic module 1200, the angles $\theta_6$ and $\theta_7$ which the printed boards make with the base or baseplate 805 or 805' can vary between zero and ninety degrees.

Figure 16B:
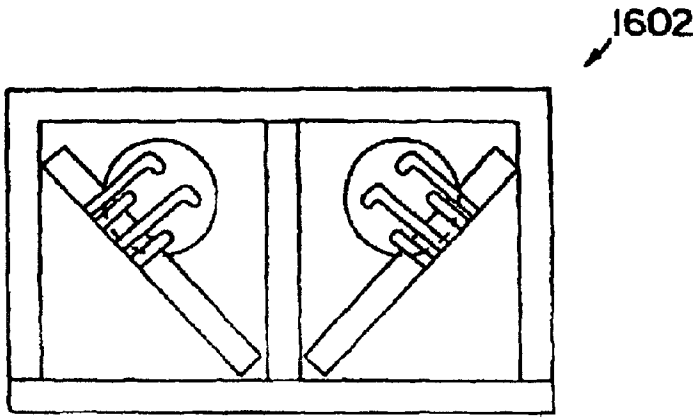
FIG. 16B illustrates a rear cross sectional view of an assembled alternate embodiment of the invention.
Figure 16A:
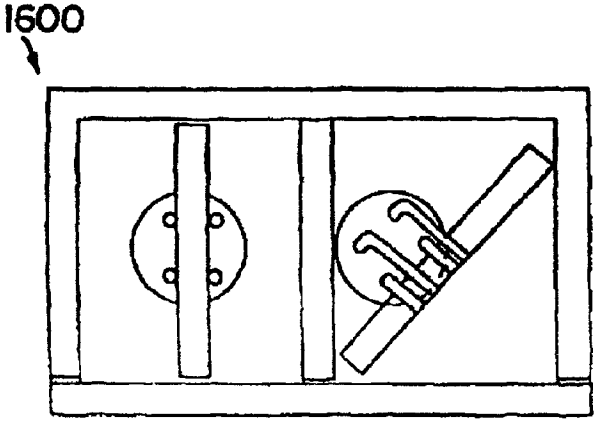
FIG. 16A illustrates a rear cross sectional view of an assembled alternate embodiment of the invention.

While symmetrical angles for the printed circuit boards have been illustrated, combinations can be utilized to form alternate embodiments. For example, one of the printed circuit boards may be arranged on an angle with the base so as to slant while the other printed circuit board may be arranged perpendicular to the base. FIG. 16A illustrates a fiber optic module 1600 with such an arrangement for an alternate embodiment of the invention.

Figure 13:
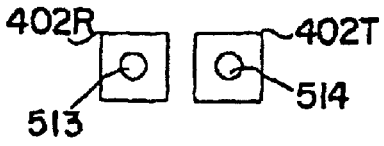
FIG. 13 illustrates a receive optical block and a transmit optical block as an alternative to a single optical block.

Referring now to FIG. 13, a receiver optical block 402R and a transmitter optical block 402T are illustrated as an alternative to the optical block 402 or 402'. Previously the fiber optic modules were described and illustrate using a single optical block 402 or 402'. However, the optical blocks 402R and 402T can provide similar functionality to the single optical block 402 or 402'. The receiver optical block 402R couples to the receiver 111 while the transmit optical block 402T couples to the transmitter 110. The receiver 111 and transmitter 110 can be press fit into the openings 513 and 514 or alternatively a glue or epoxy can inserted into the tacking holes to couple them together. Each optical receiver optical block 402R and transmit optical block 402T provides alignment to an optical fiber and may include a lens. If one more receiver channels are desired, one or more receiver optical blocks 402R can be utilized. If one or more transmit channels are desired, one or more transmit optical blocks 402T can be utilized.

Figure 14A:
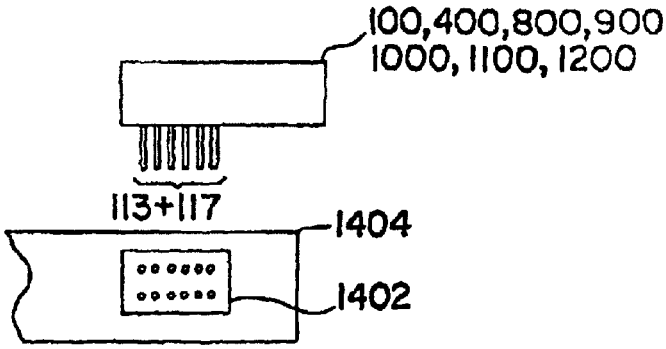
FIG. 14A illustrates how the pin configuration of the fiber optic modules can plug into a socket on a host printed circuit board.
Figure 14B:
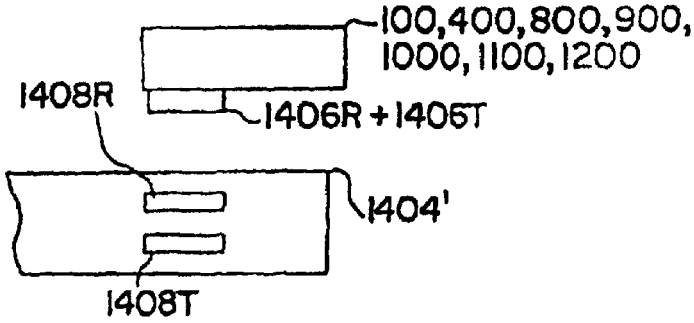
FIG. 14B illustrates how a socket configuration of the fiber optic modules can plug into a socket on a host printed circuit board.
Figure 14C:
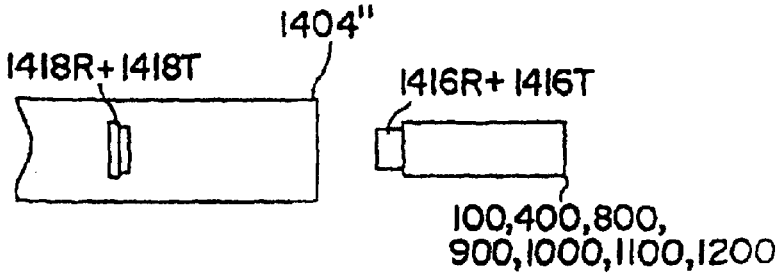
FIG. 14C illustrates how a socket configuration of the fiber optic modules can horizontally plug into a socket on a host printed circuit board.

While pins 113 and 117 of the fiber optic modules (100, 400, 800, 900, 1000, 1100, or 1200) facilitate soldering to a host printed circuit board, they can also be plugged into a socket 1402 on a host printed circuit board 1404 as illustrated in FIG. 14A. Alternatively, the pins 113 and 117 can each be replaced with one or more sockets 1406R and 1406T coupled to the printed circuit boards on the bottom edge or back edge. In the case of sockets 1406R and 1406T on the bottom edges of the printed circuit boards, the fiber optic module (100, 400, 800, 900, 1000, 1100, or 1200) plugs vertically or downward on sockets 1408R and 1408T for example of the host printed circuit board 1404' as illustrated by FIG. 14B. In the case of a socket or sockets 1416R and 1416T on the back edge of the printed circuit boards, the fiber optic module (100, 400, 800, 900, 1000, 1100, or 1200) plugs horizontally or inward into a socket or sockets 1418R and 1418T of the host printed circuit board 1404".

Figure 15A:
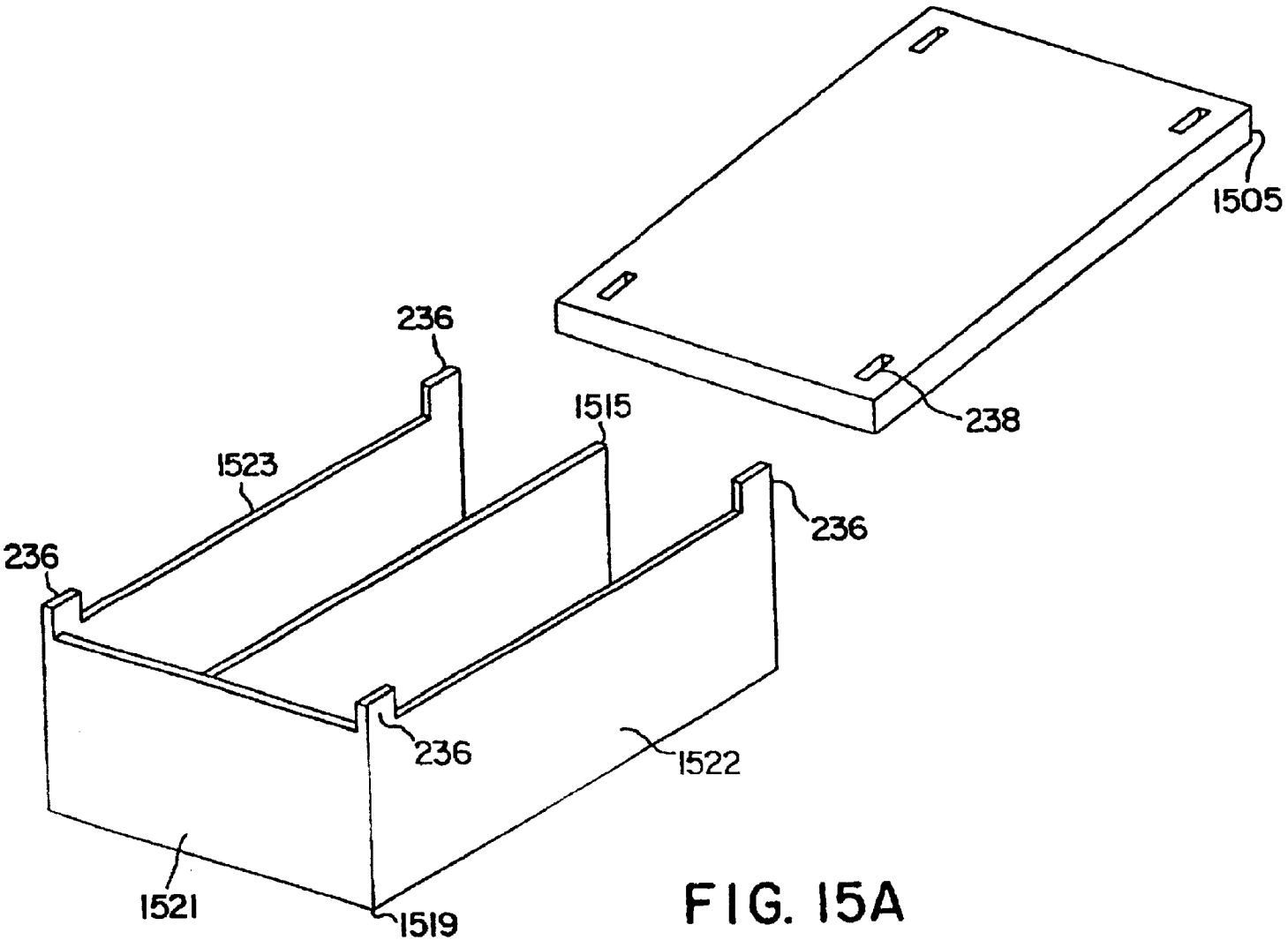
FIG. 15A illustrates a bottom perspective view of an alternate embodiment of the shielded housing or cover and base of the invention.

Referring now FIG. 15A, an alternate embodiment of a shielded housing or cover 1519 and an alternate base 1505. The shielded housing or cover 1519 includes a center inner septum 1515 incorporated as part of the housing or cover to isolate a transmit channel from a receive channel or one channel from another channel. The center inner septum 1515 splits the fiber optic module into a left side and a right side as does the other septums described herein. The housing or cover 1519 further includes a back side 1521, a left side 1522, a right side 1523 and clips or tabs 236. A front side 1524 of the housing or cover 1519 is open to couple to the optical block 402 and/or a nose.

The alternate base 1505 has no septum and may include clip openings or slots 238. Alternately, a base is without the clip openings or slots 238 such that the clips or tabs 236 of the housing or cover are bent over and around the base.

Figure 15B:
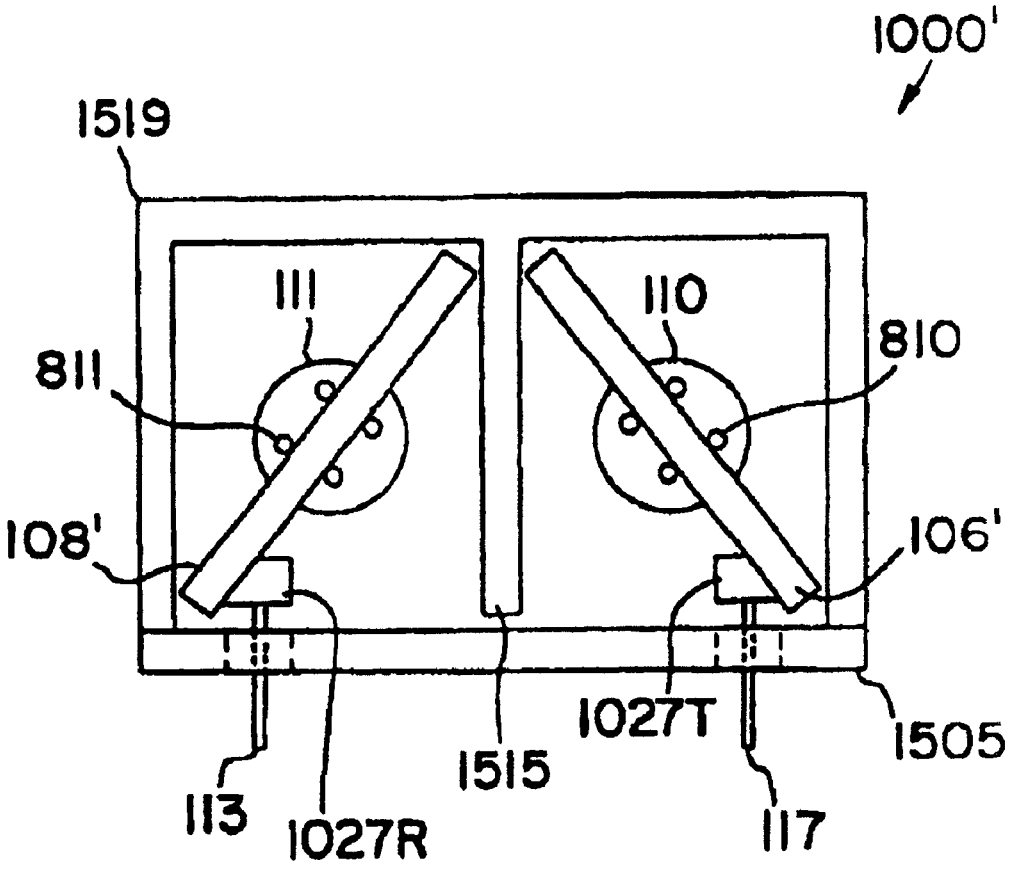
FIG. 15B illustrates a rear cross sectional view of the assembled invention illustrated in FIG. 10A substituting the alternate embodiment of the shielded housing or cover of FIG. 15A.

Referring now to FIG. 15B, a cross sectional view of a fiber optic module 1000' utilizing the alternate embodiment of the shielded housing or cover 1519 and base 1505 is illustrated. The fiber optic module 1000' is similar to fiber optic module 1000 as described with reference to FIGS. 10A–10B but for the alternate shielded housing or cover 1519 and the alternate base 1505.

Figure 15C:
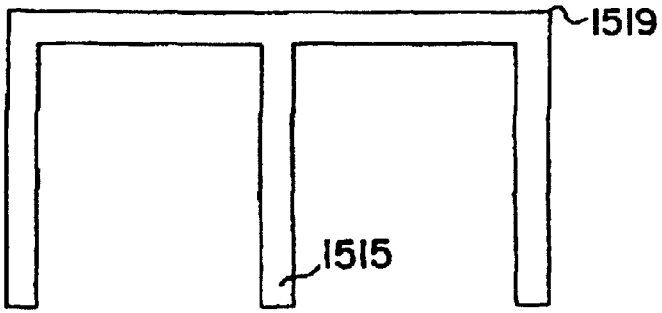
FIG. 15C illustrates a rear cross sectional view of the alternate embodiment of the shielded housing or cover of FIG. 15A.

Referring now to FIG. 15C, a cross sectional view of the alternate embodiment of the shielded housing or cover 1519 is illustrated. The shielded housing or cover 1519 is a monolithic or integrated shielded housing or cover incorporating the septum 1515. The shielded housing or cover 1519 can be formed of a metal, a plastic or other solid material. The shielded housing or cover 1519 if made of metal, can be formed by forging, stamping or machining. Lower costs methods to fabricate the shielded housing or cover 1519 include injection, transfer, or blow molding the shape out of plastic. The plastic can then be plated, painted or otherwise coated with a conductive material, if conductivity is desired. Likewise a metal part can be overcoated with a non-conductive material if conductivity is not desired.

Figure 15E:
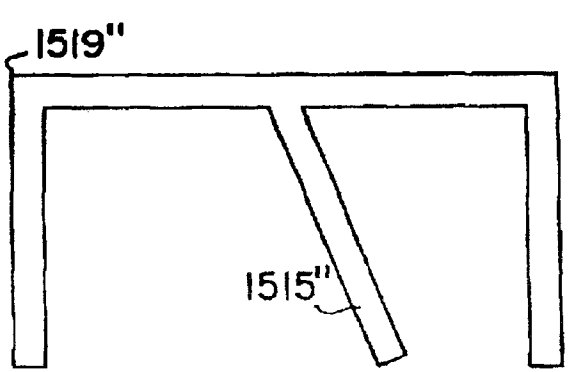
FIG. 15E illustrates a cross sectional view of another alternate embodiment of the shielded housing or cover.
Figure 15D:
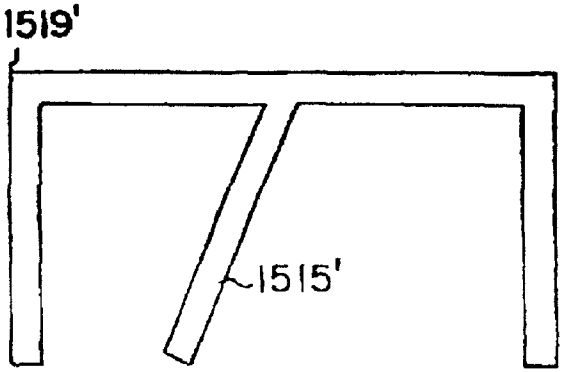
FIG. 15D illustrates a cross sectional view of another alternate embodiment of the shielded housing or cover.

Referring now to FIG. 15D and FIG. 15E, the septum can be angled as well to accommodate parallel angled PCB boards as illustrated by the septum 1515' of the shielded housing or cover 1519' and the septum 1515" of the shielded housing or cover 1519".

Figure 15G:
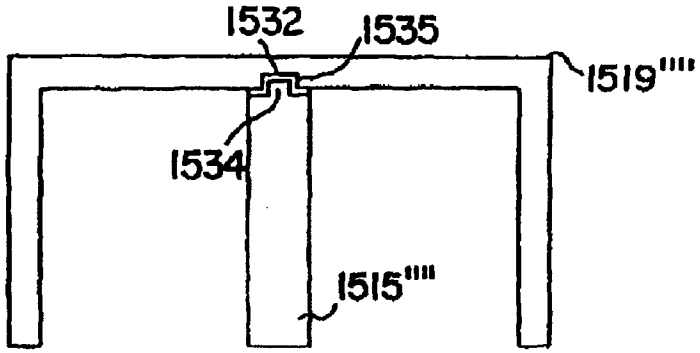
FIG. 15G illustrates a cross sectional view of another alternate embodiment of the shielded housing or cover.
Figure 15F:
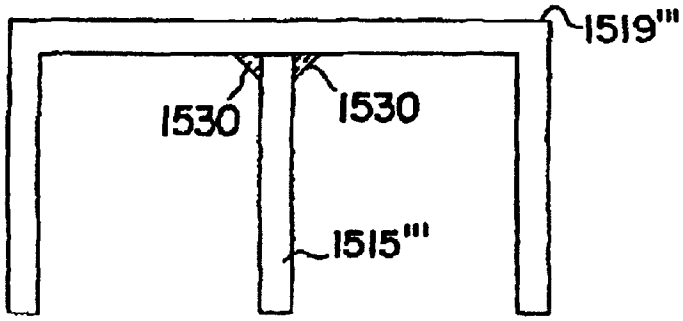
FIG. 15F illustrates a cross sectional view of another alternate embodiment of the shielded housing or cover.

Referring now to FIG. 15F, the septum can be formed separately from the housing or cover and coupled thereto. The shielded housing or cover 1519''' includes a septum 1515''' which is formed separately and coupled together. The septum 1515''' can be coupled to the outer housing by using fusion techniques such as soldering, welding, or melting. FIG. 15F illustrates the fuse links 1530 (solder, weld, etc) coupling the septum 1515''' to the outer housing of the shielded housing or cover 1519'''.

Referring now to FIG. 15G, the septum can be formed separately from the housing or cover and coupled thereto by alternate means. FIG. 15G illustrates the shielded housing or cover 1519'''' including a septum 1515'''' which is formed separately and coupled together. The outer cover of the shielded housing or cover 1519'''' includes a groove 1532 and the septum 1515'''' includes a tongue 1534 to form a tongue and groove system. A glue, adhesive or epoxy 1535 is applied between the tongue and groove system which may be conductive or non-conductive to couple the outer housing and the septum 1515'''' together to form the shielded housing or cover 1519''''.

The fiber optic modules previously described with reference to FIGS. 8A–15G were illustrated with the optoelectronic devices (transmitter 110 and receiver 111) having its terminals coupled to the printed circuit boards using a straddle mount. However, one or all of the optoelectronic devices may have their terminals coupled to the printed circuit boards using a through hole mount. In a straddle mount, the optoelectronic device (i.e. the transmitter 110 or the receiver 111) has its optical axis nearly in-line and parallel with a plane of the printed circuit board. In a through hole mount, the optoelectronic device (i.e. the transmitter 110 or the receiver 111) has its optical axis nearly parallel with a plane of the printed circuit board.

Referring now to FIG. 16A, a rear cross-section of a fiber optic module 1600 is illustrated having a first optoelectronic device with its terminals coupled to a first printed circuit board in a straddle mount configuration and a second optoelectronic device with its terminals coupled to a second printed circuit board in a through hole mount configuration. Alternatively, both the first optoelectronic device the second optoelectronic device may have their terminals coupled to their respective printed circuit boards in a through hole mount configuration as illustrated by the rear cross-section of fiber optic module 1602 of FIG. 16B.

Figure 17A:
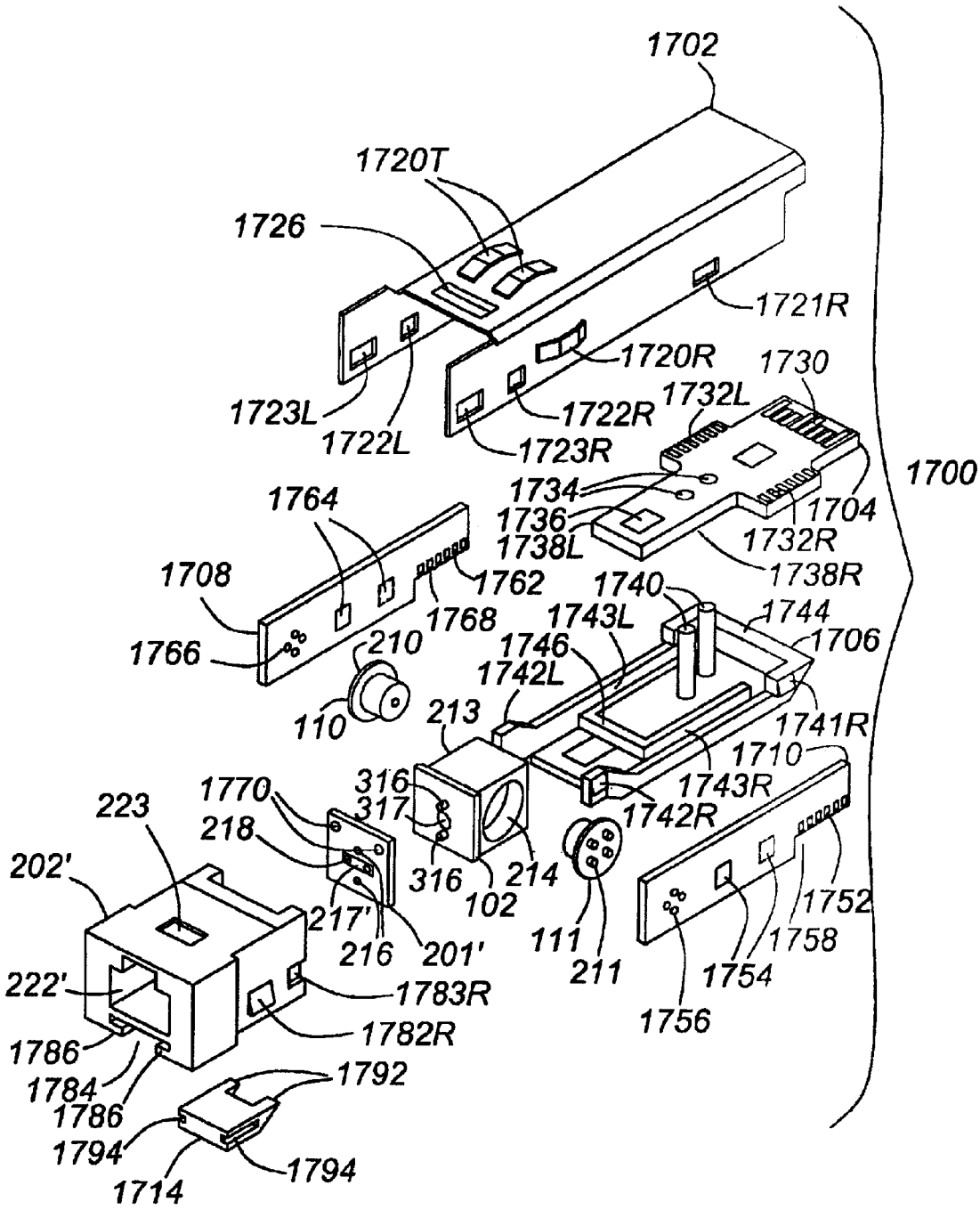
FIGS. 17A–17D illustrate exploded perspective views of an embodiment of the invention.

Referring now to FIGS. 17A–17D, exploded perspective views of a pluggable fiber optic module 1700 are illustrated. In one embodiment, the pluggable fiber optic module 1700 is an MTRJ-SFP pluggable fiber optic module. As illustrated in FIG. 17A, the pluggable fiber optic module 1700 may include a cover/housing 1702, an interface printed circuit board (PCB) 1704, a support base 1706, a transmit printed circuit board (PCB) 1708, a receive printed circuit board (PCB) 1710, the optical block 102, the transmitter 110, the receiver 111, an alignment plate 201', a nose receptacle 202', and an actuator 1714.

The details of the optical block 102, the transmitter 110, the receiver 111 were previously described and will not be repeated here for reasons of brevity.

The cover/housing 1702 may have one or more top, left, and right side electromagnetic interference (EMI) fingers 1720T, 1720L, 1720R extending outward from a top surface, left surface and right surface thereof, respectively. The cover/housing 1702 may further have one or more right and left side openings 1721R, 1721L, 1722R, 1722L, 1723R, 1723L in the top surface, the left surface, and the right surface thereof. The cover/housing 1702 may further have a contact tab 1726 extending inward from the top surface.

The right and left side openings 1721R, 1721L, 1722R, 1722L may interface to right and left tabs 1741R, 1741L, 1742R, 1742L in the support base 1704 to couple the cover/housing 102 to a subassembly of the fiber optic module 1700. The right and left side openings 1723R, 1723L may interface to right and left tabs (right tab 1782R only shown in the Figures with left tab 1782L being a mirror image thereof) in the nose receptacle 202' to further the cover/housing 102 to the subassembly of the fiber optic module 1700. If the cover/housing 102 is conductive, the contact tab 1726 may electrically couple to an edge of the alignment plate 201', if its conductive. Alternatively, the contact tab 1726 may extend and electrically couple to both the alignment plate 201' and the nose receptacle 202' if both are conductive.

The cover/housing 1702, alignment plate 201', and nose receptacle 202' may be formed of a metal or a plastic. In the case of plastic, the plastic may be metalized to form of a metalized plastic in order to be conductive and provide static (ESD), EMI, or RF shielding through a ground connection which may be made through the one or more fingers 1720T, 1720L, 1720R (one or more fingers 1720L are not shown in the figures but being a mirror image of the one or more fingers 1720R). In a preferred embodiment, the cover/housing 1702 is formed of stainless steel.

The interface PCB 1704 may also be referred to as a horizontal printed circuit board. The interface PCB 1704 may include one or more openings 1734 to slide over one or more alignment pillars 1740 in the support base 1706. The interface PCB 1704 may further include an edge connection 1730 formed by traces on the surface of the interface PCB 1704;

left and right side solder pads 1732L, 1732R; and one or more integrated circuits (ICs) 1736 or other electrical components. The edge connection 1730 of the interface PCB 1704 may also be referred to as an edge connector, a plug, an interface slot, or a connector tongue. The left and right side solder pads 1732L, 1732R are for forming an electrical connection with the transmit PCB 1708 and the receive PCB 1710 by means of one or more solder joints. In the preferred embodiment, each solder joint is a ninety degree castellation solder joint. The interface PCB 1704 may further include left and right cutouts 1738L, 1738R which may allow respective edges of the transmit PCB 1708 and the receive PCB 1710 to slide into respective left and right slots 1743L, 1743R in the support base 1706. The edge connection 1730 of the interface PCB 1704, allows the fiber optic module 1700 to be plugged into and out of an edge connector of a host printed circuit board. The edge connection 1730, as discussed further below, may allow for the hot pluggability of the fiber optic module 1700 into a powered up host printed circuit board.

The support base 1706 may include the one or more alignment pillars 1740; the left and right tabs 1741R, 1741L, 1742R, 1742L (left tab 1741L is not shown in the figures but being a mirror image of the right tab 1741R); the left and right slots 1743L, 1743R; a support edge 1744; and a support tab 1746. The left slot 1743L is for receiving an edge of the transmit PCB 1708 in the preferred embodiment. The right slot 1743R is for receiving an edge of the receive PCB 1710 in the preferred embodiment. In an alternate embodiment, the receive PCB and transmit PCB can swap sides along with swapping sides of the transmitter 110 and receiver 111 and the optical components (i.e. lenses, etc.) within the optical block 102.

As previously discussed, the interface PCB 1704 may include one or more openings 1734 to slide over the one or more alignment pillars 1740 in the support base 1706. An epoxy or glue can be deposited around the pillars 1740 and on the surface of the interface PCB 1704 near the openings 1734 in order to hold interface PCB 1704 and the support base 1706 coupled together. When the edge connection 1730 of the interface PCB 1704 is plugged into and out of an edge connector of a host PCB, the pillars 1740 deter movement of the interface PCB 1704 with respect to the fiber optic module 1700. The support edge 1744 of the support base 1706 provides support to the interface PCB 1704 nearer the edge connection 1730. The support tab 1746 provides support to the interface PCB 1704 near an end opposite to the end having the edge connection 1730.

As previously discussed, the right and left tabs 1741R, 1741L, 1742R, 1742L in the support base 1704 couple into the right and left side openings 1721R, 1721L, 1722R, 1722L in the cover/housing 102 to couple the cover/housing 102 and the support base 1704 together. In the preferred embodiment, the tabs are shaped as a ramp or a wedge as illustrated so that the edges of the cover/housing 102 can easily slide over the tabs. However, when the tabs are engaged into the openings, it is difficult to release the cover/housing 102 and disassemble it from the fiber optic module 1700.

The receive PCB 1710 may also be referred to as a vertical printed circuit board and is a receiver electrical subassembly. The receive PCB 1710 includes one or more solder pads 1752, one or more integrated circuits (ICs) 1754 or other electrical components, and one or more thruholes 1756. The receive PCB 1710 may also include a ground plane or a portion thereof on one side or the other to provide EMI/RF shielding. The receive PCB 1710 may also a cutout area 1758 in the circuit board to electrically couple the one or more solder pads 1752 to the interface PCB and allow the edge of the transmit PCB to slide into a slot in the support base 1706. The one or more thruholes 1756 in the receive PCB 1710 are similar to the thruholes 1756 in the receive PCB 1710 are similar to the thruholes 232 in the receive PCB 108 illustrated in FIG. 2 and discussed previously. The one or more thruholes 1756 in the receive PCB 1710 are aligned and then slid over the terminals 211 of the receiver 111. The terminals 211 are then soldered to the receive PCB 1710 to make an electrical connection thereto. The one or more solder pads 1752 may be electrically coupled to the receiver 111 and/or the one or more integrated circuits (ICs) 1754 or other electrical components thereon through traces of the receiver PCB 1710. As previously discussed, the right side solder pads 1732R of the interface PCB 1704 form an electrical connection with the solder pads 1752 of the receive PCB 1710 by means of one or more solder joints. In the preferred embodiment, each solder joint is a ninety degree castellation solder joint.

The transmit PCB 1708 may also be referred to as a vertical printed circuit board and is a transmitter electrical subassembly. The transmit PCB 1708 includes one or more solder pad 1762, one or more integrated circuits (ICs) 1764 or other electrical components, and one or more thruholes 1766. The transmit PCB 1708 may also include a ground plane or a portion thereof on one side or the other to provide EMI/RF shielding. The transmit PCB 1708 may also a cutout area 1768 in the circuit board to electrically couple the one or more solder pads 1762 to the interface PCB and allow the edge of the transmit PCB to slide into a slot in the support base 1706. The one or more thruholes 1766 in the transmit PCB 1708 are similar to the thruholes 233 in the transmit PCB 106 illustrated in FIG. 2 and discussed previously. The one or more thruholes 1766 in the transmit PCB 1708 are aligned and then slid over the terminals 210 of the transmitter 110. The terminals 210 are then soldered to the transmit PCB 1708 to make an electrical connection thereto. The one or more solder pads 1762 may be electrically coupled to the transmitter 110 and/or the one or more integrated circuits (ICs) 1764 or other electrical components thereon through traces of the transmit PCB 1708. As previously discussed, the left side solder pads 1732L of the interface PCB 1704 form an electrical connection with the solder pads 1762 of the transmit PCB 1708 by means of one or more solder joints. In the preferred embodiment, each solder joint is a ninety degree castellation solder joint.

With the transmitter 110 coupled to the transmit PCB 1708 and the receiver 111 coupled to the receive PCB 1710, the transmitter 110 can be inserted into the opening 213 of the optical block 102 and the receiver 111 can be inserted into the opening 214 of the optical block 102. As discussed previously, the transmitter 110 and the receiver 111 can be aligned and coupled to the optical block 102 within the openings 213 and 214, respectively.

The alignment plate 201' may also be referred to as an EMI block and functions somewhat similar to the alignment plate 201. Alignment plate 201' may have some similar features and may have some different features as the alignment plate 201 in order to accommodate the same or different fiber optic plugs and fiber optic cables. The alignment plate 201' has the optical block alignment holes 216 and an optical opening 217' to allow light to pass through similar to the alignment plate 201. The alignment plate 201' may or may not have the fiber optic connector alignment pins 218 depending upon the type of fiber optic plug is being used. The optical block holes 216 couple to optical block alignment pins in the optical block 102, not illustrated in FIG. 2. The fiber optic connector alignment pins 218 are for aligning optical fibers that couple to the fiber optic module 100. The alignment plate 201' may further have openings 1770 to align with pins in the nose receptacle 202' in order to couple to the nose receptacle 202'. The alignment plate 201' may be formed of plastic, metal or a metalized plastic. If formed of metal or metalized plastic, the alignment plate 201' may be electrically grounded through the cover/housing 1702 or otherwise to reduce EMI or RF interference.

For coupling to a fiber optic connector, the fiber optic module 1700 has the nose receptacle 202'. The nose receptacle 202' may include the plug opening 222' and the latch opening 223 to couple to a fiber optic connector or plug of an optical fiber. The optical fiber may be one or more optical fibers to provide unidirectional, bidirectional, or multidirectional communication. The latch opening 223 can receive a latch of the optical fiber connector and hold the fiber optic connector of the optical fiber coupled thereto. The optical fiber plug opening 222' receives an optical fiber plug and aligns the optical fibers with the optical opening 217 of the alignment plate 201'. The nose receptacle 202' may be formed of plastic, metal or metalized plastic. If formed of metal or metalized plastic, the nose receptacle 202' may be electrically grounded through the cover/housing 1702 or otherwise to further reduce EMI or RF interference.

The nose receptacle 202' may further include the right and left tabs (right tab 1782R only shown in the Figures with left tab 1782L being a mirror image thereof) to interface with the right and left side openings 1723R, 1723L of the cover/housing 102. The nose receptacle 202' may further include right and left slots (right slot 1783R only shown in the Figures with left slot 1783L being a mirror image thereof) to allow a portion of the support base 1706 including the right and left side tabs 1742R, 1742L to slide therein. In this manner, the right and left side tabs 1742R, 1742L may be supported in place by the nose receptacle 202' when the cover/housing 1702 is engaged therewith.

As illustrated in FIG. 17A, the nose receptacle 202' may further include an opening 1784 having a pair of tangs or ridges 1786 on opposite side thereof to slideably interface with the actuator 1714. In a preferred embodiment, the actuator 1714 is an SFP actuator. The nose receptacle 202' may further include a center region in the opening 1784 over which a portion of the actuator 1714 may slide.

The actuator 1714 includes one or more ramps or wedges (a pair of which are illustrated) 1792, slot or grooves 1794 on each side having an opening at one end and a closure at an opposite end. The slots or grooves 1794 in the actuator 1714 slideably engage the ridges or tangs 1786 in the nose receptacle 202'.

Figure 17B:
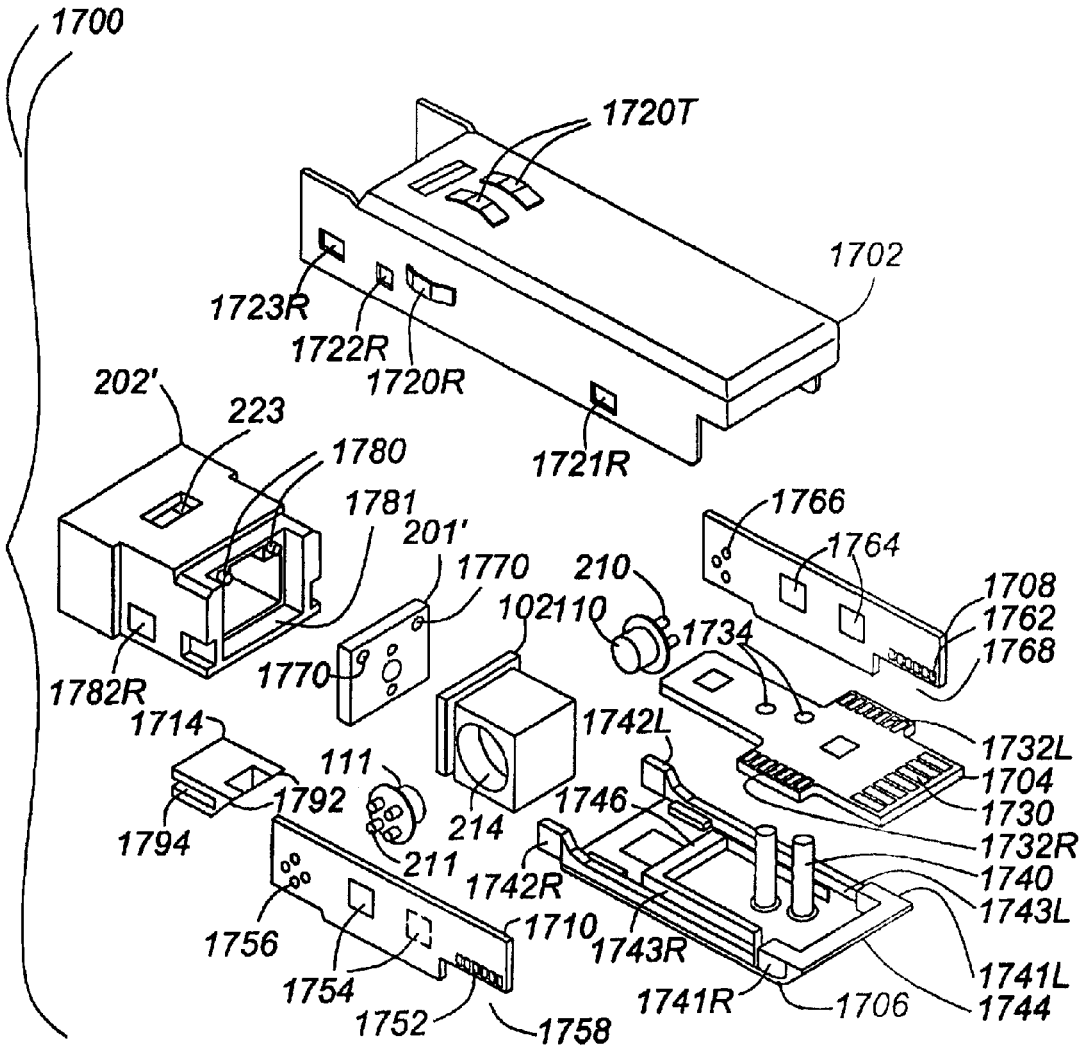

As illustrated in FIG. 17B, the nose receptacle 202' may further include a pair of pins 1780 and a support slot 1781 for engaging with the alignment plate 201'. The pair of pins 1780 can slide into the openings 1770 in the alignment plate 201'. The support slot 1781 may be unshaped to accept and hold the alignment plate 201' in place with the nose receptacle 202'.

Figure 17C:
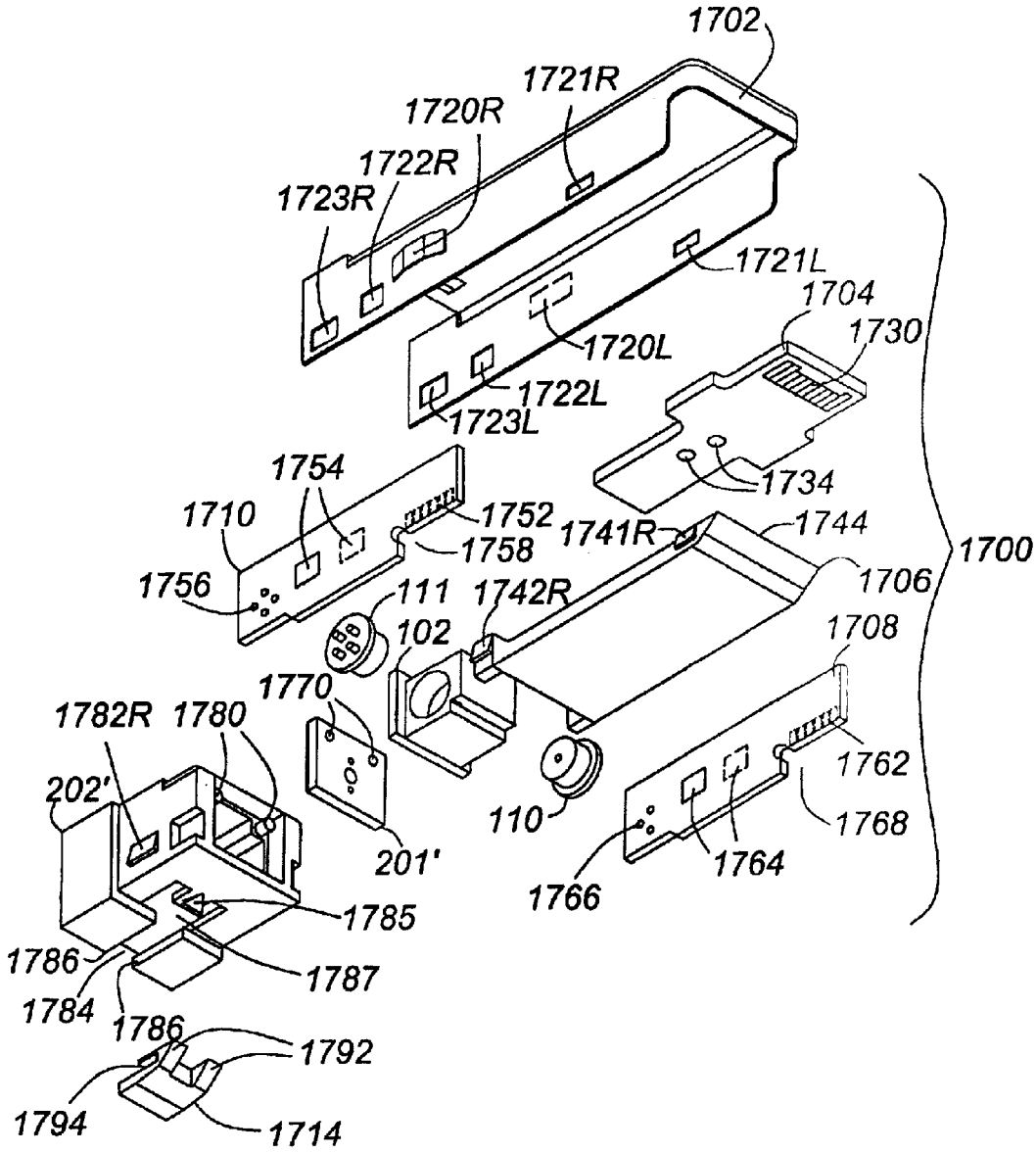
Figure 17D:
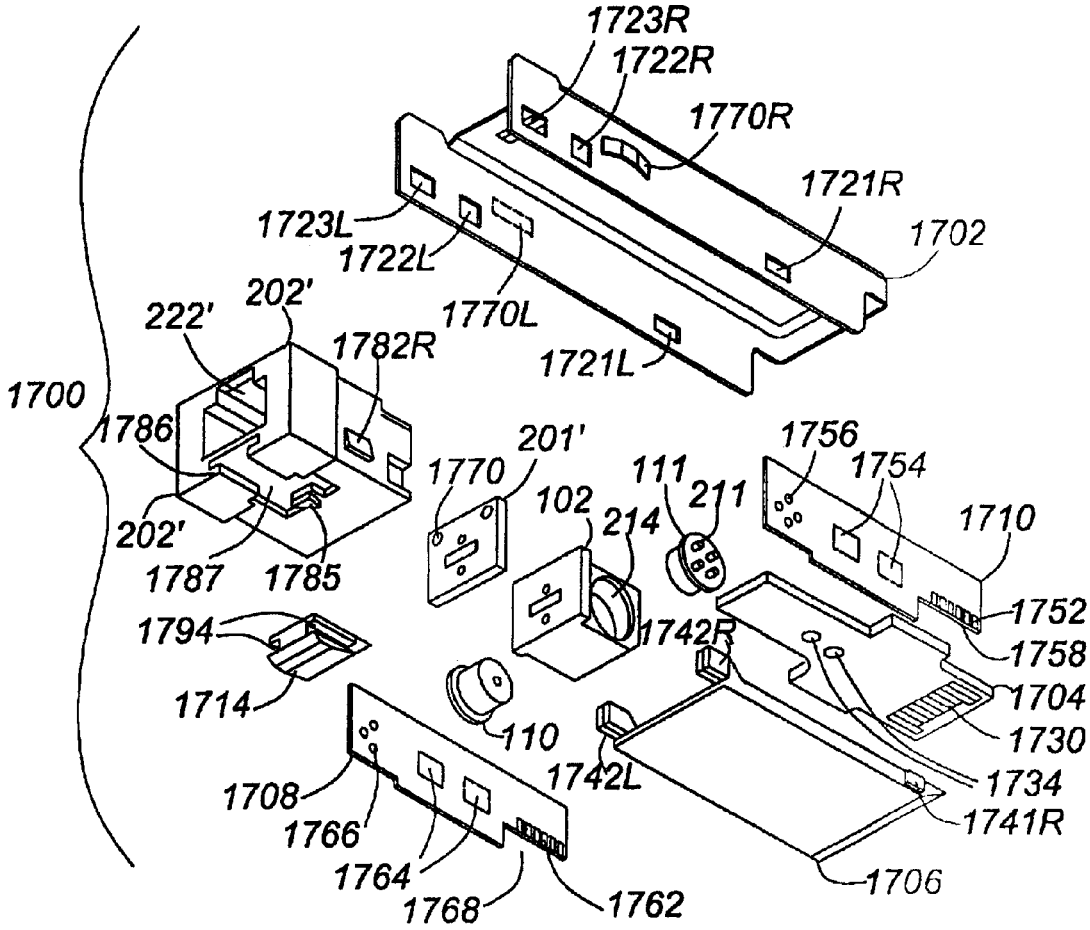
Figure 18A:
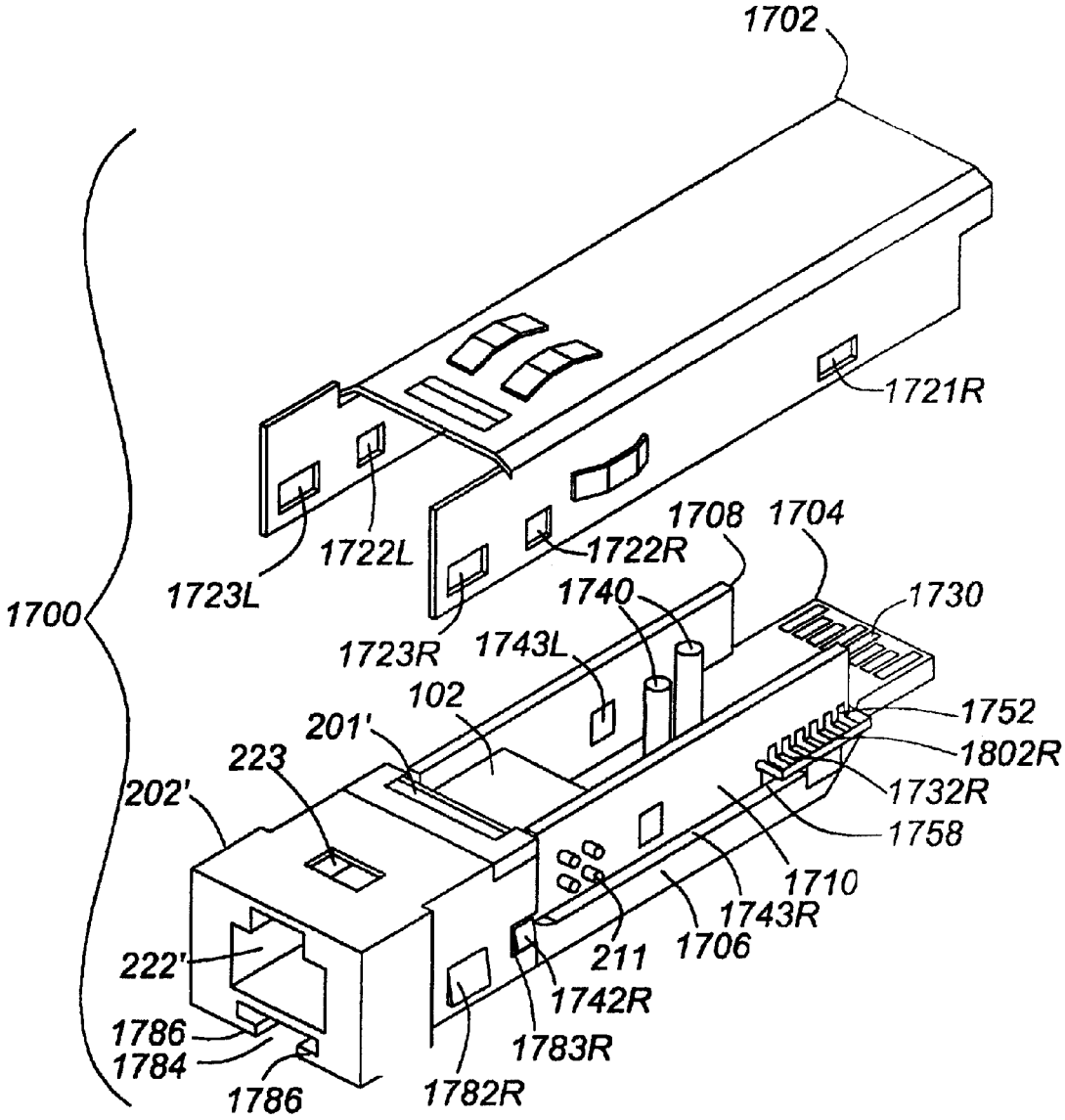
FIGS. 18A–18D illustrate a perspective views of the embodiment of the invention illustrated in FIGS. 17A–17D without the cover/housing assembled thereto.
Figure 18B:
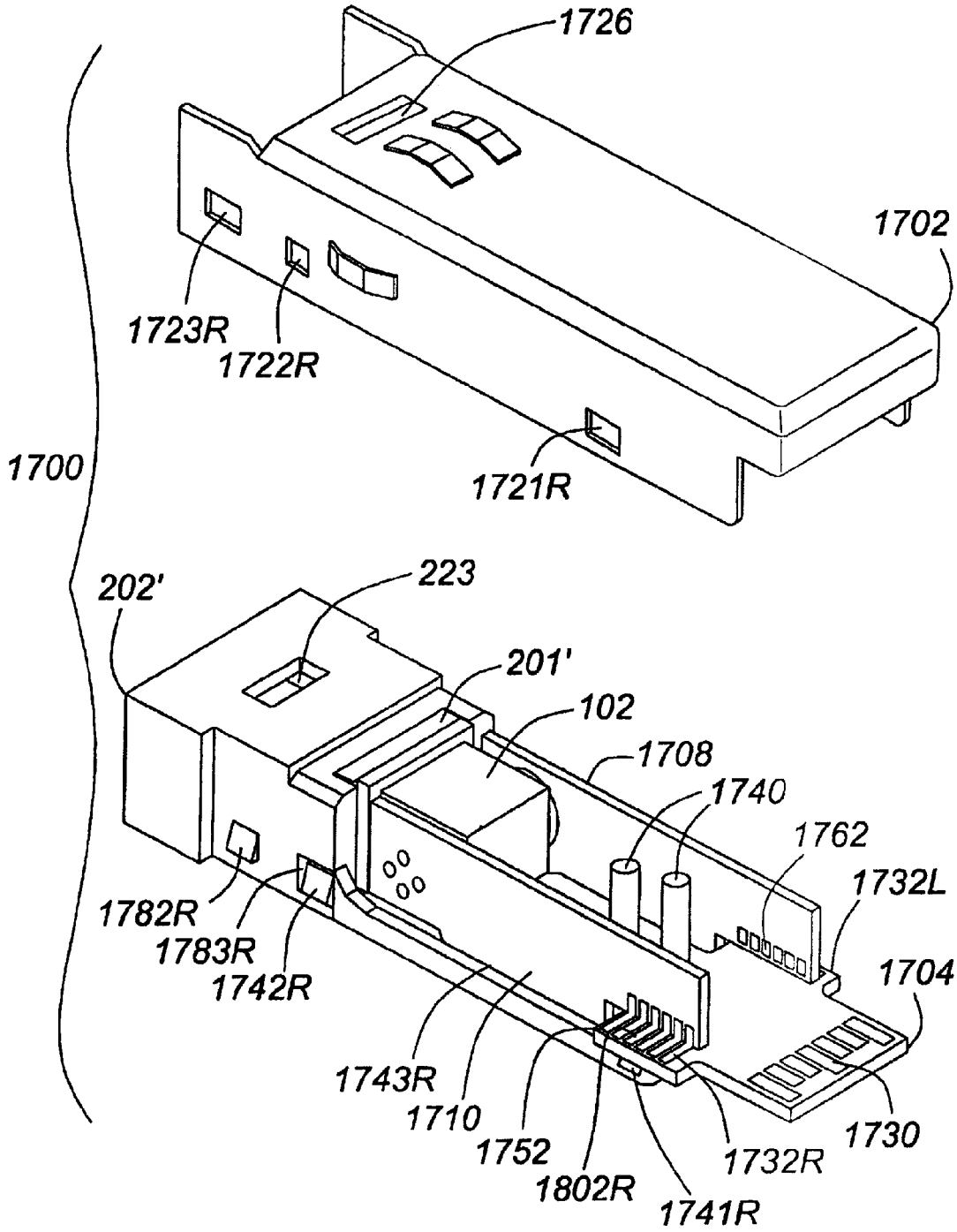
Figure 18C:
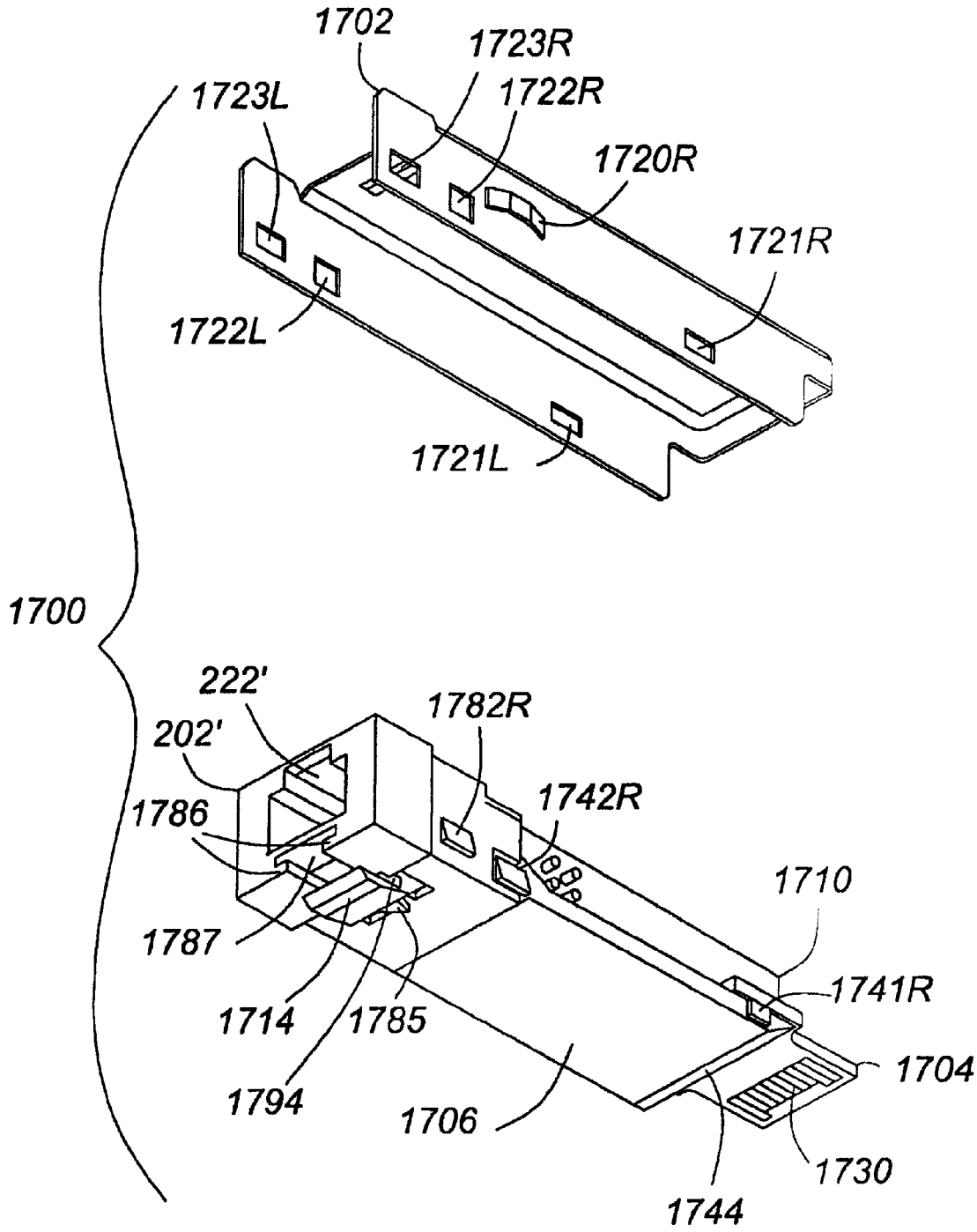
Figure 18D:
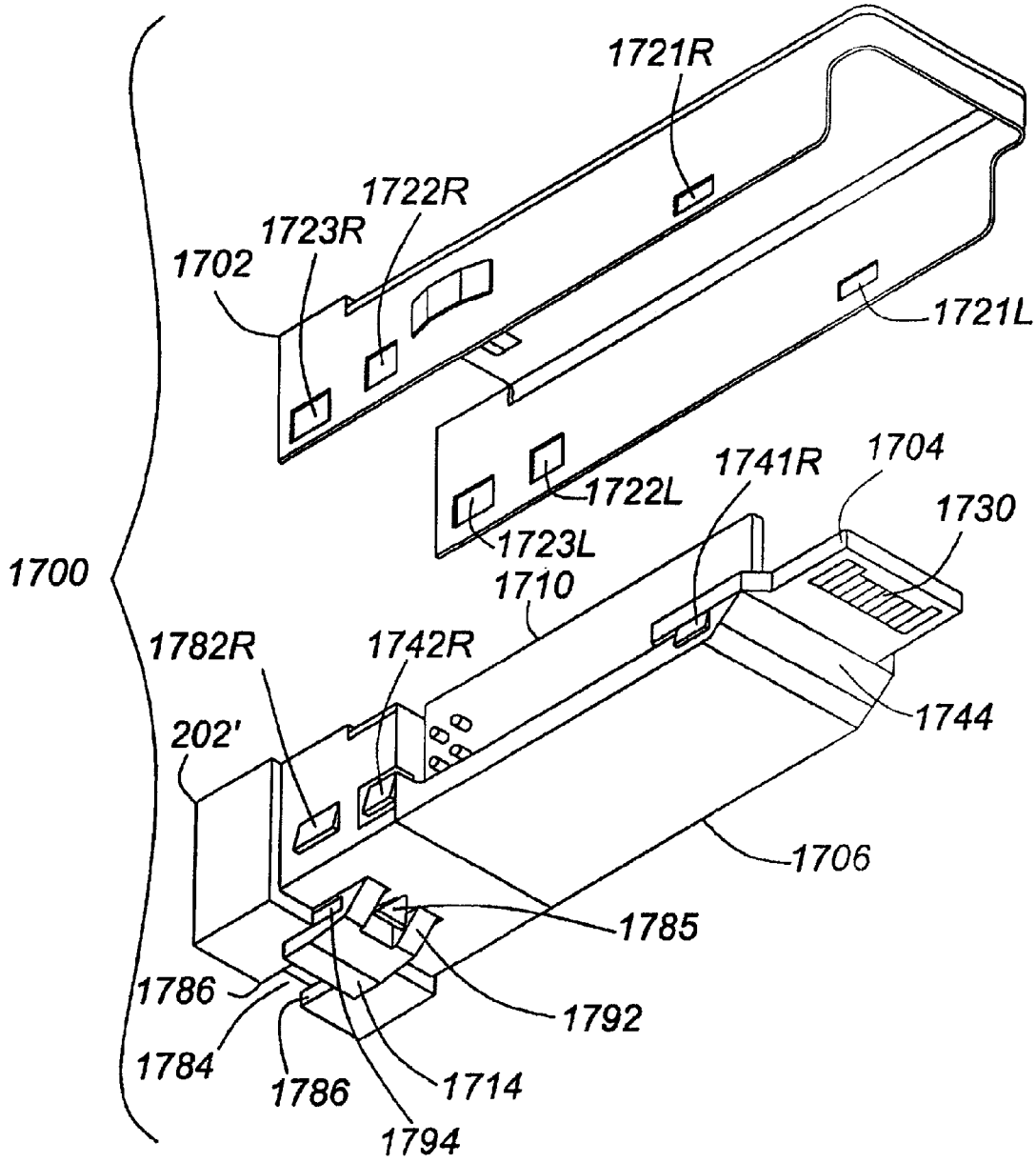

As illustrated in FIGS. 17C and 17D, the nose receptacle 202' may further include a hook or boss 1785 and the center region 1787. The hook or boss 1785 interfaces to a latch of a cage or host receptacle as described further below. A portion of the actuator 1714 may slide over the center region 1787 in the opening 1784.

The actuator 1714 includes the one or more ramps or wedges (a pair of which are illustrated) 1792 for releasing the hook or boss 1785 from a latch and freeing the fiber optic module from 1700 a cage or host receptacle. The center region 1787 can provide slideable support to the actuator 1714 to allow it to push out on the latch while the ridges or tangs 1786 can provide slideable guidance in movement thereof.

The nose receptacle 202' may further include a nose grip at its sides. In one embodiment, the nose grip includes vertical ribs located at the sides near the opening 222'. The nose grip can serve to provide additional gripable surface area during the withdrawal process of the fiber optic module 1700. The one or more vertical ribs deters slippage during handling. The nose grip may be an integrated part of the nose receptacle 202' and can be formed of similar materials.

Additionally, the fiber optic module 1700 may optionally include an internal shield, such as the optional internal shield 109 illustrated in FIGS. 1–2 and previously described above, located between the receive PCB 1710 and the transmit PCB 1708 and the interface PCB 1704. The internal shield may be coupled to a ground trace or ground plane of one of the receive PCB 1710, the transmit PCB 1708 and the interface PCB 1704 or alternatively, it may be coupled to the cover/housing 1702. In any case, the optional internal shield needs to formed so as to not short to any integrated circuit, other electrical component, wire or trace of the printed circuit boards.

Additionally, the fiber optic module 1700 may optionally include pull-action delatching, push button release, pull-lever release, or other delatching or release mechanisms as described in application Ser. No. 09/896,695, titled "METHOD AND APPARATUS FOR PUSH BUTTON RELEASE FIBER OPTIC MODULES", filed Jun. 28, 2001; application Ser. No. 09/939,403, titled "DE-LATCHING MECHANISMS FOR FIBER OPTIC MODULES", filed Aug. 23, 2001; application Ser. No. 09/939,413, titled "PULL-ACTION DE-LATCHING MECHANISMS FOR FIBER OPTIC MODULES", filed Aug. 23, 2001; and application Ser. No. 10/056,394, titled "METHOD AND APPARATUS FOR PULL-LEVER RELEASE FOR FIBER OPTIC MODULES", filed Jan. 24, 2002, all of which are incorporated herein by reference and are to be assigned to E2O Communications, Inc.

Referring now to FIGS. 18A–18D, perspective views of a partially assembled pluggable fiber optic module 1700 are illustrated with the cover/housing 1702 being disassembled therefrom. The transmitter 110 and receiver 111 are coupled into respective openings in the optical block 102. The pins 211 of the receiver 111 are coupled to the receive PCB 1710. The pins 210 of the transmitter are coupled to the transmit PCB 1708. The cutout 1758 of the receive PCB 1710 and the cutout 1738R of the interface PCB allow the respective solder pads 1752 and solder pads 1732R align up together. The solder pads 1752 of the receive PCB 1710 are electrically coupled to the right side solder pads 1732R of the interface PCB 1704 by means of one or more solder joints 1802R. The cutout 1768 of the transmit PCB 1708 and the cutout 1738L of the interface PCB allow the respective solder pads 1762 and solder pads 1732L align up together. The solder pads 1762 of the transmit PCB 1708 are electrically coupled to the left side solder pads 1732L of the interface PCB 1704 by means of one or more solder joints 1802L (The one or more solder joints 1802L are not shown in the figures but are a mirror image of the one or more solder joints 1802R). In the preferred embodiment, the one or more solder joints are ninety degree castellation solder joints. This subassembly is then assembled to the support base 1706.

The openings 1734 of the interface PCB 1704 are slid over the pillars 1740 of the support base 1706. The respective edges of the transmit PCB 1708 and the receive PCB 1710 slide into the slot 1743L and the slot 1743R. The interface PCB 1704 rests for is support on the support edge 1744 and the support tab 1746. A wax, epoxy, or glue may be dripped onto the pillars 1740 to couple the support base 1706 and the interface PCB 1704 together with the rest of the subassembly.

The alignment plate 201' is coupled to the optical block 102. The alignment holes 216 of the alignment plate 201' are slid over the alignment pins 316 in the optical block 102. In an alternate embodiment, the alignment plate 201' may first couple to the nose receptacle 202' before coupling to the optical block 102.

The actuator 1714 is coupled to the nose receptacle 202'. The slots or grooves 1794 in the actuator 1714 are mated with the ridges or tangs 1786 of the nose receptacle 202'. The actuator 1714 may slide back and forth in the opening 1784 in the nose receptacle 202'.

The nose receptacle 202' is coupled to the alignment plate 201' and the support base 1706. The openings 1770 in the alignment plate 201' are slid over the pins 1780 of the nose receptacle 202'. The extended portion of the support base 1706 including the right and left side tabs 1742R, 1742L, slides into respective right and left slots (right slot 1783R only shown in the Figures with left slot 1783L being a mirror image thereof) of the nose receptacle 202'.

The cover/housing 1702 is coupled to the nose receptacle 202' and the support base 1706. The sides of the cover/housing 1702 are slid over the sides of the subassembly so that the openings 1721R, 1722R, 1723R, 1712L, 1722L, and 1723L may align with the respective tabs 1741R, 1742R, 1782R, 1741L, 1742L, and 1782L of the support base 1706 and the nose receptacle 202'. The edge of the sides of the cover/housing 1702 slide over the tabs 1741R, 1742R, 1782R, 1741L, 1742L, and 1782L. The tabs 1741R, 1742R, 1782R, 1741L, 1742L, and 1782L engage the respective openings 1721R, 1722R, 1723R, 1712L, 1722L, and 1723L in the cover/housing 1702. In one embodiment, the tabs snap in place into the openings of the cover/housing. In this manner, the sides of cover/housing 1702 couple to the sides of the support base 1706 and the nose receptacle 202'. The contact tab 1726 of the cover/housing 1702 may contact a surface of the alignment plate 201' or a surface of both the alignment plate 201' and nose receptacle 202'. The completed assembly of the fiber optic module 1700 with the cover/housing 1702 coupled in place is illustrated in FIG. 20 and FIGS. 21A–21D.

Figure 19A:
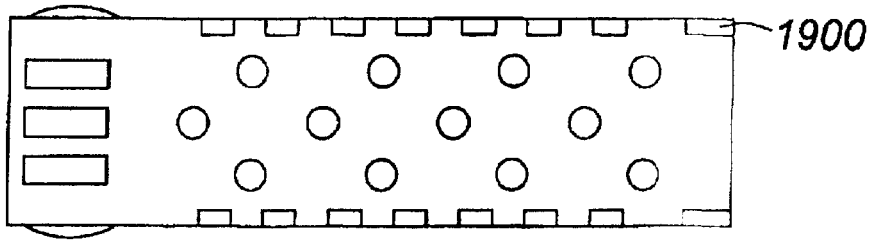
FIGS. 19A–19E are views of an exemplary cage assembly or module receptacle for fiber optic modules.
Figure 19B:
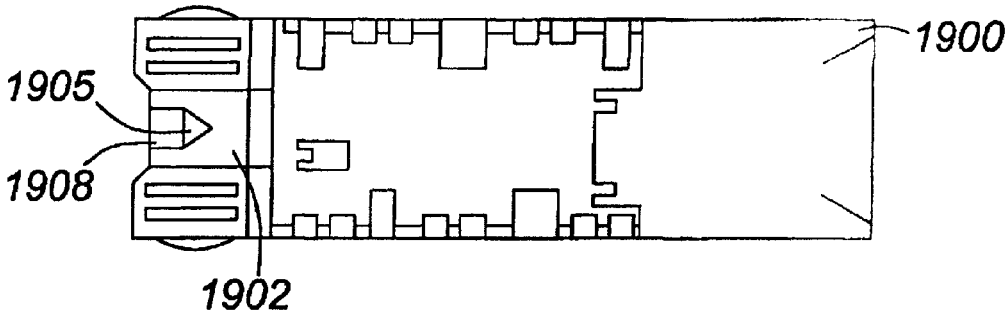
Figure 19C:
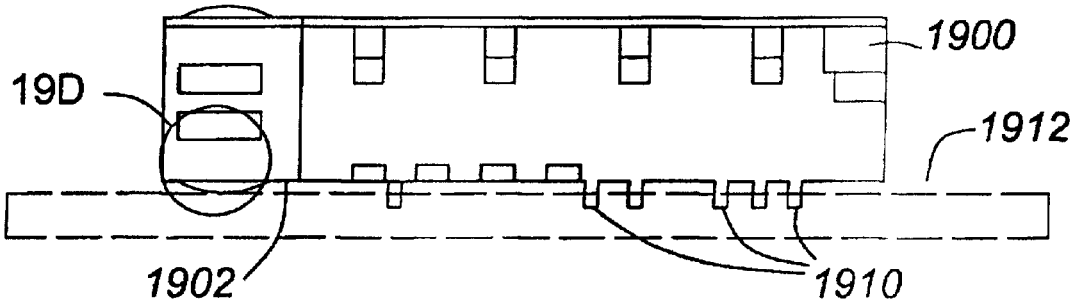
Figure 19D:
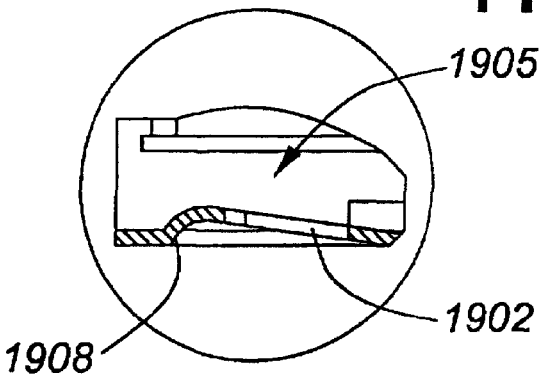
Figure 19E:
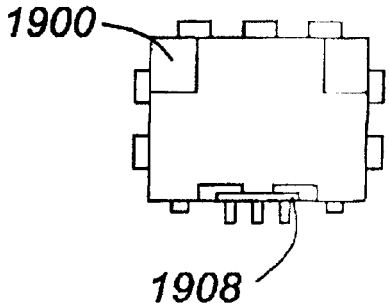

Referring now to FIGS. 19A–19E, views of an exemplary cage assembly or module receptacle 1900 for fiber optic modules is illustrated. That is a fiber optic module, such as fiber optic module 1700, is inserted into the cage assembly or module receptacle 1900. In FIG. 19B, the latch 1902 is illustrated in a bottom view of the module receptacle 1900. The latch 1902 includes a catch 1905 that mates with the hook or boss 1785 of the fiber optic module 1700. As illustrated in the cross sectional view of FIG. 19C and the exploded cross-sectional view of FIG. 19D, the latch 1902 is flexed downward in order to release the fiber optic module. The one or more ramps 1792 of the actuator 1714 of the fiber optic module 1700 flexes the latch 1902 downward when the fiber optic module is pushed in or a force is exerted on a delatching or other release mechanism operating in conjunction with the actuator. The one or more ramps 1792 of the actuator 1714 meets a lip 1908 of the latch 1902 which is bent on an angle and then flexes the latch 1902 outward so that the catch 1905 is released from the hook or boss 1785. The cage assembly or module receptacle 1900 may include one or more pins 1910 to mechanically and/or electrically couple to a host printed circuit board 1912. The pins 1910 may couple to a ground trace or a ground plane so that static charges, EMI, and RF interference may be dissipated through to ground or a negative power supply.

Figure 20:
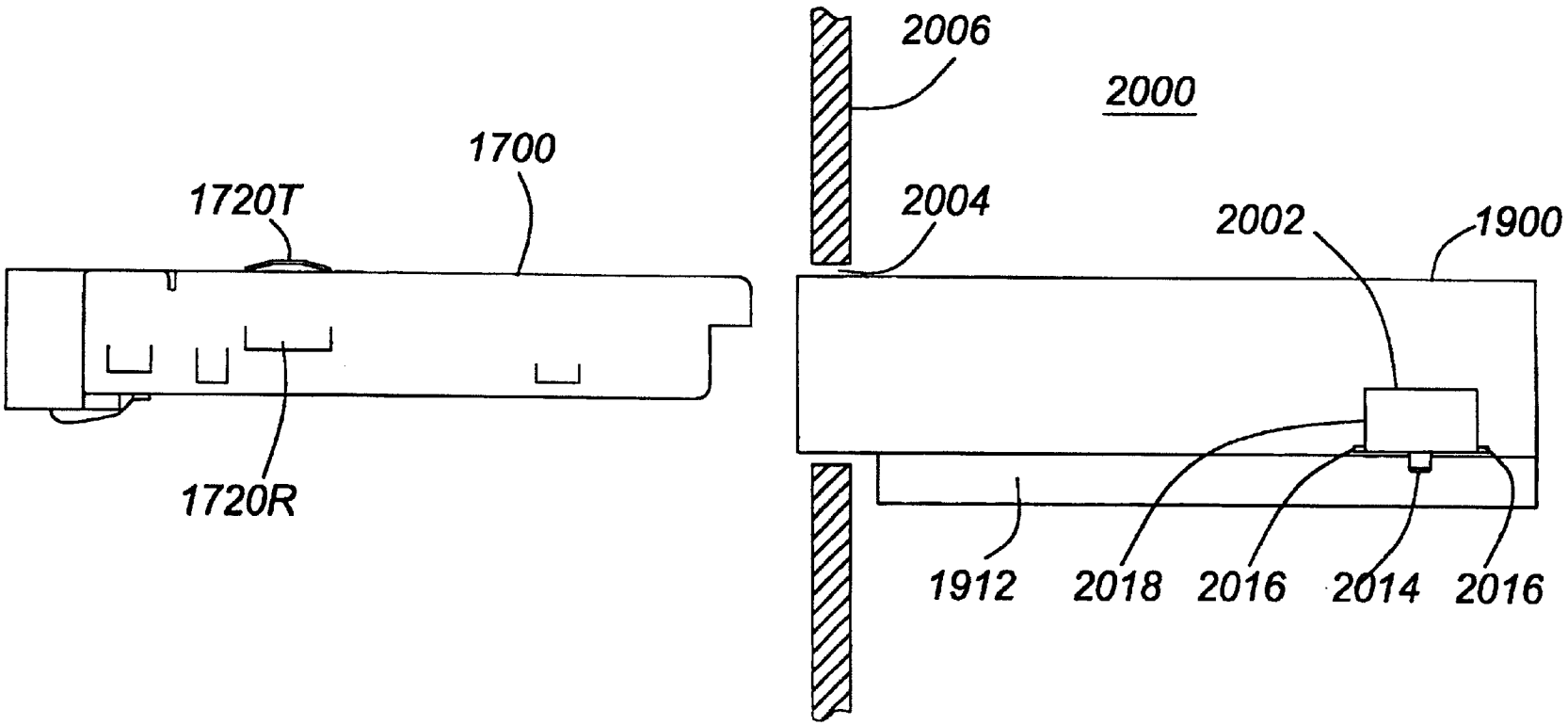
FIG. 20 is a side view of an embodiment of a fiber optic module and an exemplary host connector without the exemplary cage assembly of FIGS. 19A–19E.
Figure 21A:
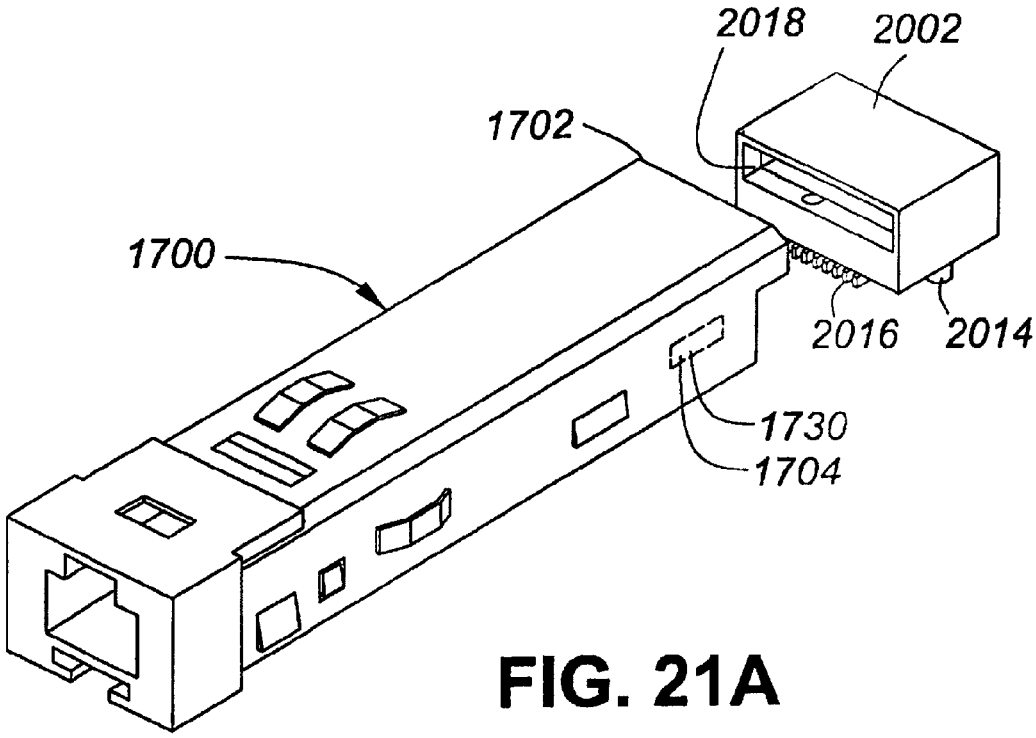
FIGS. 21A–21D are perspective views of an embodiment of a fiber optic module and an exemplary host connector without the exemplary cage assembly of FIGS. 19A–19E.
Figure 21B:
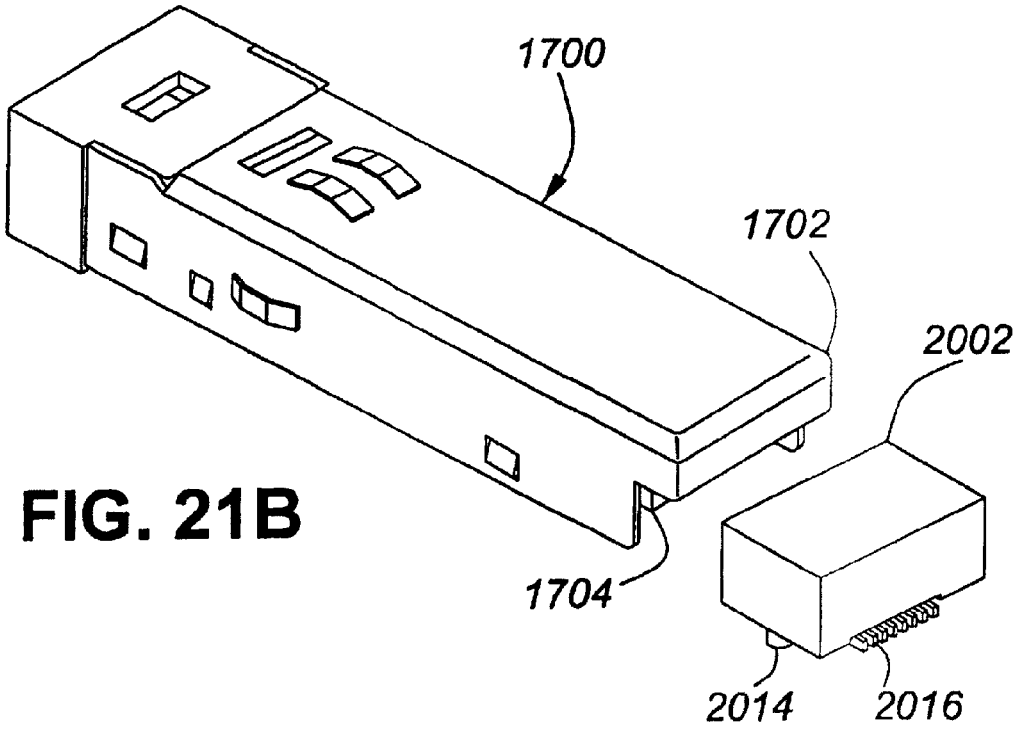
Figure 21C:
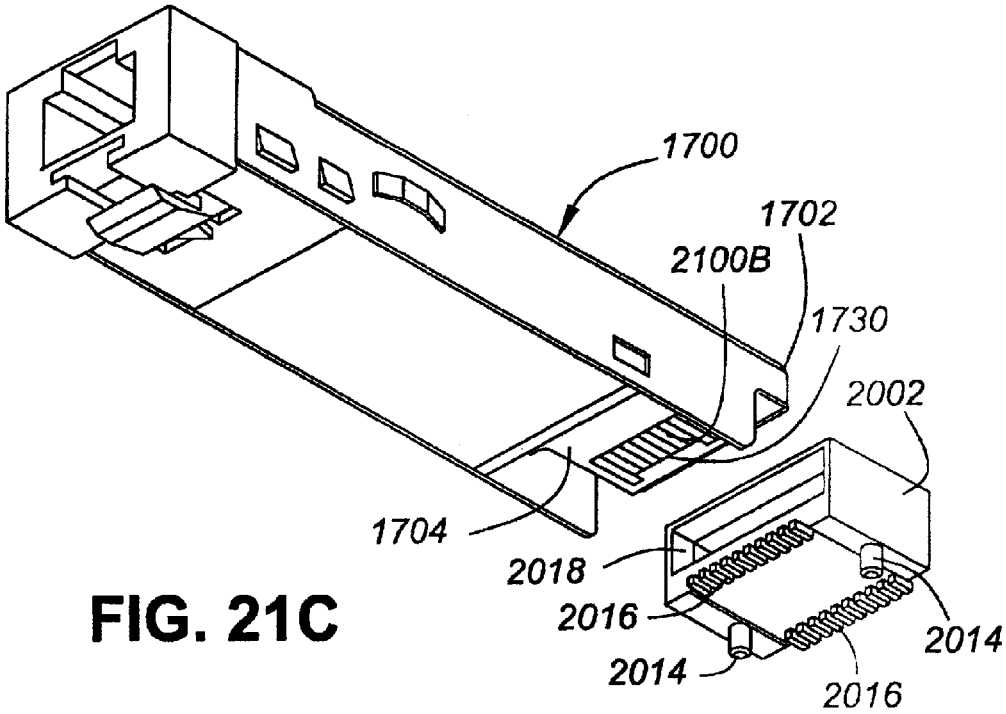
Figure 21D:
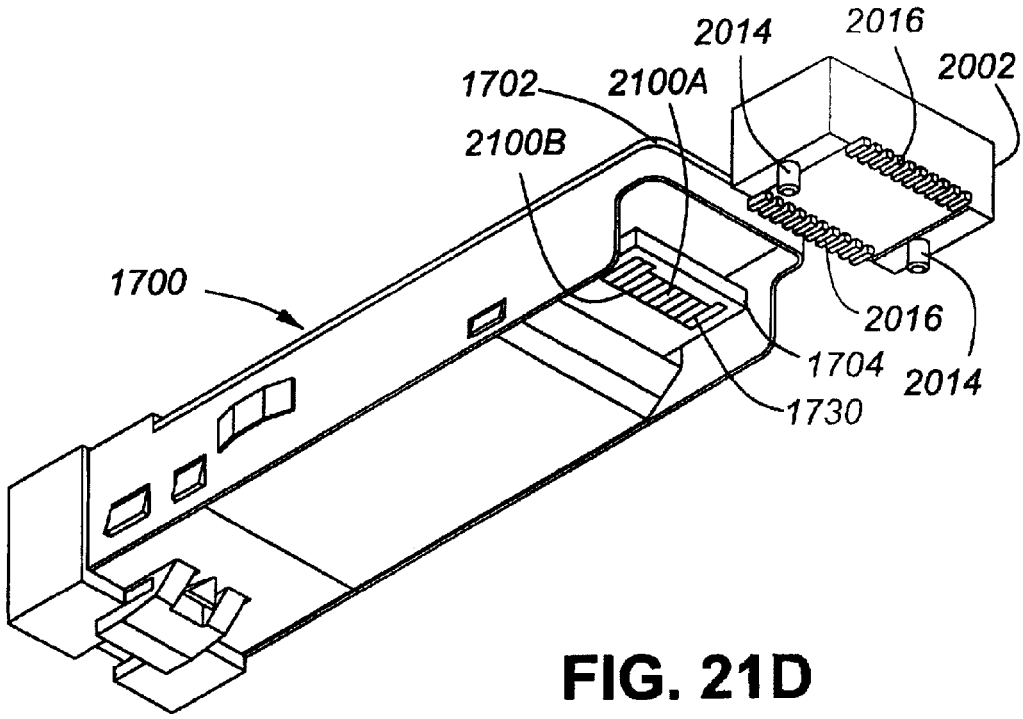

Referring now to FIG. 20, a side view of an embodiment of a fiber optic module 1700 to couple to a host system 2000 is illustrated. The host system 2000 may include the host printed circuit board 1912, an exemplary host connector 2002 coupled to the host printed circuit board 1912, and the exemplary cage assembly or module receptacle 1900 coupled to the host printed circuit board 1912. The host system 2000 may be networking equipment, computer equipment, or other equipment desiring data communication using an optical fiber.

The cage assembly or module receptacle 1900 may extend through an opening 2004 in a plate or bezel 2006 of the host system 2000 as illustrated in FIG. 20, remain flush with the plate or bezel 2006, or be recessed from the plate or bezel 2006. The plate or bezel 2006 may be formed of metal or plastic. If formed of plastic, the plastic may be metalized to make the plate or bezel 2006 conductive. The cage assembly or module receptacle 1900 may include external grounding fingers to couple to a surface of the plate or bezel 2006 or within the opening 2004 of the plate or bezel 2006 so as to ground thereto. Alternatively, the cage assembly or module receptacle 1900 may be insulated from the plate or bezel 2006 so as to electrically isolate each from the other.

The exemplary host connector 2002 is for coupling to an edge connection of a printed circuit board, such as the edge connection 1730 of the interface PCB 1704 in the pluggable fiber optic module 1700. The host connector 2002 may also be referred to as an edge connector. The edge connector 2002 is located inside the perimeter of the cage assembly or module receptacle 1900 nearer its back end.

The edge connector 2002 may include one or more alignment posts 2014 to interface with one or more openings in the host printed circuit board 1912. The edge connector 2002 further includes one or more external pins 2016 on either or both sides to couple to electrical traces of the host printed circuit board 1912. As will be discussed further below, the edge connector 2002 further includes one or more internal pins to couple to the edge connection 1730 of the interface PCB 1704 of the pluggable fiber optic module 1700. The one or more external pins 2016 are electrically coupled to one or more internal pins of the edge connector 2002 in order to electrically couple the fiber optic module 1700 to the host printed circuit board 1912.

To couple, insert, or plug the fiber optic module 1700 into the host system 2000, the edge connector 1730 of the fiber optic module 1700 is first inserted into an open end of the cage assembly or module receptacle 1900. The fiber optic module 1700 is further inserted into the cage assembly or module receptacle 1900 so that the one or more top, left, and right side electromagnetic interference (EMI) fingers 1720T, 1720L, 1720R extending outward from the top surface, left surface and right surface are inserted into the open end of the cage assembly or module receptacle 1900. The one or more top, left, and right side electromagnetic interference (EMI) fingers 1720T, 1720L, 1720R of the fiber optic module 1700 slidingly couple to the top, left, or right side inner surfaces of the cage assembly or module receptacle 1900. In this manner, static charges may be grounded out to the cage assembly or module receptacle 1900 before the fiber optic module 1700 couples to the edge connector 2002. The fiber optic module 1700 is further inserted into the cage assembly or module receptacle 1900 so that the edge connection 1730 finally couples to the edge connector 2002 of the host system 2000 and the opening 1905 in the latch 1902 engages with the boss 1785. To decouple, remove or unplug the fiber optic module 1700 from the host system 2000, the fiber optic module may be pushed further inward to cause the ramps 1792 of the actuator 1714 to push out on the latch 1902, disengaging the opening 1905 from the boss 1785 and pulling out on the fiber optic module 1700. Alternatively, the methods and apparatus described in application Ser. Nos. 09/896,695; 09/939,403; 09/939,413; and 10/056,394 referred to above may be used to decouple, remove or unplug the fiber optic module 1700 from the host system 2000.

Referring now to FIGS. 21A–21D, perspective views of the fiber optic module 1700 and the exemplary edge connector 2002 are illustrated. FIGS. 21A–21D better illustrate some aspects of the edge connector 2002. The edge connection 1730 of the interface PCB 1704 is inserted into the opening 2018 of the edge connector 2002 to couple thereto. As discussed previously, the pins 2016 of the edge connector 2002 are for coupling to conductive traces on a host printed circuit board. The alignment pins 2014 of the edge connector 2002 assure that the pins 2016 properly line up to couple to the traces of the host printed circuit board. The pins 2016 may be soldered to the host printed circuit board. The edge connection 1730 includes one or more pads 2100A on one side and one or more pads 2100B on an opposite side of the interface PCB 1704. The one or more pads 2100A and 2100B on the interface PCB 1704 are to couple to internal pins of the edge connector 2002 when inserted into the opening 2018. The size of the edge connector 2002 is such that the sides of cover/housing 1702 of the fiber optic module 1700 may fit over and partially cover the edge connector 2002. That is, the cover/housing 1702 of the fiber optic module 1700 may receive the edge connector 2002 so that the edge connection 1730 may couple thereto.

With the tabs 1741R, 1742R, 1782R, 1741L, 1742L, and 1782L engaged with the respective openings 1721R, 1722R, 1723R, 1712L, 1722L, and 1723L in the cover/housing 1702, the cover/housing 1702 is deterred from being decoupled from the fiber optic module 1200 during the sliding engagement between the one or more top, left, and right side electromagnetic interference (EMI) fingers 1720T, 1720L, 1720R of the fiber optic module 1700 and the top, left, or right side inner surfaces of the cage assembly or module receptacle 1900.

Figure 22A:
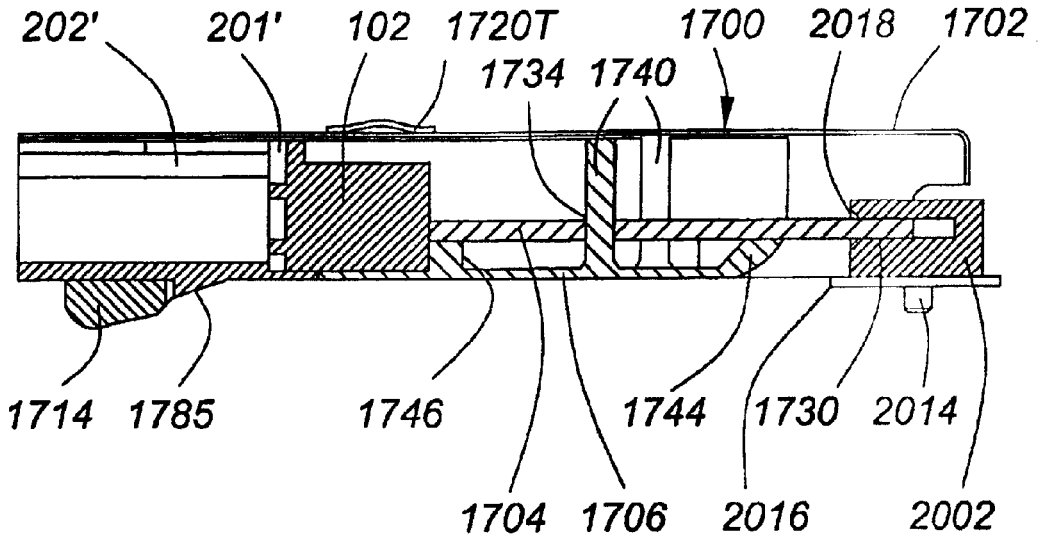
FIGS. 22A–22B are cross section views illustrating an embodiment of a fiber optic module coupling to the exemplary host connector of FIGS. 20, 21A–21D and the exemplary cage assembly of FIGS. 19A–19E.

Referring now to FIG. 22A, a cross sectional view of the fiber optic module 1700 coupled to the edge connector 2002 is illustrated. The cross section view of the fiber optic module 1700 illustrates more clearly how the support tab 1746 and the support edge 1744 of the support base 1744 supports the interface PCB 1704. It also further illustrates how the one or more openings 1734 slide over the one or more pillars 1740 and keep the interface PCB 1704 from moving when plugged into and pulled out from the edge connector 2002. A portion of the sides of the cover/housing 1702 of the fiber optic module 1700 fit over and partially cover the edge connector 2002. The edge connection 1730 of the interface PCB 1704 is coupled into the edge connector 2002 through the opening 2018.

Figure 22B:
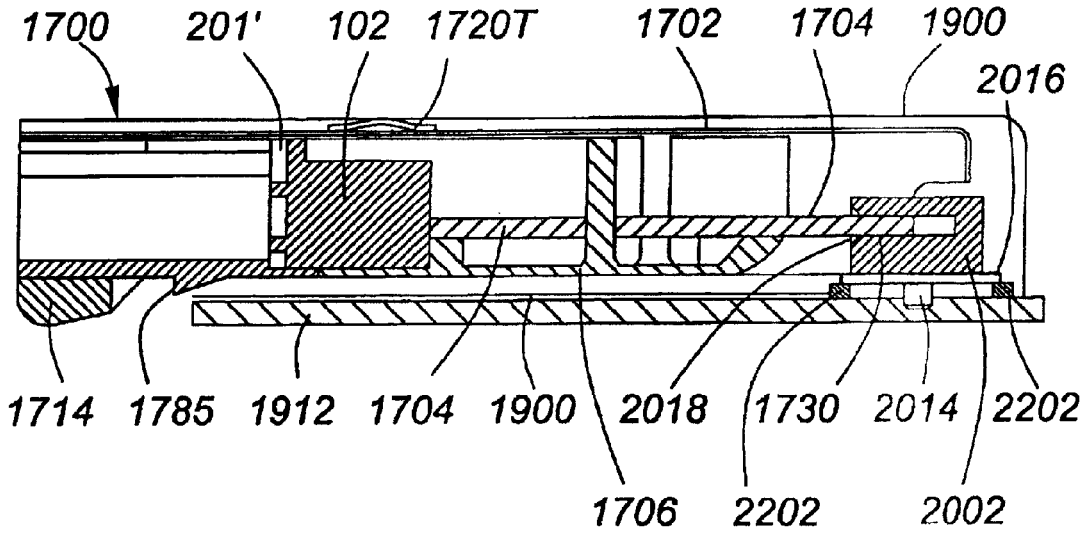

Referring now to FIG. 22B, a cross sectional view of the fiber optic module 1700 coupled to the host system 2000 is illustrated. The host system 2000 includes the edge connector 2002 and the cage assembly 1900 coupled to the host printed circuit board 1912. The fiber optic module 1700 is illustrated as being fully inserted into the cage assembly 1900 so that its edge connection 1730 is coupled into the edge connector 2002 through the opening 2018. The pins 2016 of the edge connector 2002 are coupled to traces 2202 on the host printed circuit board 1912. The alignment pins 2104 are coupled into openings or holes in the host printed circuit board 1912. The one or more top side electromagnetic interference (EMI) fingers 1720T of the fiber optic module 1700 is coupled to the top inner surface of the cage assembly or module receptacle 1900.

Figure 23A:
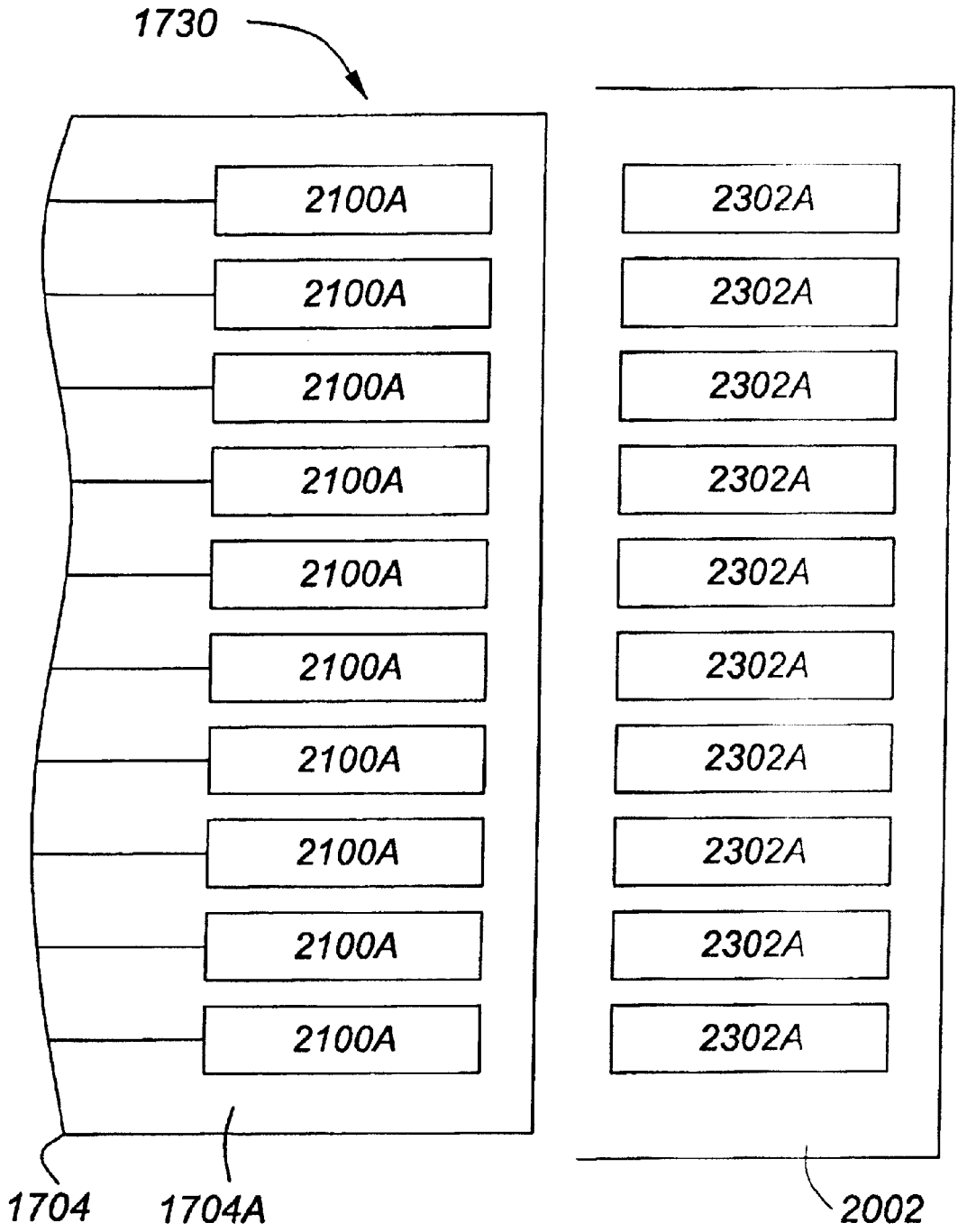
FIGS. 23A–23C illustrate an example of how an electrical connection between the interface printed circuit board of an embodiment of the fiber optic module and the host connector of a host printed circuit board is formed.
Figure 23B:
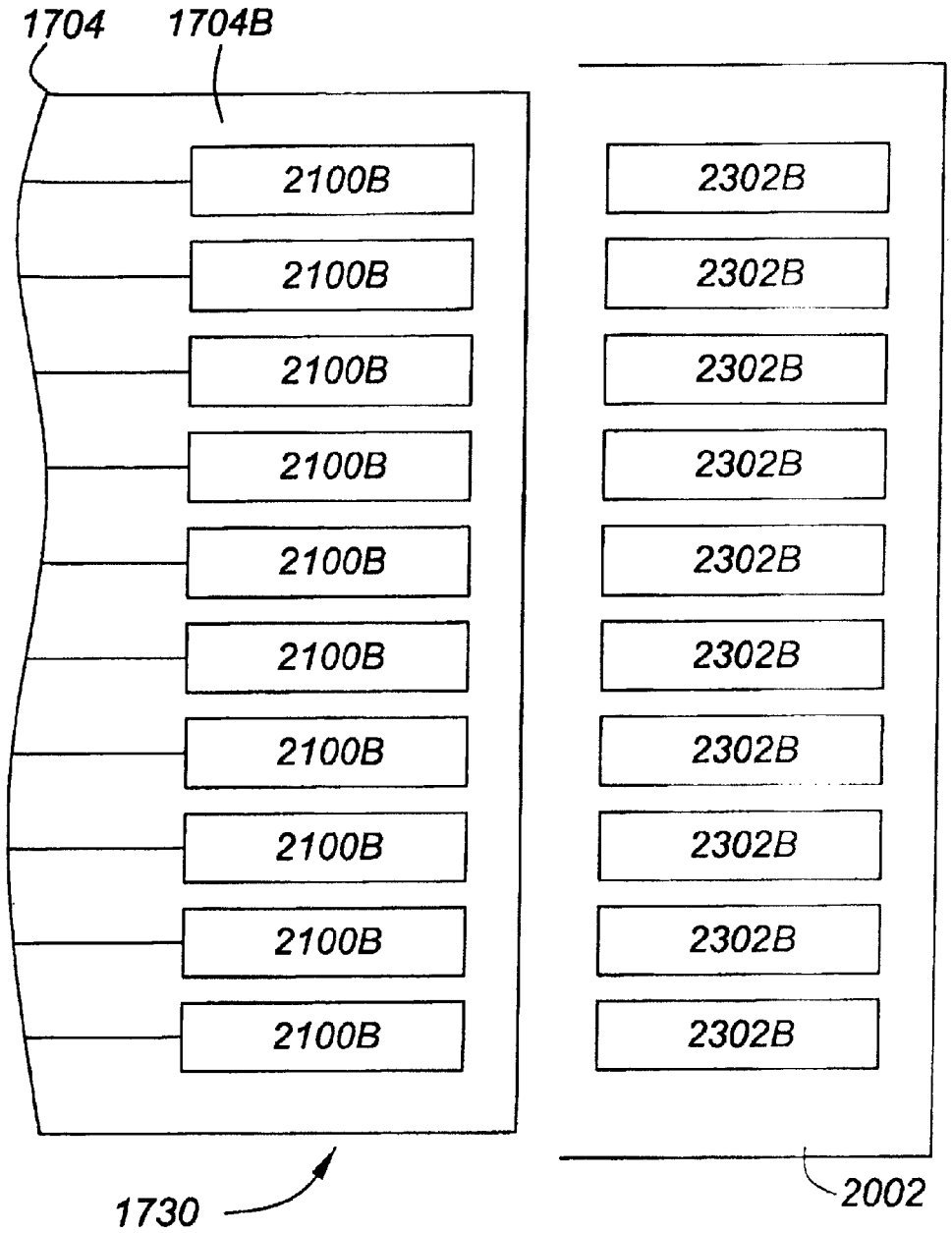
Figure 23C:
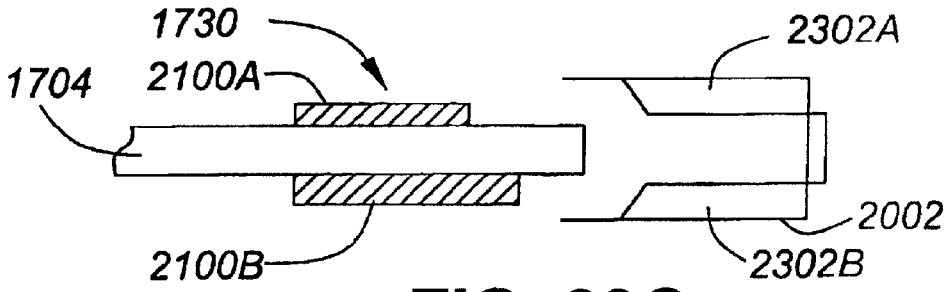

Referring now to FIGS. 23A–23C, an example of forming the electrical connection between interface PCB of the fiber optic module 1700 and the edge connector of the host system is illustrated. As illustrated in FIGS. 23A–23C, the edge connection 1730 includes the one or more pads 2100A on one side 1704A and the one or more pads 2100B on an opposite side 1704B of the interface PCB 1704. The edge connector 2002 includes one or more internal pins 2302A on one side and one or more internal pins 2302B on an opposite side of the opening 2018. The one or more pads 2100A of the edge connection 1730 slidingly couple to respective ones of the one or more internal pins 2302A of the edge connector 2002. Contact is made between the pads 2100A and the pins 2302A such that an electrical connection is formed. The one or more pads 2100B of the edge connection 1730 slidingly couple to respective ones of the one or more internal pins 2302B of the edge connector 2002. Contact is made between the pads 2100B and the pins 2302B such that an electrical connection is formed.

Referring now to FIG. 23C, a side view of the edge connection 1730 is illustrated. In FIG. 23C, a side view of one of the one or more pads 2300A and one of the one or more pads 2300B on opposite sides of the interface PCB 1704 are more clearly illustrated. A side view of one of the one or more internal pins 2302A and one of the one or more internal pins 2302B of the edge connector 2002 is also illustrated in FIG. 23C. The one or more internal pins 2302A and 2302B are coupled to the external pins 2016 of the edge connector 2002. With the external pins 2016 coupled to the host printed circuit board 1912, the internal pins 2302A and 2302B are coupled to the host printed circuit board 1912 as well. A number of the one or more pads 2100A and/or 2100B can be staggered from the edge of the edge connection 1730 as illustrated in FIGS. 23A–23C in order that ground may be provided first and power may be provided secondly, prior to making connections for signal or data lines. In this case, the interface PCB 1704 and the fiber optic module 1700 may be hot-pluggable into the edge connector 2002 and the host system 2000. That is, power can be maintained to the host printed circuit board 1912 while the fiber optic module 1700 is plugged into or out of the cage assembly 1900 and the edge connector 2002.

The previous detailed description describes fiber optic modules as including a receiver and transmitter. However, one of ordinary skill can see that a fiber optic module may be a receiver only or a transmitter only such that only one board type is used. Additionally, the previous detailed description described one receive channel and one transmit channel. However, the invention may be extended to a plurality of channels in parallel which can be all transmit channels, all receive channels or both receive and transmit channels into multiple fiber optic cables.

The preferred embodiments of the invention are thus described. While the invention has been described in particular embodiments, the invention should not be construed as limited by such embodiments, but rather construed according to the claims that follow below.

What is claimed is:

1. A fiber optic module for coupling photons between optoelectronic devices and optical fibers, the fiber optic module comprising:

a horizontal printed circuit board (PCB) arranged horizontally, the horizontal printed circuit board having an edge connection to plug into and out of an edge connector of a host system;

a first vertical printed circuit board (PCB) arranged at a perpendicular angle with the horizontal printed circuit board, the first optoelectronic device having terminals coupled to the first vertical printed circuit board, the first vertical printed circuit board electrically coupled to the horizontal printed circuit board along a right side thereof;

a second vertical printed circuit board (PCB) arranged at a perpendicular angle with the horizontal printed circuit board, the second optoelectronic device having terminals coupled to the second vertical printed circuit board, the second vertical printed circuit board electrically coupled to the horizontal printed circuit board along a left side thereof parallel to the first vertical printed circuit board; and a support base to support the horizontal printed circuit board, the first vertical printed circuit board, and the second vertical printed circuit board;

wherein the support base includes right and left slots to support the sides of the first and second vertical printed circuit boards, respectively; and wherein the horizontal printed circuit board includes first and second cutouts enabling edges of the first and second vertical printed circuit boards to be received in the right and left slots, respectively.

2. The fiber optic module of claim 1 further comprising: a housing coupled around the horizontal printed circuit board, the first vertical printed circuit board, and the second vertical printed circuit board.

3. The fiber optic module of claim 2 wherein, the housing is a shielded housing to shield the horizontal printed circuit board, the first vertical printed circuit board, and the second vertical printed circuit board to reduce electromagnetic interference (EMI).

4. The fiber optic module of claim 1 wherein the edge connection of the horizontal printed circuit board has a plurality of pads to couple to the edge connector of the host system; and wherein the first vertical printed circuit board has one or more solder pads to couple to one or more first solder pads of the horizontal printed circuit board, and the second vertical printed circuit board has one or more solder pads to couple to one or more second solder pads of the horizontal printed circuit board.

5. The fiber optic module of claim 1, wherein the first vertical printed circuit board further includes one or more first electrical components coupled to the first optoelectronic device to control the first optoelectronic device, and wherein the second vertical printed circuit board further includes one or more second electrical components coupled to the second optoelectronic device to control the second optoelectronic device, and a backside ground plane between the first and second electrical components to minimize crosstalk therebetween.

6. The fiber optic module of claim 1 wherein, the horizontal printed circuit board further includes a ground plane to reduce electromagnetic fields generated by electrical components.

7. The fiber optic module of claim 1, wherein the first and second vertical printed circuit boards each further include a ground plane facing each other to reduce electromagnetic fields generated by electrical components.

8. The fiber optic module of claim 1, further comprising:

a first optical block coupled to the first optoelectronic device, the first optical block having a first opening to receive the first optoelectronic device, and a first lens to couple photons between the first optoelectronic device and an optical fiber; and a second optical block coupled to the second optoelectronic device, the second optical block having a second opening to receive the second optoelectronic device, and a second lens to couple photons between the second optoelectronic device and an optical fiber.

9. The optic fiber module of claim 8 further comprising: a nose receptacle to receive an optical fiber connector and to hold an optical fiber substantially fixed and aligned with an optical opening of the optical block.

10. The fiber optic module of claim 9 wherein, the nose receptacle is formed of metal or metalized plastic to reduce electromagnetic interference.

11. The fiber optic module of claim 1 further comprising: an optical block coupled to the first and second optoelectronic devices, the optical block having first and second openings to receive the first and second optoelectronic devices perpendicular to the first and second printed circuit boards, respectively, a first lens and a first reflector to couple photons between the first optoelectronic device and a first optical fiber, and a second lens and a second reflector to couple photons between the second optoelectronic device and a second optical fiber.

12. The fiber optic module of claim 11, wherein the first lens of the optical block to launch photons from the first optoelectronic device along a first optical axis;

wherein the second lens of the optical block is a focusing lens to couple photons to the second optoelectronic device along a second optical axis;

wherein the first and second optical axes are offset from each other to minimize optical crosstalk therebetween.

13. The fiber optic module of claim 11 further comprising: a nose receptacle to receive an optical fiber connector and to hold an optical fiber substantially fixed and aligned with an optical opening of the optical block.

14. The fiber optic module of claim 13 wherein, the nose receptacle is formed of metal or metalized plastic to reduce electromagnetic interference.

15. The fiber optic module of claim 13 further comprising: an alignment plate coupled between the optical block and the nose receptacle, the alignment plate to align one or more optical fibers with the optical opening of the optical block.

16. The fiber optic module of claim 1, wherein the support base includes one or more pillars to engage one or more respective openings in the horizontal printed circuit board to deter movement thereof when the fiber optic module is plugged into or unplugged from the edge connector of the host system.

17. The fiber optic module of claim 1, further comprising: a cover/housing coupled to the support base and the nose receptacle around the horizontal printed circuit board, the first vertical printed circuit board, and the second vertical printed circuit board.

18. The fiber optic module of claim 17 wherein, the cover/housing is a shielded cover/housing to shield the horizontal printed circuit board, the first vertical printed circuit board, and the second vertical printed circuit board to reduce electromagnetic interference (EMI).

19. The fiber optic module of claim 17 further comprising: an internal shield located under the cover/housing, over the horizontal printed circuit board, and between the first vertical printed circuit board and the second vertical printed circuit board, the internal shield to shield and reduce electromagnetic interference (EMI).

20. The fiber optic module of claim 1, wherein, the first optoelectronic device is a photodetector.

21. The fiber optic module of claim 1, wherein, the second optoelectronic device is an emitter.

22. The fiber optic module of claim 1, wherein the horizontal printed circuit board has a plurality of pins to couple to a host system; and wherein the first and second vertical printed circuit boards have solder pads to couple to the horizontal printed circuit board.

23. A fiber optic transceiver comprising:

an interface printed circuit board (PCB) having an edge connection to couple to and to decouple from an edge connector of a host system;

a receive printed circuit board (PCB) perpendicularly coupled to the interface printed circuit board along a right side thereof, the receive printed circuit board having a receiving optoelectronic device coupled perpendicularly thereto;

a transmit printed circuit board (PCB) perpendicularly coupled to the interface printed circuit board along a left side thereof parallel to the receive printed circuit board, the transmit printed circuit board having a transmitting optoelectronic device coupled perpendicularly thereto; and a support base to support the interface printed circuit board, the receive printed circuit board, and the transmit printed circuit board;

wherein the support base includes right and left slots to support the sides of the transmit and receive printed circuit boards, respectively; and wherein the interface printed circuit board includes first and second cutouts enabling edges of the transmit and receive printed circuit boards to be received in the right and left slots, respectively.

24. The fiber optic transceiver of claim 23 further comprising:

an optical block coupled to the transmitting optoelectronic device and the receiving optoelectronic device, the optical block having a first opening to receive the transmitting optoelectronic device perpendicular to the transmit printed circuit board, a first lens to couple photons from the transmitting optoelectronic device into a first optical fiber, a first reflector for reflecting photons at substantially a 90° angle into the first optical fiber;

a second opening to receive the receiving optoelectronic device perpendicular to the receive printed circuit board, a second lens to couple photons from a second optical fiber into the receiving optoelectronic device, and a second reflector for reflecting photons at substantially a 90° angle into the second optical fiber.

25. The fiber optic transceiver of claim 24 further comprising: a nose receptacle to receive an optical fiber connector and to hold an optical fiber substantially fixed and aligned with an optical opening of the optical block.

26. The fiber optic transceiver of claim 25 further comprising: an alignment plate coupled between the optical block and the nose receptacle, the alignment plate to align first and second optical fibers with the optical opening of the optical block.

27. The fiber optic transceiver of claim 26 further comprising: a cover/housing coupled to the support base and the nose receptacle around the interface printed circuit board, the receive printed circuit board, and the transmit printed circuit board.

28. The fiber optic transceiver of claim 27 wherein, the cover/housing is a shielded cover/housing to shield the interface printed circuit board, the receive printed circuit board, and the transmit printed circuit board to reduce electromagnetic interference (EMI).

29. The fiber optic transceiver of claim 28 wherein, the alignment plate is formed of metal or metalized plastic to reduce electromagnetic interference and the cover/housing has a tab to electrically couple to the alignment plate.

30. The fiber optic transceiver of claim 29 wherein the support base includes one or more pillars to engage one or more respective openings in the interface printed circuit board to deter movement thereof when the fiber optic transceiver is plugged into or unplugged from the edge connector of the host system.

31. The fiber optic transceiver of claim 23, wherein the transmit printed circuit board further includes one or more first electrical components coupled to the transmitting optoelectronic device to control the transmitting optoelectronic device, wherein the receive vertical printed circuit board further includes one or more second electrical components coupled to the receiving optoelectronic device to control the receiving optoelectronic device, and wherein at least one of the receive and transmit printed circuit boards further includes a backside ground plane between the first and second electrical components to minimize crosstalk therebetween.

32. A fiber optic module comprising:

a base having one or more pillars;

a first printed circuit board (PCB) having an edge connection, at least one left solder pad, at least one right solder pad, and one or more openings, the one or more openings to slide over the one or more pillars and align the first printed circuit board to the base;

a second printed circuit board (PCB) having at least one solder pad to couple perpendicularly to the at least one left solder pad along a left side of the first printed circuit board, the second printed circuit board having a first optoelectronic device coupled thereto;

a third printed circuit board (PCB) having at least one solder pad to couple perpendicularly to the at least one right solder pad along a right side of the first printed circuit board parallel to the second printed circuit board, the third printed circuit board having a second optoelectronic device coupled thereto;

an optical block having openings to receive the first optoelectronic device and the second optoelectronic device;

a nose receptacle having a plug opening to receive an optical fiber plug; and a cover coupled to the base and the nose receptacle to cover and protect the optical block and the first, second, and third printed circuit boards;

wherein the base includes right and left slots to support the sides of the second and third printed circuit boards, respectively; and wherein the first printed circuit board includes first and second cutouts enabling edges of the second and third printed circuit boards to be received in the right and left slots, respectively.

33. The fiber optic module of claim 32 wherein the base couples to the nose receptacle and includes a support tab to support an end of the first printed circuit board and a support edge to support an opposite end of the first printed circuit board.

34. The fiber optic module of claim 32 further comprising: an alignment plate coupled between the optical block and the nose receptacle, the alignment plate to align first and second optical fibers with an optical opening of the optical block.

35. The fiber optic module of claim 34 wherein, the cover to shield the first, second, and third printed circuit boards to reduce electromagnetic interference (EMI).

36. The fiber optic module of claim 35 wherein, the cover is formed of metalized plastic.

37. The fiber optic module of claim 35 wherein, the cover further includes one or more fingers to couple to a cage of the host system.

38. The fiber optic module of claim 35 wherein, the alignment plate to shield and reduce electromagnetic interference (EMI), and the cover has a tab to couple to the alignment plate.

39. The fiber optic module of claim 38 wherein, the alignment plate is formed of metalized plastic.

40. The fiber optic module of claim 32, wherein the second printed circuit board further includes one or more first electrical components coupled to the first optoelectronic device to control the first optoelectronic device, wherein the third vertical printed circuit board further includes one or more second electrical components coupled to the second optoelectronic device to control the second optoelectronic device, and wherein at least one of the second and third printed circuit boards further includes a backside ground plane between the first and second electrical components to minimize crosstalk therebetween.

41. The fiber optic module of claim 32, wherein the block includes:

a first opening to receive the first optoelectronic device perpendicular to the second printed circuit board, a first lens to couple photons from the first optoelectronic device into a first optical fiber, a first reflector for reflecting photons at substantially a 90° angle into the first optical fiber;

a second opening to receive the second optoelectronic device perpendicular to the third printed circuit board, a second lens to couple photons from a second optical fiber into the second optoelectronic device, and a second reflector for reflecting photons at substantially a 90° angle into the second optical fiber.

* * * * *